(12) United States Patent
Walsh et al.

(10) Patent No.: US 9,500,386 B1
(45) Date of Patent: Nov. 22, 2016

(54) FAN CONTROLLER

(71) Applicants: John Walsh, Bozeman, MT (US);
Robert J. Mowris, Olympic Valley, CA (US)

(72) Inventors: John Walsh, Bozeman, MT (US);
Robert J. Mowris, Olympic Valley, CA (US)

( * ) Notice: Subject to any disclaimer, the term of this patent is extended or adjusted under 35 U.S.C. 154(b) by 0 days.

(21) Appl. No.: 15/251,978

(22) Filed: Aug. 30, 2016

Related U.S. Application Data

(63) Continuation-in-part of application No. 15/144,806, filed on May 2, 2016, which is a continuation-in-part of application No. 14/168,503, filed on Jan. 30, 2014, now Pat. No. 9,328,933, which is a continuation-in-part of application No. 13/427,542, filed on Mar. 22, 2012, which is a continuation-in-part of application No. 13/085,119, filed on Apr. 12, 2011, now Pat. No. 8,763,920.

(60) Provisional application No. 61/324,229, filed on Apr. 14, 2010.

(51) Int. Cl.
*F24F 11/053* (2006.01)
*F24D 19/10* (2006.01)
*G05D 23/19* (2006.01)
*F24H 9/20* (2006.01)
*F24F 11/00* (2006.01)

(52) U.S. Cl.
CPC ......... *F24F 11/053* (2013.01); *F24D 19/1084* (2013.01); *F24F 11/0076* (2013.01); *F24H 9/2071* (2013.01); *G05D 23/1951* (2013.01); *F24F 2011/0075* (2013.01)

(58) Field of Classification Search
CPC ............... F24F 11/053; F24F 11/0076; F24F 2011/0075; F24D 19/1084; F24H 9/2071; G05D 23/1951
See application file for complete search history.

(56) References Cited

U.S. PATENT DOCUMENTS

| | | | |
|---|---|---|---|
| 6,282,910 B1* | 9/2001 | Helt | F24F 11/0079 62/229 |
| 6,940,051 B2* | 9/2005 | Tateishi | F24H 9/2071 219/486 |
| 7,191,826 B2* | 3/2007 | Byrnes | F04D 27/00 126/110 A |
| 2011/0234368 A1* | 9/2011 | Huang | G05D 23/1951 340/3.44 |
| 2016/0245544 A1* | 8/2016 | Walsh | F24F 11/053 |

* cited by examiner

*Primary Examiner* — Marc Norman
(74) *Attorney, Agent, or Firm* — Kenneth L. Green; Averill & Green

(57) ABSTRACT

Apparatus and methods are disclosed for a fan controller. The fan controller determines HVAC system type and heating or cooling mode for gas furnace, heat pump, electric resistance, and hydronic heating, ventilating, and air conditioning (HVAC) systems. For gas furnace heating systems, the apparatus and methods include energizing the blower fan from a lower fan speed used for heating by the furnace-fan controller to the high-speed used for cooling by the fan controller after fan-on delay time P1 to increase delivered heating capacity, satisfy the thermostat sooner and save heating energy. For heat pump, electric resistance, and hydronic heating systems the apparatus and methods include energizing the fan relay after a short fan-on delay time P0 based on previous off-cycle duration P11. For all these HVAC systems, the apparatus and methods vary extended fan-off time delay P2 as a function of cool-source operational time P4 or heat-source operational time P3.

30 Claims, 25 Drawing Sheets

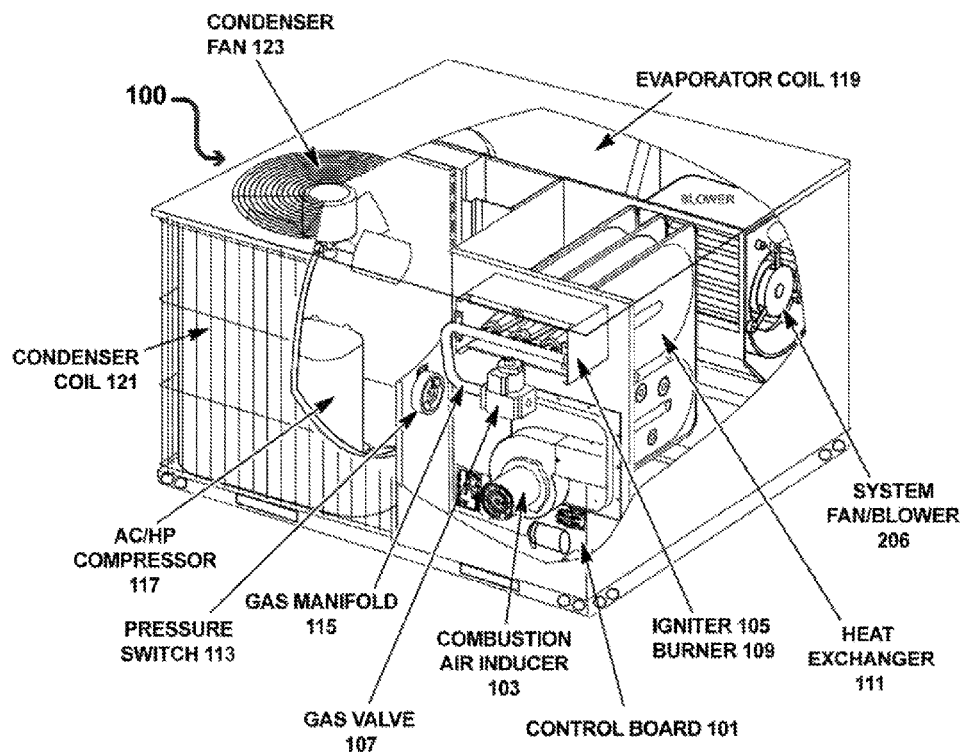
FIG. 1A
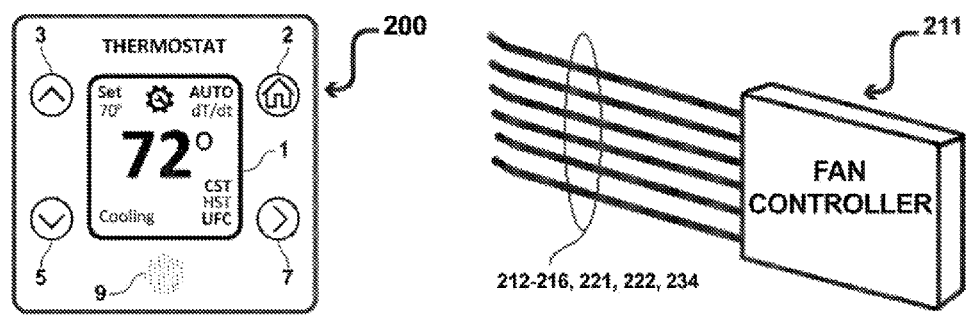
FIG. 1B
FIG. 1C

FAN CONTROLLER

CROSS-REFERENCE TO RELATED APPLICATIONS

The present application claims the priority of U.S. Provisional Patent Application Ser. No. 61/324,229 filed Apr. 14, 2010, and is a Continuation In Part of U.S. patent application Ser. No. 13/085,119 filed Apr. 12, 2011, and is a Continuation In Part of U.S. patent application Ser. No. 13/427,542 filed Mar. 22, 2012, and is a Continuation In Part of U.S. patent application Ser. No. 14/168,503 filed Jan. 30, 2014, and is a Continuation In Part of U.S. patent application Ser. No. 15/144,806 filed May 2, 2016, which applications are incorporated in their entirety herein by reference.

BACKGROUND OF THE INVENTION

The present invention relates to a Heating, Ventilation, Air Conditioning (HVAC) fan controller device and in particular to a circuit obtaining signals from thermostat or equipment control terminals and providing signals to control the ventilation fan and/or equipment.

Residential and commercial HVAC system power consumption in the United States accounts for 30% of average summer peak-day electricity loads, 14% of total electricity use, and 44% of total natural gas use, as reported by the US Energy Information Agency Residential and Commercial Energy Consumption Surveys from 2003 and 2009.

Known HVAC systems circulate cool or warm air to a conditioned space where the temperature is controlled by a thermostat to maintain thermal comfort conditions at a set point temperature typically within plus or minus 1 degree Fahrenheit (° F.). Fan controls for direct-expansion cooling systems typically turn ON the fan when the cooling apparatus is energized and turn OFF the fan when the cooling apparatus is de-energized. Similarly, fan controls for electric, hydronic, and Heat Pump (HP) heating systems turn ON the fan when the heating apparatus is energized and turn OFF the fan when the heating apparatus is de-energized. Fan controls for gas furnaces typically provide a temperature or fixed fan-on time delay after the furnace has been turned ON to allow time for the heat exchanger to heat up after the burner has been ignited. Fan controls for gas furnaces also provide a temperature or fixed fan-off time delay after the furnace has been turned OFF to recover some of the heating energy stored in the heat exchanger. The temperature-based fan delays either use bimetal switches or temperature sensors to turn on the fan when air leaving the heat exchanger is hot or turn off the fan when air leaving the heat changer is cool.

U.S. Pat. No. 6,684,944 (Brynes et al, 2004) and U.S. Pat. No. 6,695,046 (Brynes et al, 2004) disclose a variable speed fan motor control for forced air heating/cooling systems using an induction-type fan motor controlled by a controller circuit which is operable to continuously vary the speed of the fan motor during a start-up phase and a shut-down phase of the heating and/or cooling cycle. The controller circuit includes temperature sensors which are operable to control start-up and shutdown of the fan motor over continuously variable speed operating cycles in response to sensed temperature of the air being circulated by the fan. Brynes discloses control of the heater fan motor speeds to low, medium, or medium-high used for heating.

U.S. Pat. No. 4,369,916 (Abbey 1983) discloses a 120 VAC heating or cooling system fan override relay control to immediately start the blower to circulate air when the heating or cooling element turns on and continue to operate the override for a fixed timed interval by a time delay relay after the heating or cooling element turns OFF. U.S. Pat. No. 4,369,916 teaches starting the blower fan instantly when the heating element is turned on and not waiting for the heat exchanger to reach operational temperatures before turning on the ventilation fan at a low speed used for heating.

U.S. Pat. No. 6,464,000 (Kloster 2002) discloses is a temperature controlled device for a two-stage furnace: 1) low fan speed for low heat mode, and 2) higher fan speed for high heat mode. Kloster '000 teaches a two-speed fan for two-stage heating system. The higher fan speed is limited to available heater fan speeds and the high speed is only used for high heat mode.

U.S. Pat. No. 4,684,060 (Adams 1987) discloses a furnace fan control using a separate fan relay not integral to the furnace assembly and a timing circuit receiving a "burner on signal" produced when a thermostat, or some other circuit, senses burner operation and closes (which is delayed until 20 to 35 seconds after heat source activation). The '060 patent "burner on signal" is thus energized 20 to 35 seconds after the thermostat W terminal provides a signal to turn on the furnace. The delay in time is based on 15-seconds for an inducer blower to circulate air and purge the combustion chamber of gas, 5 to 10 seconds for the inducer blower to close a pressure switch and energize the hot-surface igniter and open the gas valve to ignite the burner, 5 to 10 seconds for the furnace to prove the burner has ignited. The '060 patent discloses a fixed fan-off time delay of 2 minutes based on 0 to 2 minutes of burner operation, a fan-off time delay of 2 to 4 minutes based on 2 to 4 minutes of burner operation, and a fixed fan-off time delay of 4 minutes for all burner operational times greater than 4 minutes. The fan-off time delay of the '060 patent is based on the principle that all of the available stored heat in the system is present when the heat exchanger reaches operational temperature (the '060 patent assumes this requires 4 minutes of operation), and no additional stored heat accumulated after the heat exchanger reaches operational temperature. For furnace operation less than 4 minutes, Adams '060 wastes energy and causes thermal comfort issues by circulating unwarmed air into the conditioned space before the heat exchanger is hot enough to provide satisfactory operating temperatures. Gas furnaces generally require at least 4 minutes of time for the heat exchanger to warm up and reach an operational temperature unless there is a fault causing short-cycling such as a blocked air filter or cracked heat exchanger. Therefore, the '060 patent '060 effectively only provides a fixed-fan-off time delay of 4 minutes since all furnaces require at least 4 minutes of time to reach operating temperature and store enough heat to support an extended fan-off time delay.

U.S. Pat. No. 5,248,083 (Adams 1993) discloses an adaptive furnace controller using analog temperature sensing to maintain a constant preselected heat exchanger temperature (i.e., 120 Fahrenheit) during operation and operates the fan time delay until a fixed lower heat exchanger temperature (i.e., 90 Fahrenheit) is reached. The adaptive furnace control regulates a controllable valve to adjust burner firing rate, thereby holding heat exchanger operating temperature constant to create constant ON/OFF times based on the previous cycle ON/OFF times of the furnace by regulating circulation blower speed. By increasing blower speeds to shorten "on" times or decreasing blower speeds to increase "on" times, and thereby achieving optimum cycle times.

ICM Controls, Inc. (www.icmcontrols.com) has manufactured an on-delay control and an off-delay control for HVAC circulating fans for more than 25 years. The ICM fan delay control has a single input and a single output and is connected between the fan "G" terminal of a thermostat and an HVAC fan relay used to energize the HVAC fan, and provides manually-selected fixed-time delays extending HVAC fan operation.

The California Energy Commission (CEC) published report number CEC-500-2008-056 in 2008 titled "Energy Performance of Hot Dry Air Conditioning Systems" (CEC '056). Table 23 on page 65 of the CEC '056 report provides laboratory test measurements of sensible Energy Efficiency Ratio (EER) and savings from a fixed 5-minute fan-off time delay and an end of compressor cycle (i.e., zero) time delay for compressor cycle operation of 5, 10, and 15 minutes. The report describes a fixed fan-off time delay of five minutes provided decreasing sensible EER values of 8.5, 8, and 7.75 for compressor operational times of 5, 10, and 15 minutes. Figure 48 on page 66 of the CEC '056 report provides test results of packaged unit latent recovery showing sensible EER versus time for tests with a fixed 10-minute fan-off time delay for compressor operation of 30, 5, and 10 minutes and a 20-minute fan-off time delay for compressor operation of 15 minutes. On page 66 regarding the third test at the 55-minute mark, the report states: "It is evident that the longer compressor on cycle requires a longer 'tail' to approach the efficiency achieved by the five minute compressor on cycle within a 10 minute 'tail.'" Graphically extrapolating the "tail" of the third test based on its slope to achieve a 9.6 sensible EER requires a 30-minute fan-off time delay. This might be theoretically possible under adiabatic laboratory conditions, but impossible to achieve under field conditions in actual buildings due to hot attics, duct losses, infiltration, solar radiation, and outdoor heat conduction through the building shell. The sensible EER is the ratio of total sensible cooling capacity measured in British thermal units (Btu) divided by total AC electric power measured in Watt-hours (Wh). While the CEC '056 report provides information which may hypothetically improve sensible cooling efficiency under adiabatic laboratory conditions, a need remains to optimize sensible cooling performance in actual buildings.

U.S. Pat. No. 5,142,880 (Bellis, 1992) discloses a solid state control circuit for use in connection with existing low-voltage thermostat terminals of a split-system or packaged HVAC system having a refrigerant system compressor and condenser with outdoor fan and an evaporator and gas-fired furnace or electrical heating elements with indoor blower fan. The '880 patent relates generally to systems for increasing the efficiency of Air Conditioning (AC) units by continuing the blower run time for a fixed time period after the compressor is turned OFF. Specifically, the '880 patent discloses an AC control unit comprising a low voltage room thermostat fan terminal, a low voltage compressor relay terminal, a timing circuit means, a sensitive gate triac, and a power triac. The '880 patent also discloses a method for controlling the on-off time of an indoor fan that is controlled by and associated with an indoor thermostat for a room AC system. The apparatus of the '880 patent is not programmable or adaptable. The delay is related to the supply voltage, which varies from system to system. Bellis provides constant current to the triac gates on the order of 6 milliamps. The total current draw is even higher than that when all components are included. Many systems have do not accommodate this much current draw through control relays without causing a humming noise which irritates the user. The Bellis design momentarily de-energizes the relay when switch from thermostat driven fan to his delay, which may cause relay chatter and excessive wear. Bellis does not provide for an override function if the unit fails.

U.S. Pat. No. 5,582,233 (Noto 1996) discloses a device used to extend the fan run time using a family of fixed time delays, and also periodically activates the fan during times the system is not calling for heating or cooling. The '233 patent requires the device to have access to the 24 VAC signals from the AC transformer. This requirement precludes the device from operating using connections limited to the thermostat since most thermostats do not have both the hot and neutral legs of the transformer. Household wiring only provides the hot (red) signal to the transformer.

U.S. Pat. No. 4,842,044 (Flanders et al., 1989) provides a heating and cooling control system that works by energizing a fan or other fluid circulating device to circulate fluid and effect thermal transfer of energy from the fluid to the spaces being heated and by de-energizing the circulating means at a selected time interval after de-energization of the heating and control system. The '044 patent also claims a heating control system comprising a switching means to effect energization of the fluid circulating means, a switching control means that is energizable in response to operation of the control circuit, and an additional circuit means that energizes the switching control means a selected time interval after de-energization of the heating system. The '044 patent is intended to increase the time the fan is turned on after a heating cycle to improve energy efficiency. The device draws power continuously from the gas solenoid through a 680 ohm resistor, and this method has proven to be problematic in practice. Too much current drawn in this way, can cause a humming noise in the gas valve and false operation. The '044 patent also enables the fan relay to activate the blower as soon as the gas valve is activated. This results in cool air being circulated throughout the home since the plenum is not sufficiently warm. Normal heat operation retards the blower until the temperature in the plenum reaches a preset operating temperature. The '044 patent also requires the addition of a relay circuit. This relay must be active the entire time the fan is to be OFF, creating a significant current draw even when the system is in not calling for heating or cooling. The '044 patent also describes fixed delays. It has no way to adapt the fan delay times either by user input or by the compressor run time. The delays provided by the '044 patent are also subject to the variations of the components selected. Additionally, although Flanders touches on the subject of how his invention works when the fan switch on the thermostat is moved from the AUTO position to the ON position, as described, there is no way for the fan to come on when the occupant requests.

U.S. Pat. No. 4,136,730 (Kinsey 1979) teaches of a device that intervenes with the controls coming from a thermostat and going to the heating/cooling system. The '703 patent discloses a fixed upper limit to the time that the compressor or heating source can be activated and then his invention adds additional time to the blower fan. This activity can increase the efficiency of an air conditioner system by allowing a certain amount of water to condense on the evaporator coil and then re-evaporating this water to cool the home. The amount of water collected varies based on the humidity of the ambient air. Having a fixed compressor run time with a fixed blower time can create a less efficient system than the current invention. In many environments, limiting the compressor run time and counting on evaporative cooling to reduce the home's temperature increases the time required to cool the home. In many cases, the desired set point may never be achieved.

U.S. Pat. No. 7,240,851 (Walsh 2007) discloses about a furnace fan timer. The device disclosed in the '851 patent is strictly a timer with a user programmable interval and duration. The device runs continuously in a never ending loop counting down minutes before operating the fan and then counting the minutes to keep the fan activated. The device disclosed in '851 patent is not compatible with air conditioner systems. Most thermostats connect the fan switch to the air conditioner compressor switch when operating in the automatic fan mode. In systems with air conditioners, the device disclosed in '851 patent activates the air conditioner compressor when it turns on the fan. This requires users to turn OFF the circuit breakers for their air conditioner systems when using his device. The device disclosed in '851 patent has two interchangeable wire connections.

U.S. Pat. No. 2,394,920, (Kronmiller 1946), discloses an HVAC thermostat device to control room temperatures using a pair of thermally responsive bimetallic strips mounted within a circular-shaped housing to control space cooling or heating equipment using low voltage signals.

U.S. Pat. No. 7,140,551, (de Pauw 2006) discloses a similar HVAC thermostat device with a simplified user interface and circular-shaped housing to control space cooling or heating equipment using low voltage signals.

European Patent EP0830649 B1 and U.S. PCT/US1996/009118 (Shah 2002) disclose an adaptive method for a setback thermostat using the intersection of the space temperature with a sloped recovery temperature line which approximates the change in temperature as a function of time during recovery of the temperature controlled space from a setback temperature, to determine the time at which recovery to the occupancy temperature should begin. The '118 patent application computes and updates the slope of the temperature recovery line based on the time between actually achieving the desired next set point temperature and the next set point time associated with the next set point. If the space heating or cooling load changes, recovery starts at a time more compatible with the current heating or cooling load in order to complete recovery at or near the desired time.

U.S. Pat. No. 4,172,555 (Levine 1979) discloses a thermostat controller system for a building heating and/or cooling system including a stored program of desired temperatures which are to be attained within the building at predetermined times within a repetitive time cycle. The '555 patent discloses a method to determine the optimum time to turn on the heating and/or cooling system to meet the next programmed temperature by turning the system on and then off for a short period of time and the temperature change which results in the building as a result of the transient operation is measured. The time at which the furnace must be switched on to attain the next programmed temperature is then determined as a function of the rate of temperature change as determined by the transient switching and the difference between the instantaneous and the future programmed temperature.

Based on the prior art a need remains to practically optimize sensible cooling and heating performance in actual buildings.

BRIEF SUMMARY OF THE INVENTION

The present invention addresses problems not addressed by the prior art.

Known gas furnace heating systems are controlled by thermostats which energize a W terminal to turn on the gas furnace which turns on an induced-draft combustion fan to clear the combustion chamber, followed by energizing a hot-surface igniter and opening a gas valve to ignite and prove a burner, followed by a temperature-based or fixed fan-on delay, to allow a heat exchanger to warm up followed by energizing a furnace-fan relay to turn on the heating ventilation fan at a low speed used for heating. Maintaining a lower heater ventilation fan speed results in increased heat soak within the heating system and the portion of the heat generated by the heat-source not delivered to conditioned space is lost to the environment. For a gas furnace, the amount of heat soak increases as the heating system is operated for longer periods of time leaving significantly more unrecovered energy and higher temperatures (i.e., 260 to 350 degrees Fahrenheit) in the heat exchanger after the ventilation fan is turned OFF. Known gas furnace fan controllers recover some of this energy by providing a temperature delay or a fixed-time delay to extend fan operation after the furnace has been turned OFF. Known fan-off delays leave a significant amount of unrecovered heating energy in the heat exchanger that is wasted and lost to the environment after the heat-source and the ventilation fan are tuned OFF. This decreases the heating system efficiency and increases operational time and energy use.

Known direct-expansion cooling systems are controlled by thermostats which turn on a cooling ventilation fan to a high speed used for cooling when the air conditioning compressor cool-source is energized and turn OFF the fan when the cool-source is de-energized. When the cool-source is de-energized there is a significant amount of cold refrigerant left inside the evaporator and cold water condensed on the evaporator coil which is not used to deliver sensible cooling capacity to the conditioned space. For a direct-expansion air conditioning system, the amount of recoverable sensible cooling capacity from the evaporator increases from zero to an upper limit as the cooling system is operated for longer periods of time after the ventilation fan is turned OFF. This sensible cooling capacity is lost to the environment after the cool source and the cooling ventilation fan are tuned OFF. This decreases the cooling system efficiency and increases operational time and energy use.

If an air conditioning system has faults such as dirty air filters, blocked evaporator/condenser coils, low refrigerant charge, iced evaporator, faulty expansion device, restrictions, non-condensables, or low thermostat setpoint, then longer compressor operation can result in less sensible cooling capacity available for recovery, short off-cycle times, and a decreasing fan-off time delay compared to a non-faulted air conditioning system.

Known heat pump, electric resistance, and hydronic heating systems are controlled by thermostats which turn on the heater ventilation fan when the heat-source is energized and turn OFF the fan when the heat-source is de-energized. Hydronic heating and cooling systems circulate a liquid from a central location to a heat exchanger in a Forced Air Unit (FAU). Known heat pump, electric resistance, and hydronic heating systems do not provide a fan-on delay. Nor do heat pump, electric resistance, and hydronic heating systems provide a fan-off time delay due to lower heat exchanger temperatures of 130 to 180 degrees Fahrenheit which are 31 to 63% less than gas furnace heat exchanger temperatures. During the start-up period there is no useful heating delivered by the fan which can waste fan energy and cause thermal comfort issues for building occupants. When the heat-source is de-energized there is a significant amount of heating energy left in the heat exchanger coil which is not used to deliver heating capacity to the conditioned space, and this heating capacity is lost to the environment after the heat-source and the heating blower fan are tuned OFF. This decreases efficiency and increases the heat pump, electric resistance, or hydronic heating system operational time and energy use.

If a heat pump heating system has faults such as dirty air filters, blocked evaporator/condenser coils, low refrigerant charge, iced evaporator/condenser, faulty expansion device, restrictions, non-condensables, or high thermostat setpoint, then longer compressor operation can result in less sensible heating capacity available for recovery, short off-cycle times, and a decreasing fan-off time delay compared to a non-faulted heat pump system.

If a hydronic heating system has faults such as dirty air filters, low water temperature, blocked heating coil, faulty circulation pump, or high thermostat setpoint, then longer operation can result in less heating capacity available for recovery, short off-cycle times, and a decreasing fan-off time delay compared to a non-faulted hydronic heating system.

The prior art does not suggest or disclose apparatus or methods for gas furnace heating systems to monitor a thermostat W terminal to determine heat-source operational time or energize a fan relay normally controlled by the thermostat G terminal in cooling mode and turn on the ventilation fan to a high speed used for cooling after a short time period when the heat exchanger has reached its maximum temperature to deliver more heating output to satisfy the thermostat temperature sooner and save heat-source energy. The prior art also does not suggest or disclose an extended variable fan-off time delay that increases from zero to a maximum and/or decreases to a minimum or zero as a function of heat-source or cool-source operational time and HVAC system type such as gas furnace, hydronic, electric resistance and heat pump systems based on measurements of signals present on thermostat or equipment terminals. The prior art also does not suggest or disclose how to use signals present on thermostat or equipment terminals to determine the HVAC system type such as gas furnace, hydronic, electric resistance and heat pump systems or heating or cooling mode of operation.

The prior art does not suggest or disclose apparatus or methods for monitoring and controlling an HVAC system economizer controller to optimize ventilation by providing an average outdoor airflow for the cooling or heating operational time period that is less than the outdoor airflow provided by the known economizer damper position, but greater than the minimum outdoor airflow required for the building occupancy. Nor does the prior art suggest or disclose apparatus or methods to minimize economizer damper position at the end of the cooling or heating cycle to reduce outdoor airflow and continue to operate the system fan/blower for an extended fan-off time delay as a function of cool-source or heat-source operational time to recover additional sensible cooling or heating capacity and deliver additional cooling or heating capacity to the conditioned space to improve energy efficiency, lengthen the off cycle time, and reduce energy use.

The present invention addresses the above and other needs by providing a fan controller comprising an AC-DC converter, a zero crossing detector, a signal conditioner, a microprocessor, a switching device, an optional user interface, and optional battery, and leads connected between HVAC thermostat terminals or an HVAC equipment terminal block and a system transformer, to provide efficient control of an HVAC fan. The fan controller microprocessor receives signals present on thermostat terminals or equipment terminals and determines forced air unit system type, mode of operation, and appropriate signal outputs to enable variable fan-on time delays, high speed fan operation during heating mode for applicable systems, and variable fan-off time delays to reduce energy use and improve energy efficiency of the HVAC system.

In accordance with one aspect of the invention the fan controller can determine the following forced air unit system type and modes of operation based on signal inputs to the microprocessor: 1) a direct-expansion air conditioning system in cooling mode, 2) a heat pump system in cooling mode, 3) a gas furnace system in heating mode, 4) a heat pump system in heating mode, 5) a hydronic coil system type in heating mode, and 6) an electric resistance heating system in heating mode.

In accordance with another aspect of the invention for direct-expansion air conditioning systems in cooling mode, the fan controller can energize a fan relay after a short fan-on time delay period P0 as a function of the previous HVAC system off-cycle time duration P11 to allow the refrigerant in the air conditioning evaporator to cool down before energizing the fan relay in order to avoid delivering undesirable warm air into the conditioned space to improve customer satisfaction and cooling efficiency compared to known fan control.

In accordance with one aspect of the invention for direct-expansion air conditioning systems in cooling mode, the fan controller can energize the fan relay for an extended variable fan-off time delay P2 after an air conditioning compressor has stopped operating where the variable fan-off time period P2 is a function of the air conditioning compressor cool-source operational time P4 as a function of signals present on thermostat or equipment terminals. The extended variable fan-off time delay period P2 increases sensible cooling from the evaporator coil to increase cooling capacity delivered to the conditioned space, improve overall efficiency, extend the off cycle time, and save energy.

In accordance with another aspect of the invention for a gas furnace system in heating mode, the fan controller can increase the heater blower fan speed from the low speed used for heating to the high speed used for cooling after a short delay time period P1 after the heat exchanger has reached its approximate maximum temperature to improve heat transfer, deliver more heating capacity and increase warm air movement and circulation in the conditioned space to satisfy the thermostat set point in less time to reduce heating system operation, and therefore reduce energy use and improve heating efficiency compared to known fan control.

In accordance with another aspect of the invention for a gas furnace system in heating mode, the fan controller can continue the HVAC blower fan operation for an extended variable fan-off time delay period P2 after the gas furnace heat-source has stopped operating. The variable fan-off time delay period P2 is determined as a function of gas furnace heat-source operational time P3 based on signals present on a thermostat or equipment W terminal. The extended variable fan-off time delay period P2 recovers additional heat from the heat exchanger to increase heating capacity delivered to the conditioned space, improve overall efficiency, extend the off cycle time, and saves energy.

In accordance with another aspect of the invention for heat pump, electric resistance, or hydronic systems in heating mode, the fan controller can energize a fan relay after a short fan-on time delay period P0 as a function of the previous HVAC system off-cycle time duration P11 to allow the hydronic heating coil to heat up before energizing the fan relay in order to avoid delivering undesirable cool air to the conditioned space to improve customer satisfaction and heating efficiency compared to known fan control.

In accordance with another aspect of the invention for heat pump, electric resistance, or hydronic systems in heating mode, the fan controller can energize a fan relay after an extended variable fan-off time delay period P2 after the air conditioning compressor or the heat-source turn-off allows recovery of additional cooling from an evaporator to increase sensible cooling capacity, or heat from a heat exchanger delivered to the conditioned space, thereby improving efficiency, extending the off cycle time, and saving energy.

In accordance with another aspect of the invention, the fan controller provides an extended fan-off time delay P2 based on monitoring of a thermostat "G" terminal (provides a fan relay signal) or a thermostat "Y" terminal (provides an AC compressor signal) or a thermostat "W" terminal (provides a heat-source signal) or a heat pump reversing valve "O" or "BR" terminal (provides a heating or cooling reversing valve signal).

In accordance with another aspect of the invention, the fan controller increases the sensible cooling or heating capacity delivered to the conditioned space and improves the application energy efficiency ratio of an air conditioning system or the heating efficiency of a heating system. In known HVAC systems, the HVAC fan is turned OFF when the compressor or the heat-source are turned OFF or shortly after the compressor or the heat-source are turned OFF. The cooling evaporator is typically very cold when the compressor is turned OFF and the heating coil or heat exchanger are very hot when the heat-sources are turned OFF. Continuing to run the HVAC fan for a period of time P2 after the AC compressor or the heat-source are turned OFF, as a function of AC compressor cool-source operational time P4 or heat-source operational time P3 based on signals present on thermostat or equipment terminals provides additional cooling or heating to the conditioned space. The additional cooling takes advantage of cold water which has condensed on the evaporator coils. By running the HVAC fan after the compressor has stopped, the cold water is evaporated and the system functions as an evaporative cooler, especially in hot dry climates. Additional heating takes advantage of very hot heating coil or heat exchanger temperatures. Increasing the delivered sensible cooling or heating capacity extends the off cycle time duration P11, reduce cool-source operational time P4 or heat-source operational time P3, and increase energy efficiency. The sensible cooling or heating capacity are responsible for satisfying the thermostat set point, which determines air conditioner or furnace operational time and energy use. Laboratory studies have shown the fan controller improves gas furnace, heat pump, or hydronic heating efficiency by 4 to 21 percent above systems having known fixed-time delays and 8 to 30 percent above systems having no time delay. For heating systems with degraded conventional temperature delay sensors, the fan controller improves heating efficiency by 9 to 30 percent. Laboratory studies have shown the efficiency fan controller improves cooling efficiency 4 to 23 percent above systems having known fixed-time delays and 7 to 41 percent above systems having no time delay.

In accordance with still another aspect of the invention, there is provided a fan controller apparatus connected by as few as three electrical leads to terminals of common HVAC thermostats or equipment terminal blocks. The fan controller uses the information from the thermostat to determine an extended time delay for the fan as a function of the run time of the compressor or a fan switch or the heat-source based on signals present on thermostat or equipment terminals. In one embodiment, all delay calculations are done autonomously using an algorithm as a function of AC compressor/fan run time or heat-source run time based on signals present on thermostat or equipment terminals. The delays improve HVAC unit sensible cooling and heating capacity, and energy efficiency.

In accordance with another aspect of the invention, there is provided a fan controller easily connected to existing HVAC systems. Many new air conditioning systems incorporate a fixed fan-off delay directly into their new products. Older air conditioning systems do not include any fan-off time delay. The fan controller allows the delay to be applied to the new and the older HVAC systems.

In accordance with still another aspect of the invention, there is provided a fan controller including a microprocessor, an AC/DC converter, a zero crossing detector, and one or more switching devices. The fan controller may be an external fan controller connected directly to existing HVAC thermostat terminals or equipment terminal leads with minimal need for rewiring. The fan controller receives power present in the HVAC thermostat leads or the 24 VAC HVAC equipment transformer. The fan controller can operate with a minimum of three leads which can be connected directly to the wiring presently connected to known HVAC thermostats or equipment terminal blocks. The fan controller generally only requires electrical connection to an existing 24 VAC transformer, and control terminals of the thermostat.

In accordance with yet another aspect of the invention, there is provided a fan controller including at least one switching device. Many suitable switching devices may be used to provide the requisite function. When the switching device is an electro-mechanical switch, the fan controller further can include a battery to power the microprocessor when the switch is closed, or receive 24 VAC power from the AC transformer. In one embodiment, the switching device is a triac. The fan controller selectively gates the triac for milliseconds, and in doing so, has a total current draw on the order of 100 microamps allowing use of the fan controller without an additional power source added to the HVAC system. The triac draws very little power when the heating/cooling system is not active since there is no relay to be controlled.

In accordance with still another aspect of the invention, the fan controller uses a 60 Hz electrical signal as a time base providing precise timing which does not vary from system to system or due to aging or temperature of the components.

In accordance with another aspect, there is provided a fan controller which controls the fan relay through the entire cycle without interruption, preventing relay chatter and excessive wear.

In accordance with still another aspect, the fan controller restores all thermostat connections to their original states when turned OFF, providing continued HVAC system function if the fan controller fails.

In accordance with yet another aspect, the fan controller does not limit the amount of time the compressor operates and thus maintains system efficiency. The fan controller relies on the thermostat to determine when the desired set point has been reached, and only then does it extend the fan run time. This ensures occupant comfort and provides for the efficiency gains during and at the end of the cycle.

In accordance with yet another aspect, the fan controller works with HVAC systems including both heating and air conditioning. Known HVAC systems require a user interface to enter information. The fan controller may contain a user interface, but does not require one. The fan controller measures the amount of time the compressor was operating and determines an efficient fan operational time automatically. The fan controller interrupts the signal from the thermostat to the fan relay and overrides the fan control. The fan controller can monitor the supply fan, the heat-source, or the compressor operation, and turn OFF the supply fan during unoccupied time periods to reduce unoccupied supply fan operational energy.

In accordance with another aspect of the invention, there is provided a fan controller using fan speeds native to the HVAC system. The fan controller does not require temperature sensors to control the fan and does not modulate the 120/240 volt signals to control fan speed.

BRIEF DESCRIPTION OF THE SEVERAL VIEWS OF THE DRAWINGS

The above and other aspects, features and advantages of the fan controller will be more apparent from the following more particular description thereof, presented in conjunction with the following drawings wherein:

FIG. 1A shows a Heating, Ventilation, and Air Conditioning (HVAC) system according to the present invention.

FIG. 1B shows a thermostat according to the present invention.

FIG. 1C shows a fan controller according to the present invention.

Corresponding reference characters indicate corresponding components throughout the several views of the drawings.

DETAILED DESCRIPTION OF THE INVENTION

Figure 2:
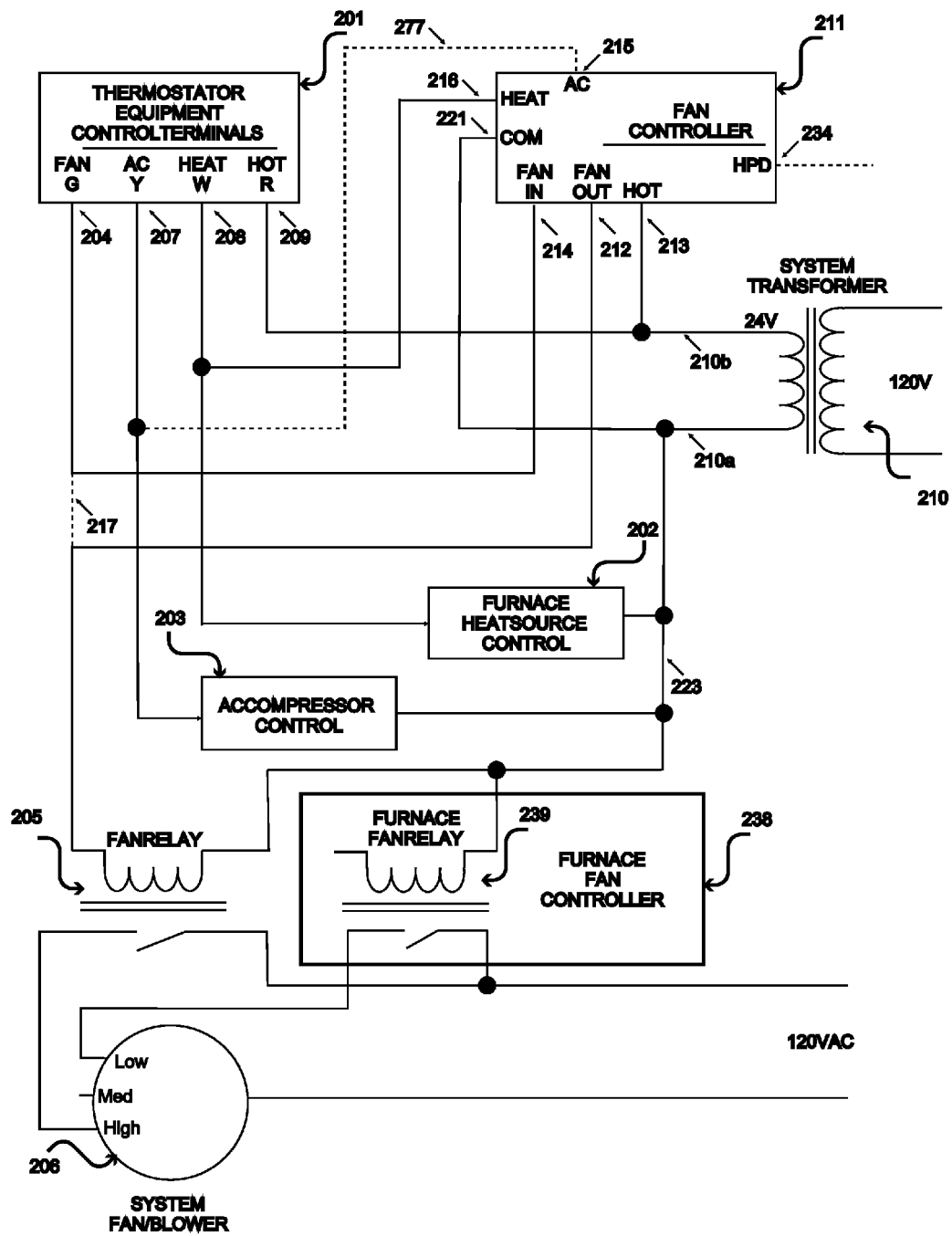
FIG. 2 shows a fan controller according to an embodiment of the present invention connected to a gas furnace HVAC system.

The following description is of the best mode presently contemplated for carrying out the present invention. This description is not to be taken in a limiting sense, but is made merely for the purpose of describing one or more preferred embodiments of the invention. The scope of the invention should be determined with reference to the claims.

FIG. 1A shows a Heating Ventilating and Air Conditioning (HVAC) systems 100, FIG. 1B shows a thermostat 200 used to control the HVAC system, and FIG. 1C shows a fan controller 211 which may be connected to a control board 101 of the HVAC system 100, or to the thermostat 200, to enable methods for efficiently controlling the ventilation fan on different types of HVAC systems 100 operating in heating and cooling modes, using existing signals present on terminals of an existing thermostat or equipment control terminals. The HVAC system 100 includes the control board 101 and depending on the HVAC system type other elements include: a combustion air inducer 103, an igniter 105, a gas valve 107, a burner 109, a heat exchanger 111, a pressure switch 113, a gas manifold 115, an AC/HP compressor 117, an evaporator coil 119, a condenser coil 121, a condenser fan (and motor) 123, and a system fan/blower 206.

The fan controller 211 includes input signal wires 213 through 216 are configured to receive signals from thermostat or equipment control terminals 201 (FIG. 2). The fan controller input signal wire 234 is configured to receive a hot signal from a thermostat R terminal 209 or a hot signal from a system transformer hot leg 210b (FIG. 2).

The thermostat 200 shown in FIG. 1B includes at least one of: 1) an internal fan controller embodied in methods implemented in software and hardware integral to the thermostat 200; and 2) an external fan controller 211 installed in the wall behind the thermostat 200. The thermostat 200 includes a display 1, a home button 2, an up button 3, a down button 5, a screen button 7, and an occupancy sensor 9. The thermostat 200 display 1 shows other embodiments of the invention including a maintenance symbol (cog with a wrench inside) to indicate maintenance is required, a Cooling Satisfaction Time (CST) symbol indicating a method used to calculate a fan-off time delay P2 as a function of the measured cool-source operational time P7 based on CST, a Heat Satisfaction Time (HST) symbol indicating a method used to calculate a fan-off time delay P2 as a function of heat-source operational time P9 based on HST, and a rate of change of temperature with respect to time (dT/dt) that is compared to an off-cycle rate of change of temperature with respect to time dT/dt-off to calculate a fan-off time delay P2. The thermostat 200 display 1 also shows an Unoccupied Fan Controller (UFC) symbol indicating an occupancy sensor 9 and a UFC diagnostic method are active. The UFC indicates an embodiment wherein the thermostat 200 monitors the fan signal and in the absence of an occupancy signal, cool-source signal or heat-source signal, in this embodiment the thermostat 200 de-energizes the G terminal connected to fan relay 205 and turns off the system fan/blower 206 after a minimum fan-only time period to save energy when the fan has been accidentally left on by itself.

The fan controller 211 includes unique features to receive electric power and determine an HVAC system type and a heating or a cooling mode of operation. Based on the HVAC system type and mode of operation, the fan controller 211 monitors signals on the thermostat or equipment control terminals 201 to determine an extended fan-off time delay P2 as a function of heat-source operational time P3 or cool-source operational time P4.

The fan controller 211 determines HVAC system type and heating or cooling mode of operation, for direct-expansion air conditioning systems and gas furnace, heat pump, electric resistance, and hydronic heating systems. For gas furnace heating systems, the apparatus and methods include energizing the heater blower fan from the low speed used for heating to the high speed used for cooling after delay time period P1 to deliver more heating output to satisfy the thermostat sooner and save heat-source energy. For heat pump, electric resistance, and hydronic heating systems, the apparatus and methods include energizing the fan relay after a short fan-on time delay P0 as a function of the previous HVAC system 100 off-cycle time duration P11. For each specific HVAC system 100 type and cooling or heating mode of operation, the apparatus and methods uniquely vary the extended fan-off time delay P2 as a function of air conditioning compressor cool-source operational time P4 or heat-source operational time P3 based on signals present on thermostat or equipment terminals. For a gas furnace, the extended fan-off delay time P2 is increased when the heat-source operational time P3 increases based on signals present on thermostat or equipment terminals. For heat pump, hydronic, or electric, resistance heating systems the extended fan-off delay time P2 is decreased when the heat-source operational time P3 increases based on signals present on thermostat or equipment terminals due to lower outdoor air temperatures and increased heating loads which reduce the temperature increase delivered by heat pump, hydronic, or electric, resistance heating systems. Heat pump heating capacity and temperature rise are directly proportional to outdoor air temperature. Lower outdoor air temperatures cause longer heat pump operation and less heat available to support an extended fan-off time delay. Hydronic heating coils receive hot water from water heaters. Low outdoor air temperatures cause longer hydronic heater operation and the water heater cannot keep up with demand causing lower water heating supply temperatures which cause less heat available to support an extended fan-off time delay. Electric resistance heating elements are ineffective at storing heat and with longer operation due to cold weather less heat is available to support an extended fan-off time delay.

The fan controller 211 apparatus and methods may be incorporated within a thermostat 200 or incorporated into an HVAC system 100 such as a control board 101 or incorporated into an HVAC system 100 with an economizer to perform the fan controller 211 methods disclosed herein.

An embodiment of the thermostat 200 of the present invention may provide variable fan-off time delays as a function of current or previous cool-source or heat-source operational times and off-cycle times based on signals present on thermostat or equipment control terminals 201. A variable fan-off time delay may also be based on the thermostat temperature rate of change with respect to time (dT/dt) using a resistance temperature detector (RTD) or other type of temperature sensor (see FIG. 1B). Accurate measurements of the dT/dt during the off-cycle could be used as a proxy for the cooling or heating load during the off-cycle. For cooling, the thermostat can extend the variable fan-off time delay as long as the current dT/dt is less than a previous cooling off-cycle dT/dt. For heating, the thermostat can extend the variable fan-off time delay as long as the current dT/dt is greater than a previous heating off-cycle dT/dt.

An embodiment of the thermostat 200 of the present invention may provide a variable fan-off time delay as a function of the time required for the cooling or heating apparatus to satisfy the thermostat temperature (see FIG. 1B). The Heating Satisfaction Time (HST) is defined as the time required for the heating apparatus to increase the thermostat temperature from the setpoint minus the differential to the setpoint plus the differential. The Cooling Satisfaction Time (CST) is defined as the time required for the cooling apparatus to decrease the thermostat temperature from the setpoint plus the differential to the setpoint minus the differential. The Off Time (OT) is the time between heating or cooling cycles. The cooling fan-off time delay is a function of the CST and OT and the heating fan-off time delay is a function of the HST and OT. Long CST or HST combined with short OT indicate a faulted system where the fan-off time delay decrease with increasing CST and HST. Short CST or HST and long OT indicate a non-faulted system where the fan-off time increases with increasing CST or HST. For hydronic and heat pump heating systems, the fan-off time delay generally increases from zero to a maximum and then decreases to a minimum or zero as a function of HST and OT. For gas furnace heating systems, the fan-off time delay generally increases from zero to a maximum and then decreases slowly to a minimum as a function of HST and OT. For direct-expansion air conditioning systems, the fan-off time delay generally increases from zero to a maximum and then decrease to a minimum or zero as a function of CST and OT.

An embodiment of the thermostat 200 of the present invention may improve efficiency and reduce short-cycling losses by varying the cooling or heating operational time based on calculating the current thermostat satisfaction time equal to the difference between thermostat temperature and setpoint temperature plus default differential divided by dT/dt, and if thermostat satisfaction time is less than the optimal steady-state efficiency operational time for cooling or heating, then the thermostat continues to operate the cooling or heating until the optimal steady-state efficiency operational time has been reached. If the thermostat differential to end cooling or heating operation is increased, then the thermostat differential to begin cooling or heating operation is proportionately increased to maintain a consistent setpoint. If the cooling or heating operational time is considerably longer than an optimal steady-state cooling or heating operational time greater than an upper limit of continuous operation (i.e., greater than 1.5 hours) or short-cycling (i.e., less than or equal to 5 minutes operation), then the thermostat displays a maintenance symbol (cog with a wrench inside) to indicate maintenance is required for dirty air filter, dirty or blocked evaporator or condenser coil, low refrigerant charge, excess outdoor air, duct leakage, restriction, non-condensables, faulty contactor or capacitor, or other fault.

An embodiment of the thermostat 200 of the present invention may optimize cooling or heating energy efficiency and operational time by varying the thermostat temperature differential based on the current dT/dt times the difference between a minimally optimal efficiency operational time and the current operational time. If the thermostat differential to end cool- or heat-source operation is increased, then the thermostat differential to begin cool- or heat-source operation is proportionately increased to maintain a consistent setpoint. This embodiment provides the same cooling or heating setpoint as a known thermostat, but the temperature differential varies to optimize cool-source or heat-source energy efficiency.

An embodiment of the thermostat 200 of the present invention may provide a variable fan-off time delay based on the current dT/dt being less than a previous cooling off-cycle dT/dt. For heating, the thermostat can extend the variable fan-off time delay based on the current dT/dt being greater than a previous heating off-cycle dT/dt. The embodiment may also provide a decreasing fan-off time delay if the cool- or heat-source operational time is greater than a maximum and the off-cycle time is less than a minimum threshold to adjust the fan-off time delay to account for faults that might reduce cooling or heating capacity and efficiency resulting in less cooling or heating energy available for recovery during the fan-off time delay.

Figure 20:
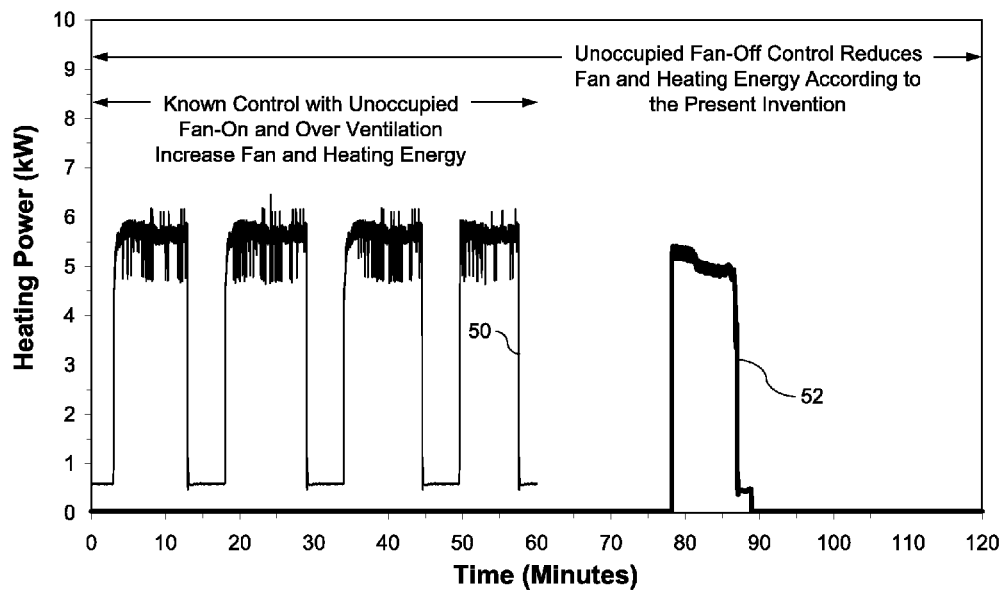
FIG. 20 shows a graph of total heating system power (kW) versus time of operation for a known fan control with constant fan operation during unoccupied periods of time causing over ventilation, constant fan power, and increased heating power consumption and a graph showing unoccupied fan-off control reduces fan and heating power consumption according to an embodiment of the present invention.
Figure 21:
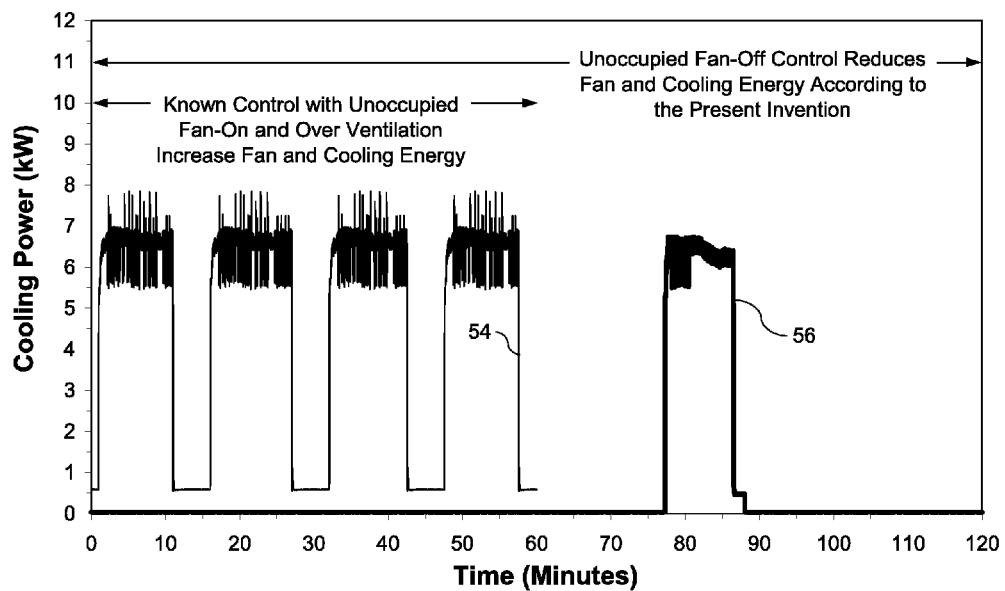
FIG. 21 shows a graph of total cooling system power (kW) versus time of operation for a known fan control with constant fan operation during unoccupied periods of time causing over ventilation, constant fan power, and increased cooling power consumption and a graph showing unoccupied fan-off control reduces fan and cooling power consumption according to an embodiment of the present invention.

An embodiment of the fan controller 211 monitors the fan signal and in the absence of a cool-source or heat-source signal, the fan controller 211 de-energizes the fan relay 205 and turns off the system fan/blower after a minimum fan-only time period to save energy when the fan has been accidentally left on by itself (see FIGS. 20 and 21).

An embodiment of the thermostat 200, monitors the fan signal and in the absence of an occupancy signal, cool-source signal or heat-source signal, the thermostat 200 de-energizes the G terminal connected to fan relay 205 and turns off the system fan/blower 206 after a minimum fan-only time period to save energy when the fan has been accidentally left on by itself.

An embodiment of the thermostat 200 of the present invention may maintain a heat pump reversing valve position continuously throughout both the compressor operational time and fan-off time delay for cooling and heating mode of operation to ensure maximum energy recovery from the heat pump indoor coil. Known thermostats do not maintain a heat pump reversing valve position continuously throughout the compressor operational time and fan-off time delay and which can cause a loss of cold refrigerant stored in the evaporator at the end of the compressor operational cycle and less cooling energy available to recover during the fan-off time delay period (see FIG. 22).

For HVAC systems 100 with economizers, an embodiment of the present invention may use wireless communication technology to receive a demand reduction signal from a system operator and implement a peak demand reduction method by partially or completely closing economizer dampers during a peak demand event to reduce cooling or heating loads to reduce energy consumption. The degree of closing may be determined based on the quantity of outdoor airflow delivered by the HVAC economizer dampers during normal operational time.

For HVAC systems 100 with economizers, an embodiment of the fan controller 211 may also monitor economizer operation to determine when it is advantageous to partially or completely close the economizer dampers during normal operation to deliver a required minimum amount of outdoor airflow to satisfy indoor air quality requirements and also deliver more sensible cooling or heating capacity to satisfy the thermostat sooner and reduce energy use.

For HVAC units with economizers, an embodiment of the fan controller 211 may also monitor cool-source and heat-source operational time and partially or completely close the economizer dampers at the end of the cool-source or heat-source operational time and implement a fan-off time delay with the economizer dampers closed to recover additional sensible cooling or heating capacity and deliver additional cooling or heating capacity to the conditioned space to improve energy efficiency, lengthen the off cycle time, and reduce energy use.

FIGS. 2-6 show the fan controller 211 connected to various HVAC systems 100 including gas furnace HVAC system with direct-expansion air conditioning, hydronic HVAC system with direct-expansion air conditioning, electric resistance HVAC system with direct-expansion air conditioning, or heat pump HVAC system with direct-expansion air conditioning. The fan controller 211 receives low-voltage signals from the thermostat or equipment terminals 201 and determines the system type, mode of operation, and appropriate low-voltage fan output signal 212 to control the fan relay 205 and the system fan/blower 206. The fan controller 211 enables variable fan-on time delays, high speed fan operation during heating mode for applicable systems, and variable fan-off time delays in cooling and heating mode to reduce energy use and improve energy efficiency of HVAC systems 100. The fan controller 211 receives the low-voltage fan signal on a thermostat "G" terminal 204 to the fan signal input 214. The fan controller 211 receives the Air-Conditioning (AC) or Heat Pump (HP) compressor cool-source signal on a thermostat "Y" terminal 207 to the fan controller AC signal input 215. The fan controller 211 receives the heat-source signal on a thermostat "W" terminal 208 or the HP reversing valve signal on a thermostat "O" terminal 235 or "BR" terminal 236 to the fan controller heat signal input 216. The fan controller receives the Heat Pump Detection (HPD) signal input 234 from the system transformer Hot leg 210b when connected by a wire 265 or connected by a wire with a diode 275 to control the fan relay 205 and system blower/fan 206 for a heat pump system.

FIG. 2 shows the fan controller 211 connected to a gas furnace HVAC system 100 with AC compressor control 203 for direct-expansion cooling and a furnace heat-source 202 for heating. The fan controller 211 includes the following low-voltage signal inputs connected to existing thermostat or equipment control terminals 201, a low-voltage signal output to control a fan relay 205, and a hot and common connection to receive power:

1) Fan signal "G" on terminal 204 transmits voltage signals to the fan controller 211 through fan input lead 214;

2) optional cooling signal AC "Y" on terminal 207 transmits voltage signals to the fan controller 211 through AC input lead 215 (indicated by dashed line 277);

3) heat-source signal HEAT "W" on terminal 208 transmits voltage signals to the fan controller low-voltage heat-source or HP reversing valve signal input 216;

4) system transformer 210 common 24 VAC signal is connected to the fan controller 211 through Hot input lead 221;

5) system transformer Hot "R" on terminal 209 is connected to the fan controller 211 by Hot lead 213;

6) an optional Heat Pump Detection (HPD) input lead 234 is shown on fan controller 211 with a dashed line to enable connection to the Hot leg 210b to enable control of a fan relay 205 and system blower/fan 206 for a heat pump system (see FIG. 5 and FIG. 6); and 7) fan controller fan signal output 212 connected to fan relay 205 to control system fan/blower 206.

FIG. 2 shows a dashed line 217 where the original thermostat fan signal wire to the fan relay 205 has been disconnected in order to route this signal to the fan controller 211 and transfer control of the fan relay 205 to the fan controller 211. The fan Controller 211 transmits a low-voltage control signal to the fan relay 205 through fan Controller 211 fan signal output 212.

FIG. 2. also shows the furnace fan controller (238) supplied by the manufacturer of the gas furnace HVAC equipment which is used to control the high voltage furnace fan relay (239) to control the system fan/blower (206) at the low-speed when the gas furnace HVAC system 100 is operating in heating mode. Blower fans typically have multiple speed taps to change the fan speed depending on the system external static pressure and design airflow and cooling or heating capacity requirements. For a gas furnace system in heating mode, the furnace fan controller (238) typically provides a short fan-on time delay for the furnace heat exchanger to reach operational temperatures before energizing the low-speed relay (239) to turn ON the blower fan (206) in the low speed used for heating. The furnace blower controller fan-on time delay is typically based on a timer or temperature sensor. The fan relay (205) is used by the thermostat for cooling and fan-only operation and is typically connected to the high-speed tap of the system fan/blower (206) to operate the fan in the high-speed used for cooling. The fan controller (211) provides a 24 VAC low-voltage signal output (212) to interrupt the low-voltage fan signal on a thermostat "G" terminal (204) to the high-speed relay (205) to control the high-speed relay (205).

Figure 3:
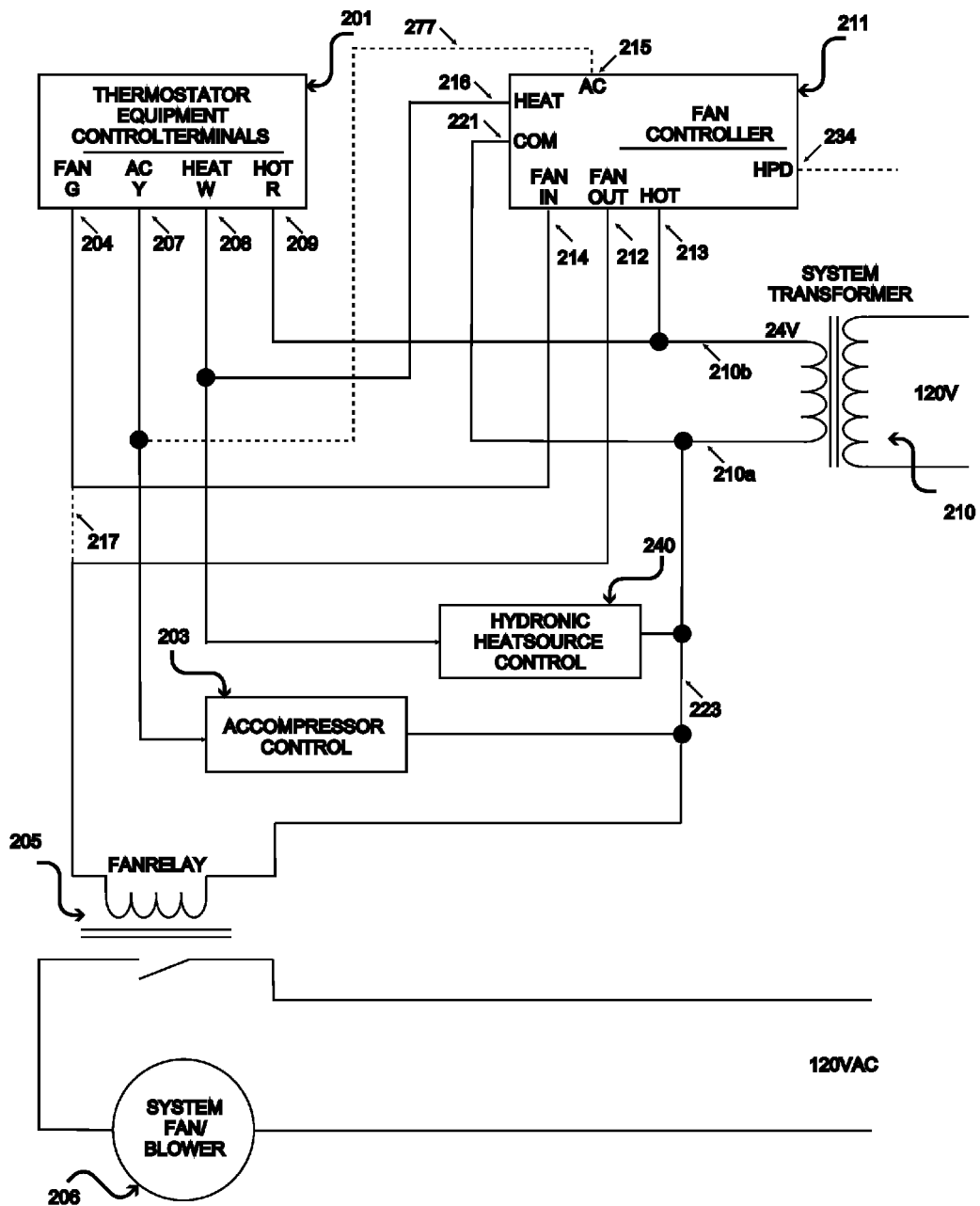
FIG. 3 shows a fan controller according to an embodiment of the present invention connected to a hydronic HVAC system.

FIG. 3 shows the fan controller 211 connected to a hydronic HVAC system 100 with AC compressor control 203 for direct-expansion cooling and hydronic heat-source 240 for heating. The fan controller 211 shown in FIG. 3 provides all the same low-voltage signal inputs, output, power connections, and dashed line 217 shown in FIG. 2. FIG. 3 does not show a furnace fan controller (238) or furnace fan relay (239) since hydronic HVAC systems typically only have one fan relay (205). If a hydronic HVAC system 100 has a separate fan controller (238) then the fan control functionality shown in FIG. 2 may apply.

Figure 4:
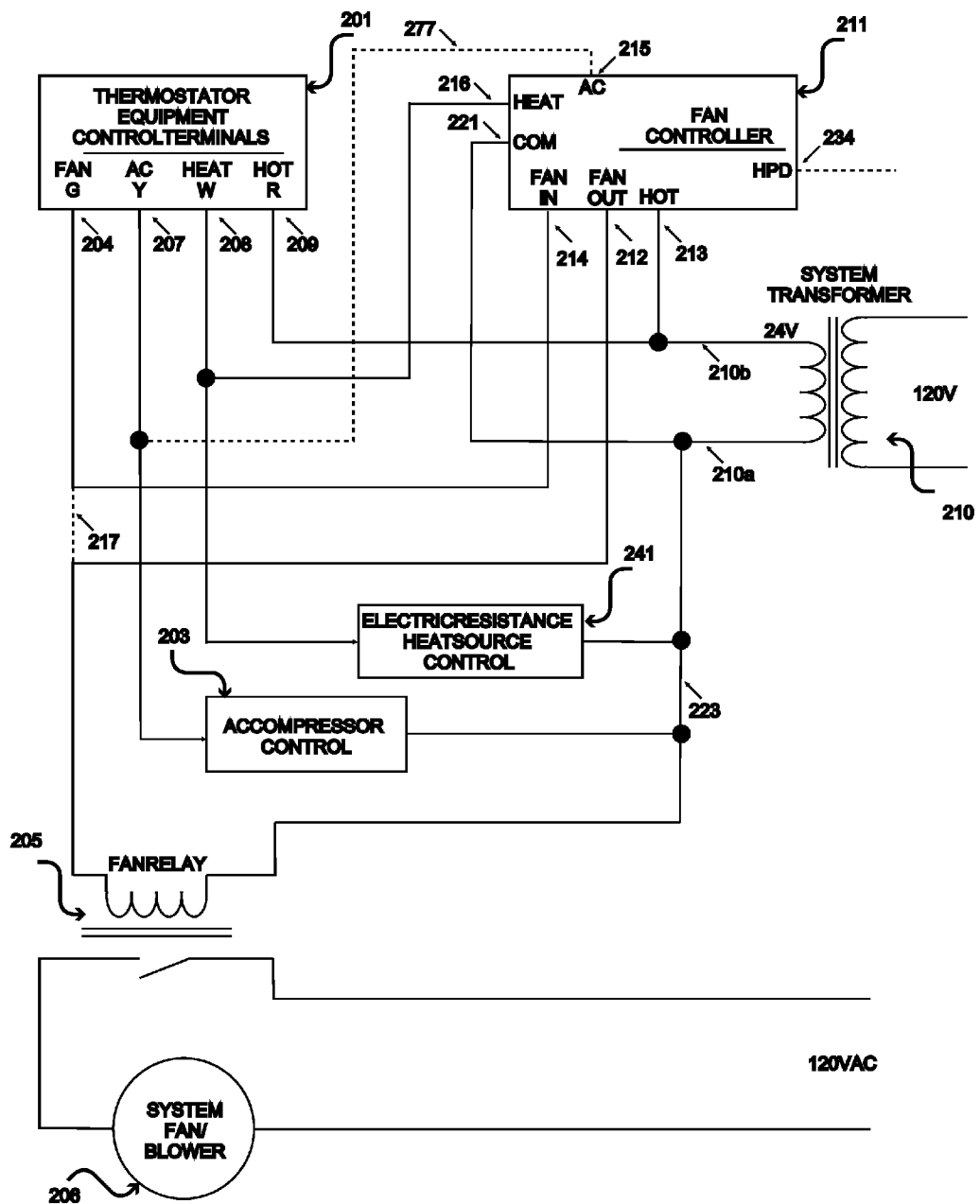
FIG. 4 shows a fan controller according to an embodiment of the present invention connected to an electric resistance HVAC system.

FIG. 4 shows the fan controller 211 connected to an electric resistance HVAC system 100 with AC compressor control 203 for direct-expansion cooling and electric resistance heat-source 241 for heating. The fan controller 211 shown in FIG. 4 provides all the same low-voltage signal inputs, output, power connections, and dashed line 217 shown in FIG. 2. FIG. 4 does not show a furnace fan controller 238 or furnace fan relay 239 since electric resistance HVAC systems typically only have one fan relay 205.

If an electric resistance HVAC system 100 had a separate fan controller (238) then the fan control functionality shown in FIG. 2 may apply.

Figure 5:
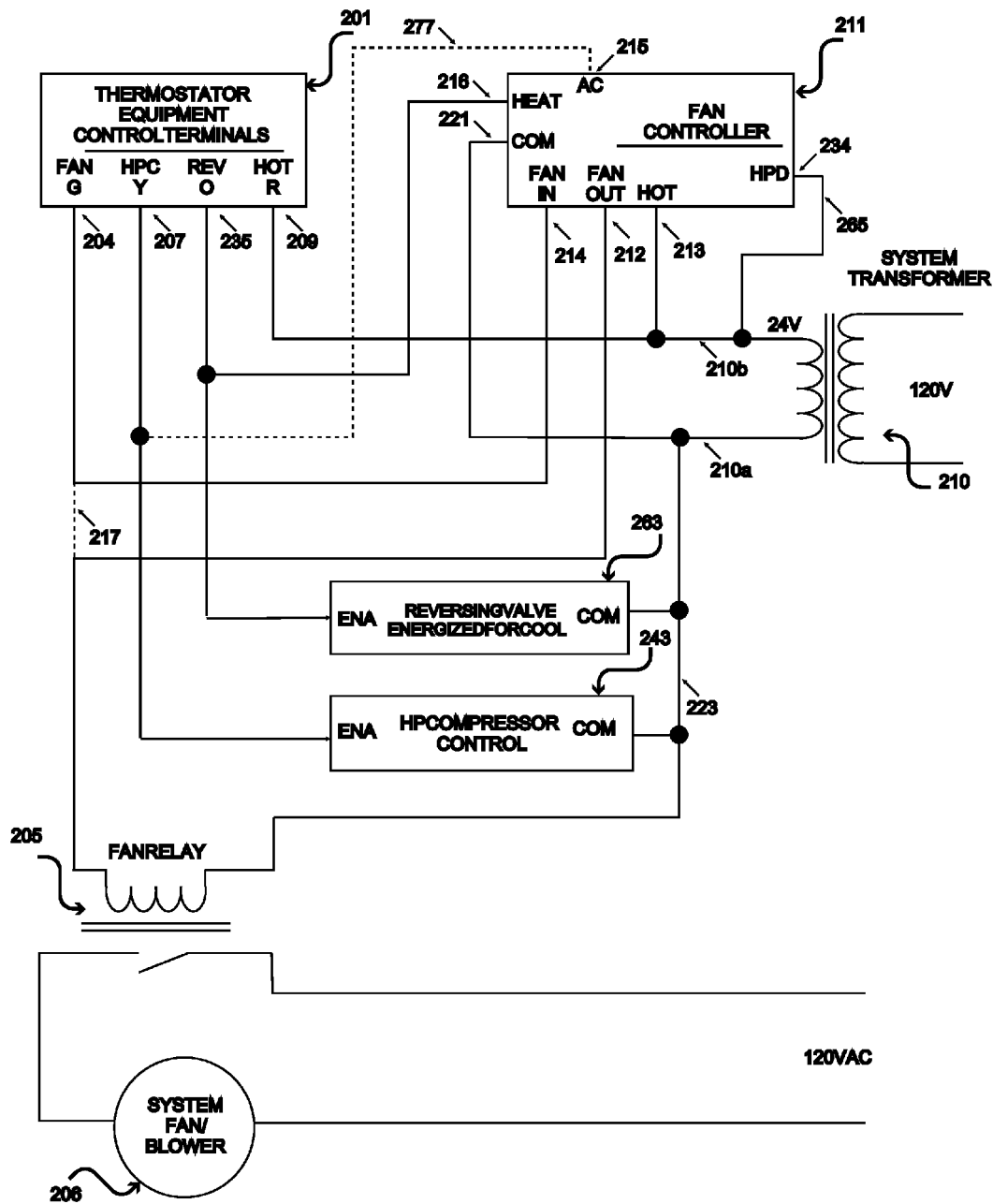
FIG. 5 shows a fan controller according to an embodiment of the present invention connected to a heat pump HVAC system with reversing valve energized for cooling.

FIG. 5 shows the fan controller 211 connected to a heat pump HVAC system 100 with AC compressor control 203 for direct-expansion cooling and heat pump reversing valve 263 energized for cooling. The fan controller 211 shown in FIG. 5 provides all the same low-voltage signal inputs, output, power connections, and dashed line 217 shown in FIG. 2. The reversing signal REV "O" on terminal 235 transmits voltage signals to the fan controller 211 through heat input lead 216. FIG. 5 shows a wire connection 265 between the system transformer Hot "R" on terminal 209 to the fan controller 211 HPD input (234) allows the fan controller to detect and control the fan relay 205 for a heat pump HVAC system 100 with a reversing valve energized in cooling mode. FIG. 5 does not show a furnace fan controller (238) or furnace fan relay 239 since heat pump HVAC systems typically only have one fan relay 205. If a heat pump HVAC system 100 had a separate fan controller (238) then the fan control functionality shown in FIG. 2 could apply.

Figure 11:
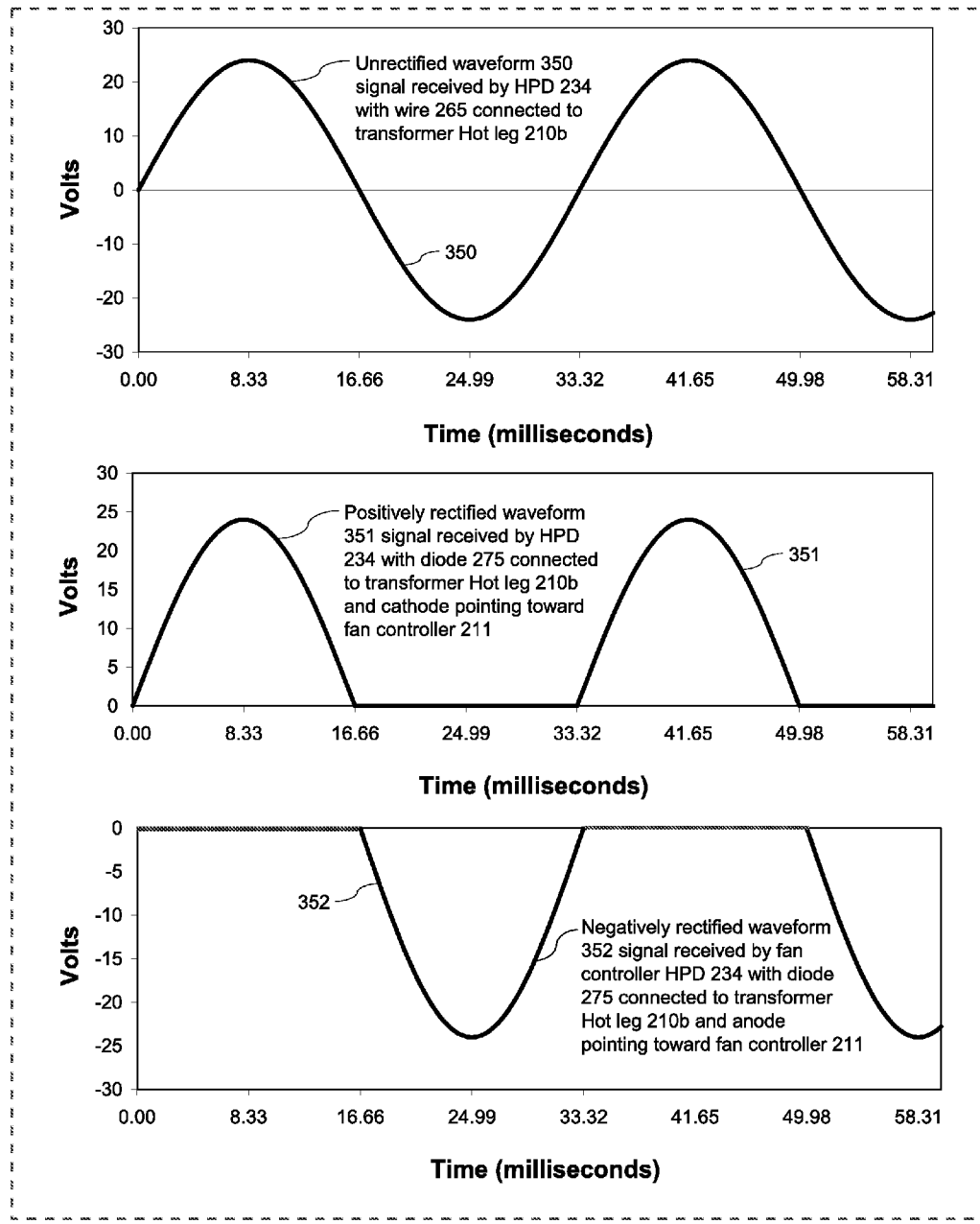
FIG. 11 shows three diagrams of the waveforms possible on fan controller Heat Pump Detection (HPD) signal input 234 used by the fan controller to detect the presence of whether or not the fan controller is connected to a heat pump and whether or not the heat pump reversing valve is energized for cooling or heating, according to the present invention.

FIG. 11 shows three diagrams of the waveforms possible on HPD input 234. The signal received by HPD 234 when connected by a wire 265 to system transformer Hot lead 210b is represented by waveform 350. This is an active unrectified low-voltage signal and current flows in both the positive and negative cycles. Waveform 351 represents the signal received by HPD 234 when there is a diode 275 connected between HPD 234 and the transformer hot lead 210b with the cathode pointing toward the fan controller 211. This waveform is positively rectified and current only flows in the positive cycle. Waveform 352 represents the signal received by HPD 234 when there is a diode 275 connected between HPD 234 and the transformer hot lead 210b with the anode pointing toward the fan controller 211. This waveform is negatively rectified and current only flows in the negative cycle.

Figure 6:
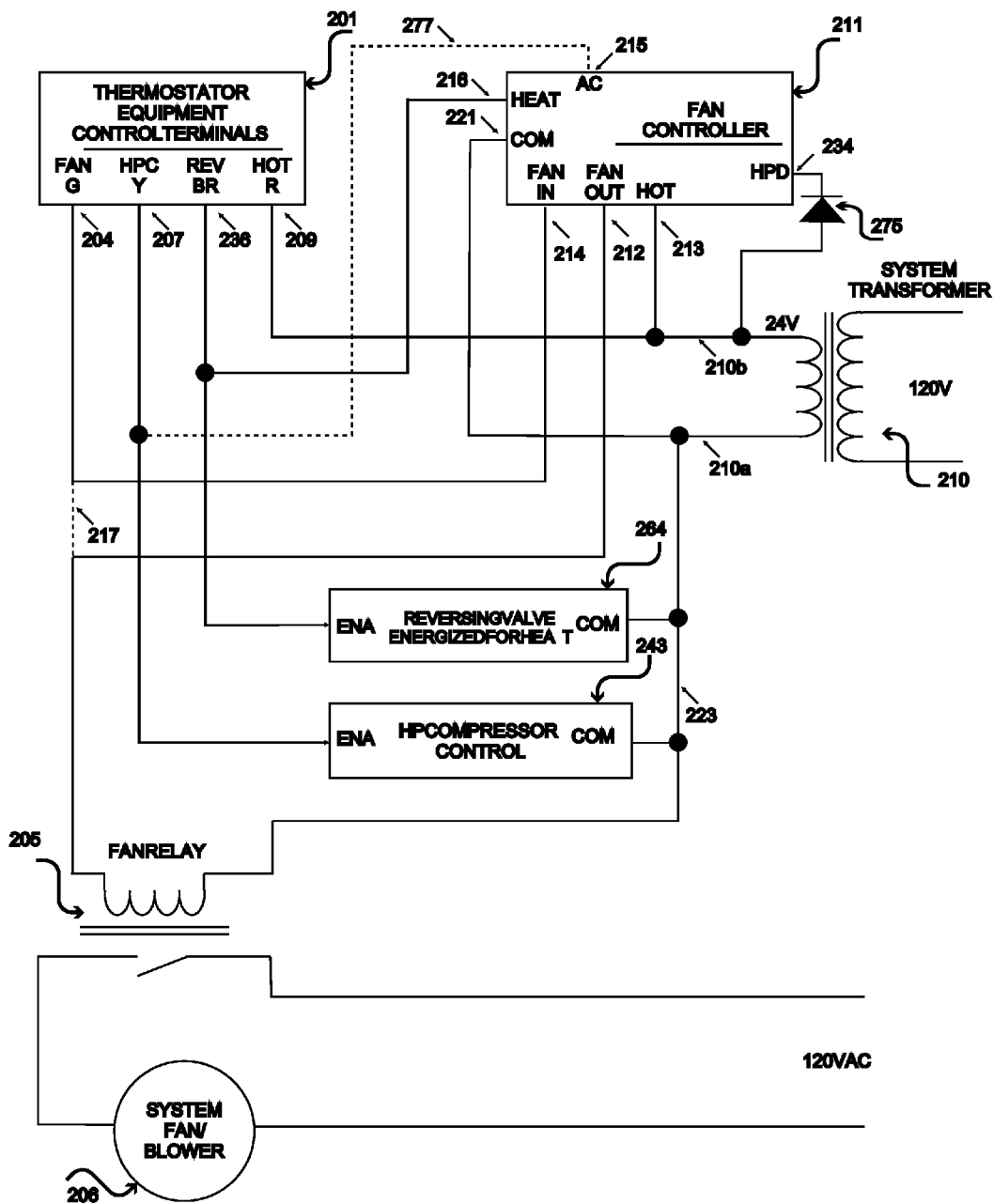
FIG. 6 shows a fan controller according to an embodiment of the present invention connected to a heat pump HVAC system with reversing valve energized for heating.

FIG. 6 shows the fan controller 211 connected to a heat pump HVAC system 100 with AC compressor control 203 for direct-expansion cooling and heat pump reversing valve 263 energized for heating mode. The fan controller 211 shown in FIG. 6 provides all the same low-voltage signal inputs, output, power connections, and dashed line 217 shown in FIG. 2. The reversing signal REV "BR" on terminal 236 transmits voltage signals to the fan controller 211 through heat input lead 216. The connection between the system transformer Hot "R" on terminal 209 to the fan controller 211 HPD lead 234 with a diode 275 allows the fan controller to detect and control the fan relay 205 and system blower/fan 206 for a heat pump HVAC system 100 with a reversing valve energized in heating mode. FIG. 6 does not show a furnace fan controller (238) or furnace fan relay (239) since heat pump HVAC systems typically only have one fan relay (205).

The diode 275 shown in FIG. 6 only allows current to flow to the fan controller 211 on positive cycles of the system transformer hot signal on terminal 209. By seeing current flowing only during the positive cycle and not on the negative cycle, the fan controller 211 is commanded to control the fan relay (205) for a heat pump system with reversing valve energized for heating mode. The dashed line 217 indicates where the original thermostat fan signal wire to the fan relay 205 has been disconnected in order to route this signal to the fan controller 211 input 214. The fan controller transmits a low-voltage control signal to the fan relay 205 through fan controller 211 signal output 212.

When installed on most gas furnace HVAC systems in heating mode, the fan controller activates the 24 VAC low-voltage signal output 212 which causes the high-speed relay 205 to drive the fan/blower 206 at the high-speed used for cooling. On some gas furnace HVAC systems the fan relay 205 on the OEM blower controller 238 might be connected to the low or medium speed tap on the system fan/blower 206 and the system fan/blower 206 then operates at the low or medium speed. To achieve optimal performance in gas furnace heating mode, the fan controller 211 can be configured to include a high-voltage relay to directly drive the high-speed tap of the fan/blower 206 and circumvent the OEM blower controller board 238 default fan speeds and operate the fan/blower 206 at the high-speed used for cooling after the time P1 has expired, and continue operating the fan/blower at high speed throughout the heat-source operational time P3 and the extended fan-off time delay period P2.

Figure 7:
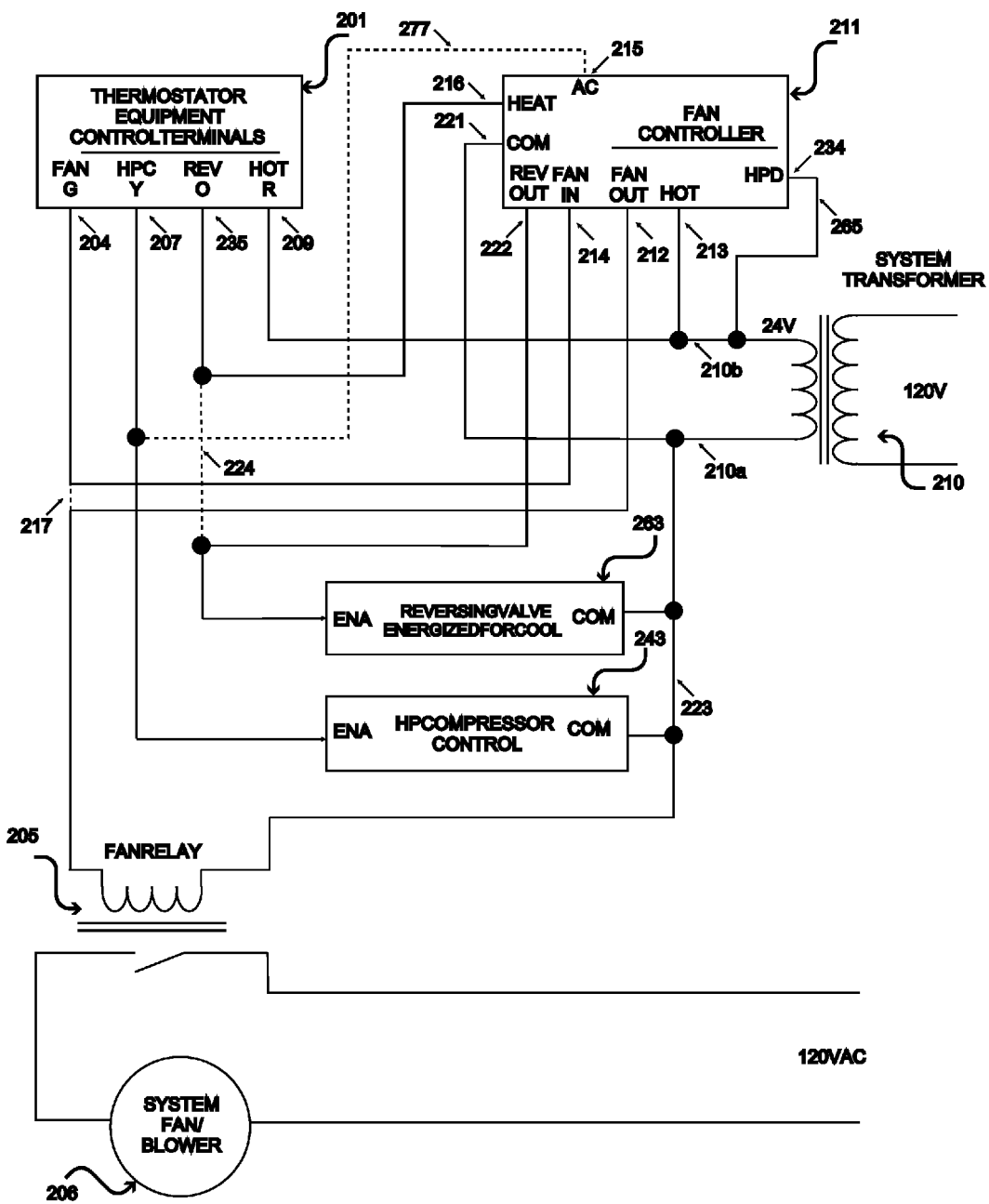
FIG. 7 shows a fan controller according to an embodiment of the present invention connected to a heat pump HVAC system with reversing valve energized for cooling.

FIG. 7 shows components of the fan controller used for a heat pump HVAC system 100 with reversing valve energized for cooling. The embodiment in FIG. 7 shows a dashed line 223 where the original thermostat REV signal 235 has been disconnected in order to route this signal to the fan controller 216 and transfer control of the reversing valve 263 to the fan controller 211 using fan controller output 222. The fan controller 211 transmits a low-voltage control signal to the reversing valve 263 through REV output 222 to maintain the same position for the reversing valve during the fan-off time delay period after the compressor turns off, to maximize energy recovery. Some heat pump thermostats or controllers de-energize the heat pump reversing valve 263 at the end of the HP compressor cooling cycle to equalize refrigerant system pressure. The optional fan controller REV output 222 energizes the reversing valve 263 for the entire duration of the fan-off delay time maximize sensible energy recovery from the heat pump. The fan controller 211 can perform a similar function for a heat pump with reversing valve energized in heating 264 by maintaining a low-voltage output signal to the fan controller REV output 222 during the fan-off time delay for heating.

Figure 8:
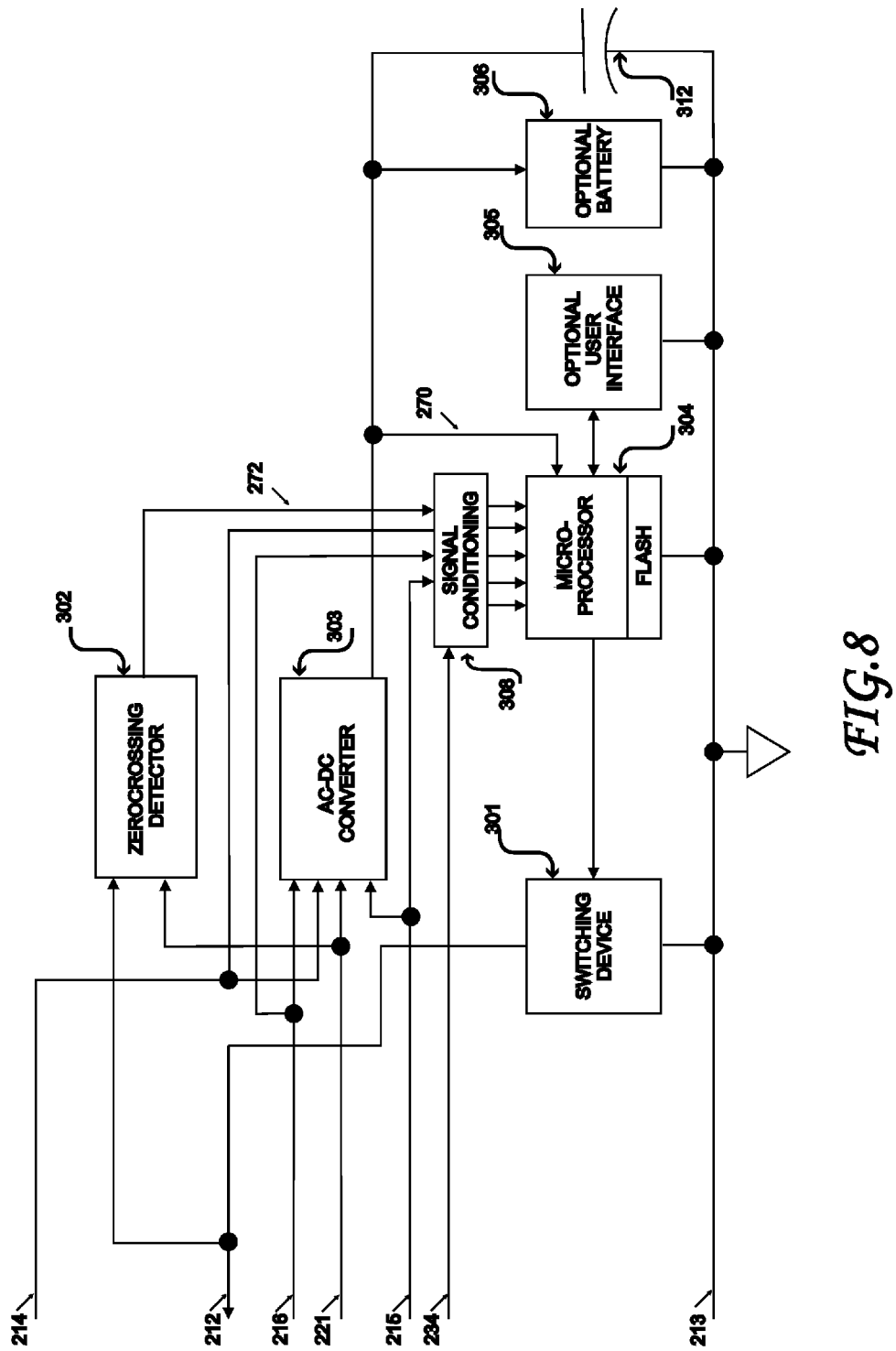
FIG. 8 shows elements of the fan controller according to an embodiment of the present invention for HVAC systems with direct-expansion air conditioning, gas furnace, heat pump, electric resistance, or hydronic heating.
Figure 9:
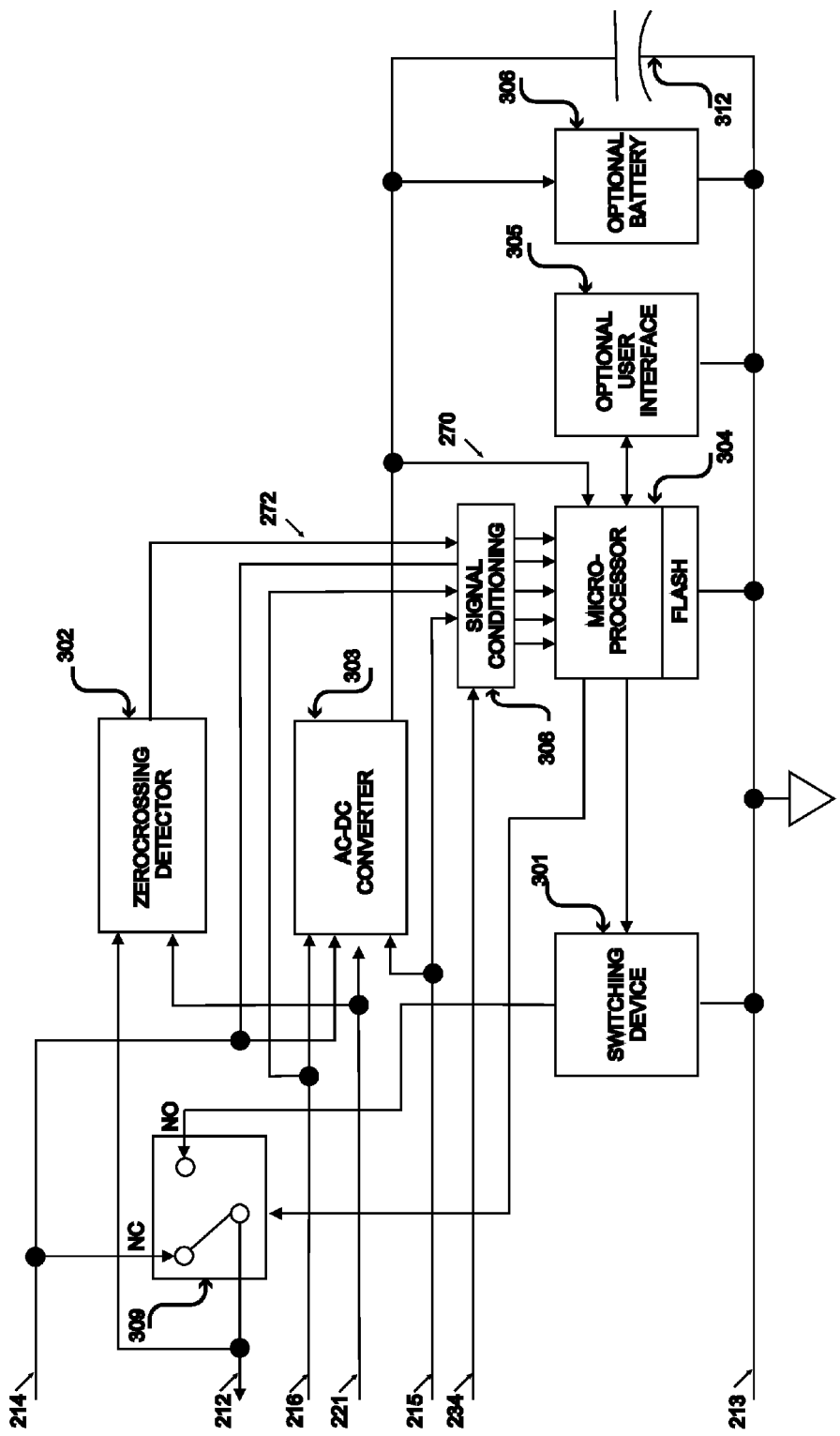
FIG. 9 shows elements of another embodiment of the fan controller according to the present invention with a normally closed relay 309 which connects the input lead 214 signal from the thermostat to the fan relay control 212 for HVAC systems with direct-expansion air conditioning, gas furnace, heat pump, electric resistance, or hydronic heating.

FIG. 8 shows components of the fan controller 211 used for systems with gas furnace, electric resistance, heat pump or hydronic heating. FIG. 9 shows components of another embodiment of the fan controller with a normally closed relay switch 309 which connects the input lead 214 signal from the thermostat to the fan relay control 212. When the switch 309 shown in FIG. 9 is present, if the fan controller 211 device fails, the FAN "G" 204 is connected to the fan relay 205 and the system performs as if the fan controller 211 was not in the control loop. In normal operation, when the fan controller 211 is controlling the fan relay 205, the relay switch 309 is enabled and the switching device 301 output is presented to the fan relay control signal 212.

The switch 301 acts as a direct control of the fan relay 205 and indirect control of the system fan/blower motor 206. It is indirect because the switch 301 controls the fan relay 205, and the fan relay 205 controls the high-voltage signals going directly to the system fan/blower motor 206. Switch 301 works for systems where the default fan speed is the high speed used for cooling. For systems where the default fan speed is the low or medium speed used for heating, a high-voltage switch allows the fan controller 211 to directly control the system fan/blower motor 206. A double-pole double-throw relay could be in place of switch 301. The normally closed contacts could connect the furnace fan control board output to the low speed tap on the system fan/blower 206. The normally open contacts could connect 120/240 VAC to the high-speed used for a cooling tap. For gas furnace heating systems, the microprocessor activates the relay at the end of time period P1 and the system fan/blower 206 is controlled by the fan controller 211 to go from the low-speed used for heating to the high-speed used for cooling after time P1. For air conditioning systems where the default fan speed is the low or medium speed, the fan controller microprocessor 304 activates the high-voltage switch for the system fan/blower 206 to operate at the high-speed used for cooling after the fan-on time delay P0 (if applicable), continue through the cool-source operational time P4 or heat-source operational time P3, and then continue through the extended fan-off time delay period P2. This provides increased cooling or heating capacity in order to satisfy the thermostat in less time and save energy. In this way, the fan controller 211 directly controls the system fan/blower speed, rather than indirectly as with switch 301 and fan relay 205.

The embodiments shown in FIG. 8 and FIG. 9 show an optional user interface 305 which may be used to configure the microprocessor 304 to provide fan controller control for a specific HVAC system 100 type. The user interface is generally optional because the fan controller apparatus is capable of determining system type and heating or cooling mode of operation based on signals received from thermostat or equipment terminals.

The fan controller 211 receives the following signal inputs from the thermostat:

fan input 214 from the thermostat "G" terminal 204;

AC compressor input 215 from the thermostat "Y" terminal 207;

heat-source input 216 from the thermostat "W" terminal 206 or from the thermostat "O" terminal 235 or thermostat "BR" terminal 236; and HPD mode input 234 from the thermostat "R" terminal 209 or the system transformer Hot 210b.

The fan controller 211 has a single output 212 which is the signal to enable the fan relay 205.

The signal inputs 214, 215, 216, and 234 and an output of the zero crossing detector 302 pass through a signal conditioning circuit 308 before being passed to the microprocessor 304. The signal conditioning circuit 308 shifts the level of the thermostat inputs to a level that does not harm the microprocessor 304. The microprocessor 304 is used to control switching devices 301 and 309. The microprocessor 304 also has an input from a zero crossing detector 302. This zero crossing detector 302 may monitor either the current feeding through the fan relay 205 via signal output 212 or a neutral leg 210b (see FIG. 2) of the system transformer 210. When monitoring the signal 212, which is normally an output of the Fan Controller 211 to the fan relay 205, the fan relay 205 has the leg opposite signal 212 tied to the neutral leg 210b of the system transformer 210. Current can flow from that neutral leg 210b, up through the fan relay 205 and into the Fan Controller 211 since the fan controller 211 ground is referenced to the hot leg 210b of the system transformer 210.

The zero crossing detector 302 then presents a zero crossing signal 272 to the microprocessor 304 which enables the microprocessor to determine when the system transformer signal input 221 passes above zero volts and below zero volts. This information is used to count cycles for timekeeping purposes and to determine when to activate the switching device 301. The zero crossing times are also required when the switching device 301 is a triac. To operate the triac as a switch, the triac must be fired at all zero crossing transitions.

The AC-DC converter 303 has inputs from the system transformer 221 as well as the thermostat signal outputs for heat-source enable signal 216, compressor enable signal 215, and fan enable signal 212. Any of these signals can be rectified in the AC-DC converter to provide DC power to the microprocessor 304 and to keep an optional battery 306 charged or supercapacitor 312.

The switching device 301 is controlled by the microprocessor 304 and connects the fan controller 211 input 213 to the fan relay control line 212 which in turn, energizes the fan relay 205. The output of switching device 301 is routed through the normally closed relay 309 which when operating properly is switched by the microprocessor 304 to the normally open position allowing a complete circuit from the switching device 301 to the fan relay control output 212.

There is also an optional user interface 305 which may be used to configure the microprocessor 304 to perform in an alternate manner. An optional battery 306 is also shown which could be used in the event that common wire 221 is not present and the switching device 301 is not a triac.

The wire 265 shown in FIG. 5 is connected from the thermostat "R" terminal 209 or the system transformer Hot 210b to the HPD input 234. A low-voltage signal on HPD input 234 is passed through the signal conditioning 308 element before being passed to the microprocessor. By nature of the zero crossing detector 302, the microprocessor 304 knows when thermostat signals should be above ground and below ground. If the HPD input 234 is not connected to the system transformer 210 as shown in FIG. 2, the microprocessor 304 detects a floating signal on HPD input 234 and performs like it is connected to a conventional HVAC system 100. If HPD input 234 is connected to system transformer 210b as shown in FIG. 5, then the microprocessor 304 detects the signal on HPD input 234 above and below ground (i.e., active in both cycles) and the fan controller detects a heat pump HVAC system 100 where the reversing valve "O" is normally energized in cooling mode.

The diode 275 shown in FIG. 6 is connected from the thermostat "R" terminal 209 or the system transformer Hot 210b to the HPD input 234. When connected with a diode 275 the HPD input 234 has a low-voltage signal during the positive cycle and a floating signal during the negative cycle because of the direction of the diode 275. The microprocessor 304 detects this state and the fan controller detects a heat pump HVAC system 100 where the reversing valve "BR" is normally energized in heating mode. Because the microprocessor 304 is powered by the AC to DC converter 303, using an AC signal, the system is free to define hot and neutral as the opposite of what the original installation intended. The fan controller 211 basically "floats" electronically and as a result is able to use the only wire coming to the thermostat (Hot) as a ground.

The microprocessor 304 performs several major functions. In terms of timing, the microprocessor 304 keeps track of seconds and minutes by either monitoring the output from the zero crossing detector 302, or by counting microprocessor clock cycles. Each positive zero crossing accounts for 1/60th of a second; therefore, sixty positive crossings occur each second. The seconds are then accumulated to measure the time of operation or non-operation. The negative crossings are also monitored to provide timing for the switching device 301.

The fan controller 211 draws power through the HVAC thermostat or equipment terminal block C common 223 of the 24 VAC transformer 210 (see FIG. 2 through FIG. 6). The switching device 301 could be standard relay type device, a reed relay or some other electro-mechanical device, and could also be a solid state device such as an FET switch or a triac. In the event that an electro-mechanical switch was used, either an optional battery is added to power the microprocessor 304 or the inputs 215, 216 or 221 could provide power through the AC-DC converter when the switch is closed. A preferred embodiment of the fan controller uses only the 24 VAC Hot 213 from the system transformer 210 and a triac 301 and does not require a battery.

The microprocessor 304 continuously monitors all inputs to determine if there is any change to the current system operation. In one embodiment, the microprocessor 304 contains FLASH memory, which allows the unit to store the programming instructions and data when there is no power applied to the unit.

The microprocessor 304 monitors the duration of the fan 205, AC compressor 203, and/or heater 202 operation by the thermostat 201, and adjusts the delay accordingly. If the AC compressor 203 or the heat-source 202 are operated for a short period of time and there is not much condensation on the evaporator or heat in the heat exchanger, then the fan 205 time is extended for a shorter period of time. Likewise, if the AC compressor 203 or the heat-source 202 have operated for a longer period of time, allowing for more condensate or heater 202 runs longer creating more heart soak, then the fan controller 211 causes the fan 205 to run for a longer period of time after the AC compressor 203 or the heat-source 202 have stopped. Timing table and/or algorithms may be modified for particular HVAC system 100, environments, user preferences, and the like.

In the embodiment of the fan controller 211 using a triac as the switching device 301, the microprocessor 304 does not enable the triac at exactly the zero crossing of the 24 VAC signal. Instead, the microprocessor 304 delays an amount of time into the positive going cycle and allows the positive going waveform to provide a small amount of charge into the AC/DC circuitry. After a small charge has been accumulated, the microprocessor 304 enables the triac to pass the remainder of the power through to the fan relay 205. The AC waveform rises for a short period and then completely shorts out for the duration of the cycle, which passes this energy on to the fan relay 205 and thus actuates it. In this way, the fan relay 205 gets the majority of the AC waveform and actuates, while enough charge is stored by the AC/DC circuitry to keep the microprocessor 304 running until the next positive going cycle of the AC waveform.

In another embodiment of the fan controller, a battery 306 is used to supply power to the microprocessor 304 when the fan controller 211 is actuating the fan relay 205. In this embodiment, the 24 VAC signal is passed to the fan relay 205. This method is less complex but increases the cost of the invention and adds an item (the battery 306) that requires maintenance and periodic replacement.

Figure 10:
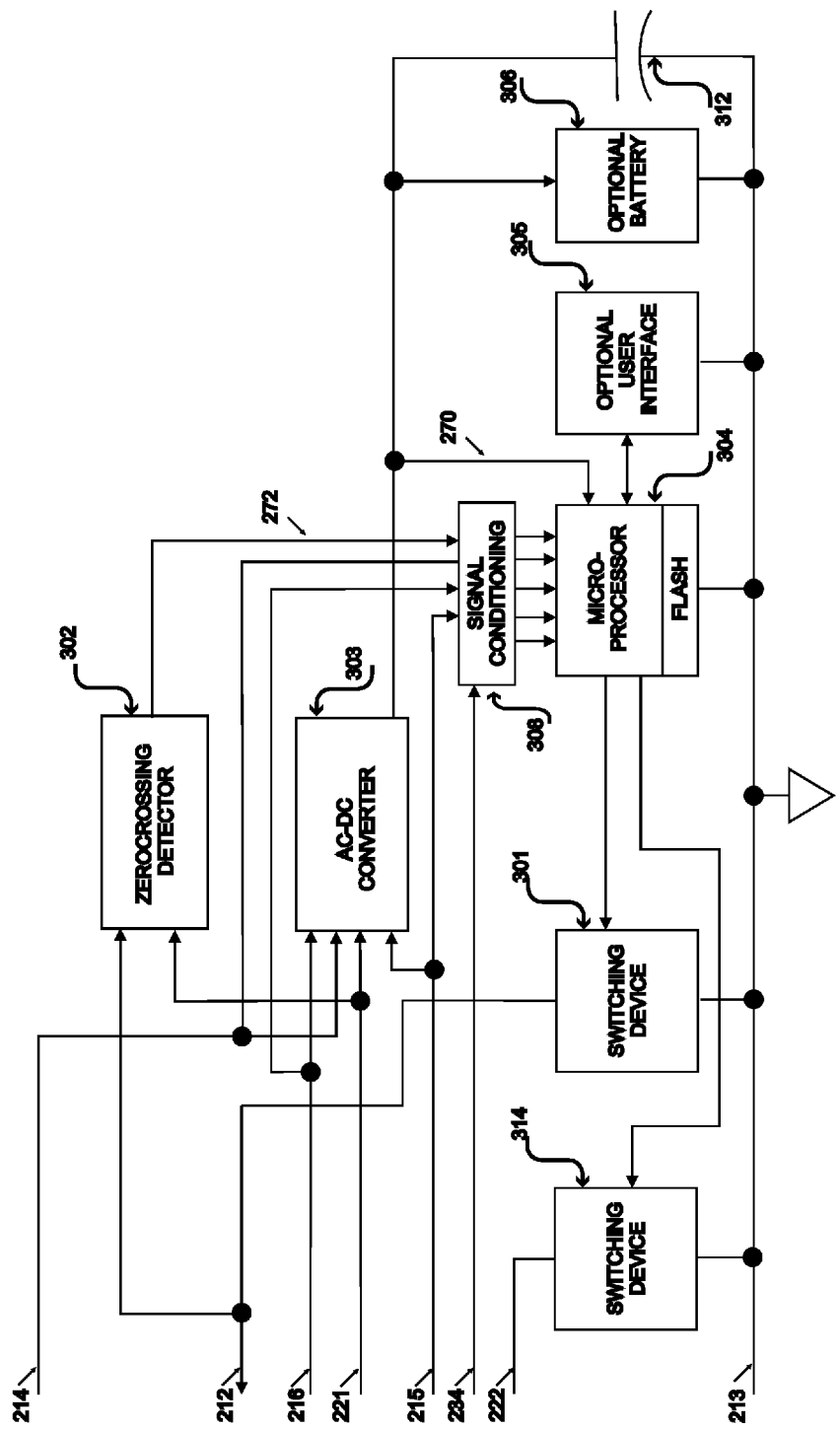
FIG. 10 shows elements of the fan controller according to an embodiment of the present invention with a second switching device 314 which connects the fan controller ground lead 213 which is the transformer hot lead 211b to the fan controller REV output signal control 222 for HVAC systems with a heat pump to maintain the same position for the reversing valve during the fan-off time delay period after the compressor turns off.

FIG. 10 shows elements of another embodiment of the fan controller with a second switching device 314 which connects the fan controller ground lead 213 (which is also the transformer hot lead 211*b*) to the fan controller REV output signal control 222 for HVAC systems with a heat pump, to maintain the same position for the reversing valve during the fan-off time delay period after the compressor turns off. Some thermostats of HVAC controllers de-energize the reversing valve at the end of AC/HP compressor cycle, which equalizes the refrigerant pressure and temperature between high and low side of the system, causing a loss of available cooling energy during the fan-off time delay. Maintaining the heat pump reversing valve at the same position throughout the cooling cycle and fan-off time delay period, allows more energy to be recovered and delivered to the space to improve sensible cooling capacity and efficiency.

Figure 12:
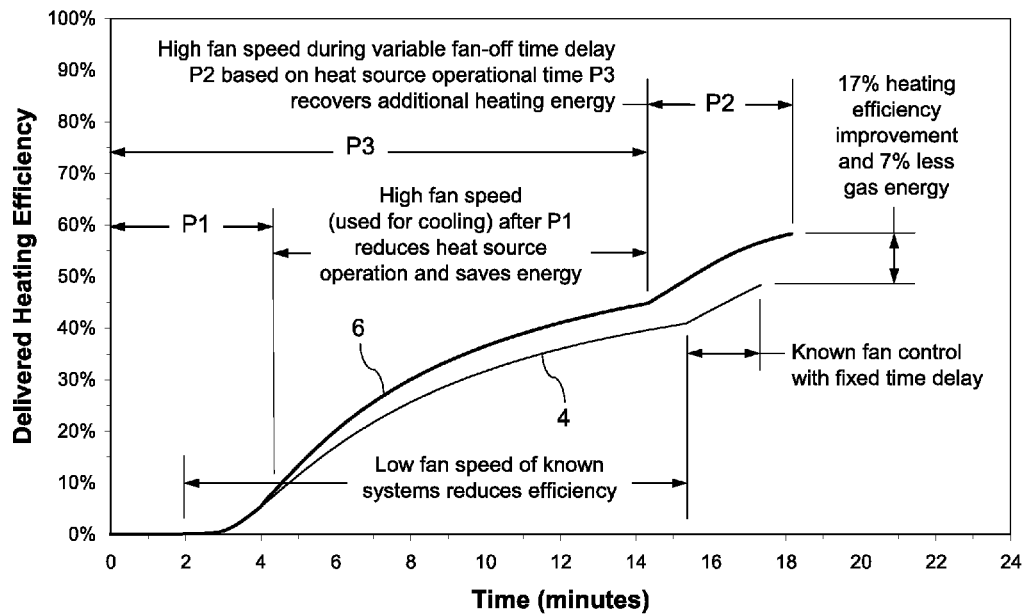
FIG. 12 shows a graph comparing delivered heating efficiency versus time of operation for a gas furnace HVAC system with the known fan control and the fan controller according to the present invention.

FIG. 12 shows a graph comparing delivered heating efficiency versus time of operation for a gas furnace HVAC system 100 with the known HVAC fan control 4 and the fan controller 6. The fan controller 6 improves heating system efficiency and reduces gas furnace operation by increasing fan speed from the low speed used for heating to the high speed used for cooling after delay time period P1 after the heat exchanger reaches maximum temperature. The fan controller 6 also maximizes heat recovery from the heat exchanger after the heat-source is turned OFF with an extended variable fan delay as a function of duration of heat-source operational time P3 based on signals present on thermostat or equipment terminals. Known fixed-time or temperature fan-off delay control 4 wastes more energy by leaving the heat exchanger with significantly higher temperatures of 260 to 380 degrees Fahrenheit. FIG. 12 shows the fan controller 6 improving heating efficiency by 17% and reducing gas use by 7% compared to known control 4.

Figure 13:
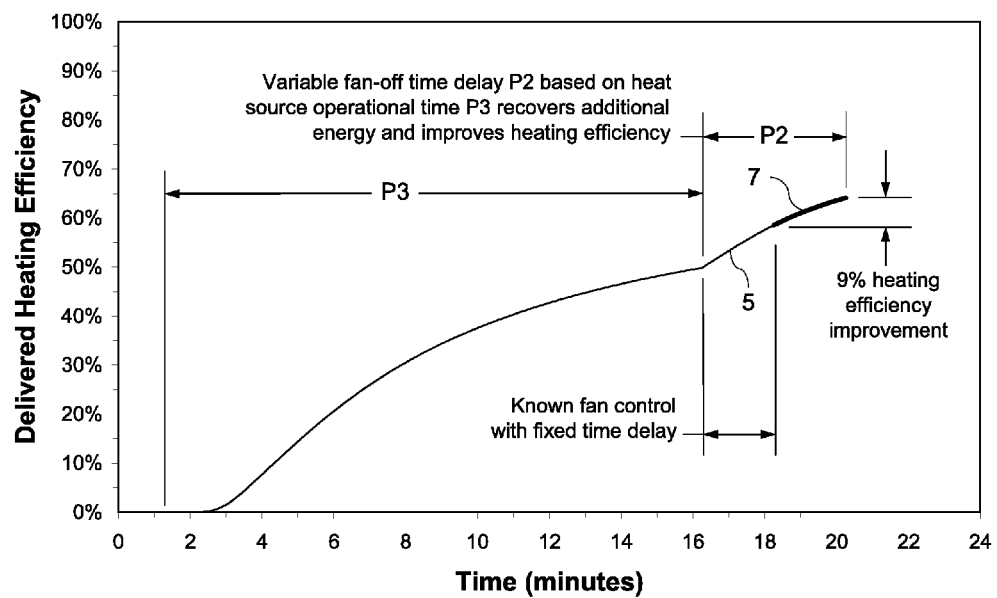
FIG. 13 shows a graph comparing delivered heating efficiency versus time of operation for a gas furnace HVAC system with the known fan control and the fan controller according to the present invention.

FIG. 13 shows a graph comparing delivered heating efficiency versus time of operation for a gas furnace HVAC system 100 with the known HVAC fan control 5 and the fan controller 7. The fan controller 7 maximizes heat recovery from the heat exchanger after the heat-source is turned OFF with an extended variable fan delay as a function of the duration of heat-source operational time P3 based on signals present on thermostat or equipment terminals. Known fixed-time or temperature fan-off delay control 5 wastes more energy by leaving the heat exchanger with significantly higher temperatures of 260 to 380 degrees Fahrenheit. FIG. 13 shows the fan controller 7 improving heating efficiency by 9% compared to known control 5. The fan controller curve 6 shown in FIG. 12 defaults to the fan controller curve 7 on gas furnace HVAC systems for a gas furnace HVAC system 100 with a one-speed fan/blower motor or a gas furnace HVAC system 100 where the low-voltage signal from the thermostat or equipment control terminal 204 controlling the fan relay 205 cannot switch the system fan/blower motor to the high fan speed used for cooling.

Figure 14:
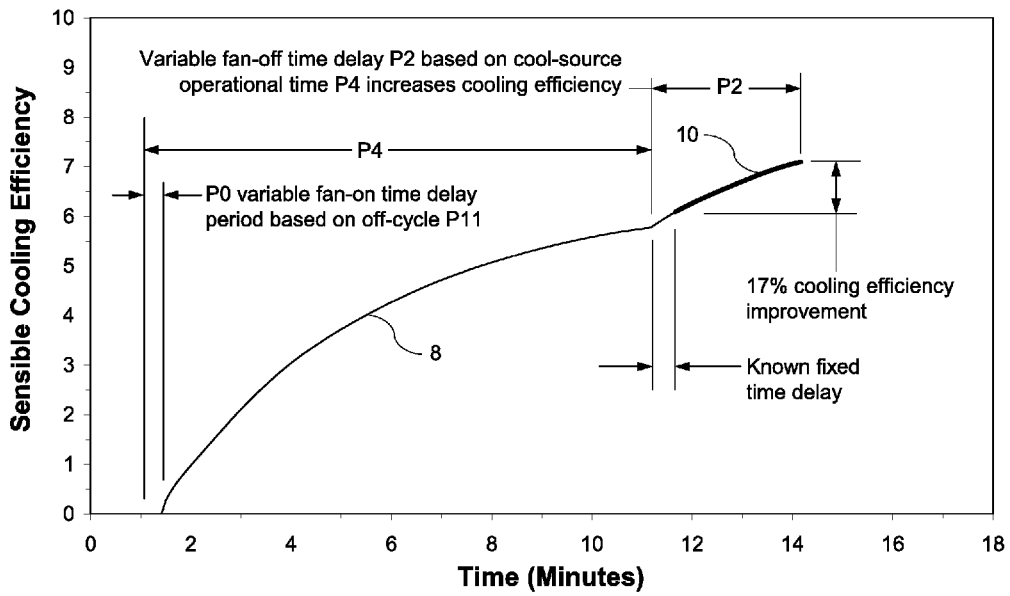
FIG. 14 shows a graph comparing delivered sensible cooling efficiency versus time of operation for a direct-expansion air conditioning system with the known fan control and the fan controller according to the present invention.

FIG. 14 shows a graph comparing delivered sensible cooling efficiency versus time of operation for a direct-expansion air conditioning system with the known fan control 8 and the fan controller 10. The fan controller 10 monitors and controls the HVAC fan and calculates a short fan-on delay P0 based on the previous cooling off-cycle duration P11. The fan controller 10 improves cooling system efficiency and maximizes sensible cooling recovery from the evaporator after the AC compressor is turned OFF with an extended variable fan delay as a function of the duration of AC compressor cool-source operational time P4 based on signals present on thermostat or equipment terminals. Known fixed-time delay control 8 wastes energy by leaving the evaporator with significantly more available yet unrecovered sensible cooling energy. FIG. 14 shows the fan controller 10 improving sensible cooling efficiency by 17% compared to known control 8.

Figure 15:
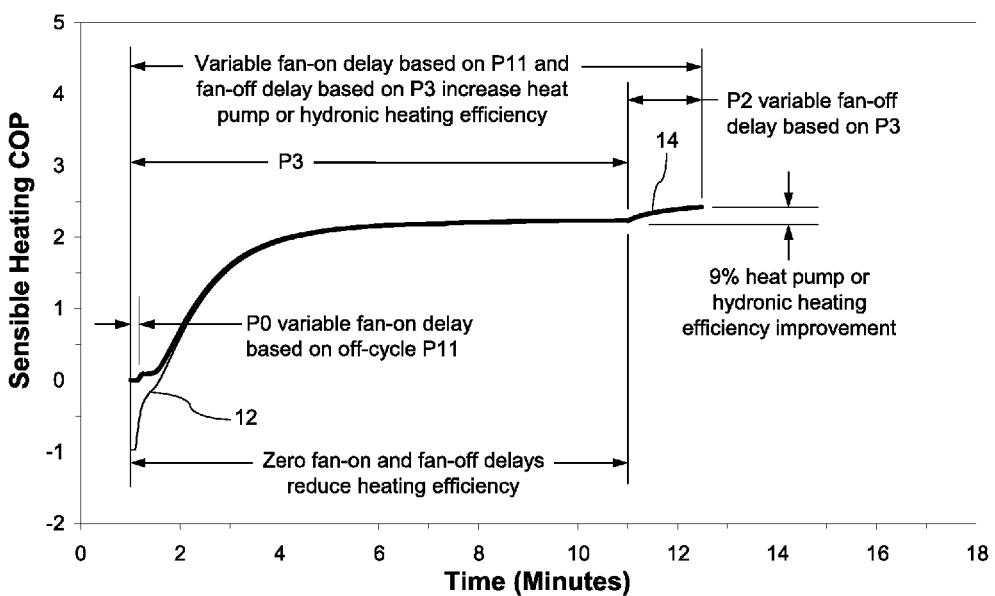
FIG. 15 shows a graph comparing the delivered heating efficiency coefficient of performance (COP) versus time of operation for the heat pump or hydronic HVAC system with the known fan control and the fan controller according to the present invention.

FIG. 15 shows a graph comparing the delivered heating efficiency coefficient of performance (COP) versus time of operation for the heat pump or hydronic HVAC system 100 with the known fan control 12 and fan controller 14. The fan controller 14 monitors and controls the HVAC fan and calculates a short fan-on delay P0 based on the previous heating off-cycle duration P11. The fan controller 14 improves heating efficiency and maximizes heat recovery from the heat pump coil after the HP compressor is turned OFF with an extended variable fan delay as a function of the duration of HP compressor operational time P3 based on signals present on thermostat or equipment terminals. Known fixed fan-off time delay control 12 wastes energy by leaving the heat pump coil with significantly more available yet unrecovered sensible heating energy. FIG. 15 shows the fan controller 14 improving heating efficiency by 9% compared to the known control 12.

Figure 16:
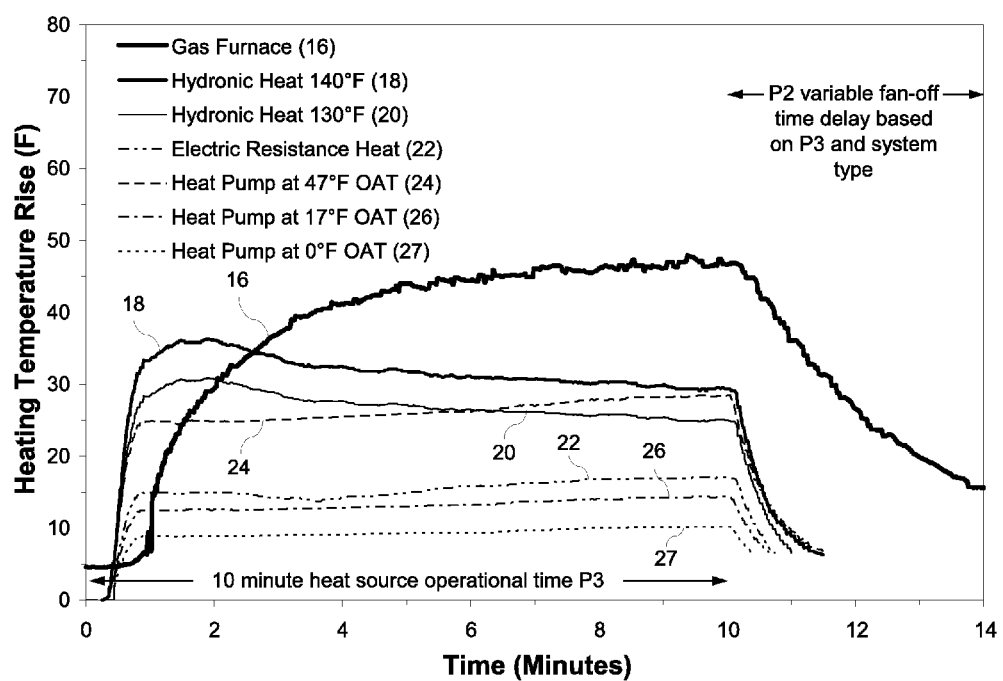
FIG. 16 shows a graph of heating temperature rise across the heat exchanger versus time of operation for different heating system types operating for an equivalent heat-source operational time P3 and variable fan-only operational time P2 for fan control according to an embodiment of the present invention.

FIG. 16 shows a graph comparing heating temperature rise (° F.) across the heat exchanger (i.e., leaving air dry-bulb temperature minus entering dry-bulb temperature) versus time of operation for ten minutes of heat-source operational time P3 and variable fan-off time delays P2 as a function of the ten-minute heat-source operational time P3 based on signals present on thermostat or equipment control terminals. The fan controller curve 16 for a gas furnace provides a final heating temperature rise of 16 degrees Fahrenheit at the end of a Variable fan-off time delay P2 of four minutes based on heat-source operational time P3 of 10 minutes for any Outdoor Air Temperature (OAT). The fan controller curve 18 for a hydronic heating system with 140 degree Fahrenheit hot water provides a final heating temperature rise of seven degrees Fahrenheit at the end of a variable fan-off time delay of 1.5 minutes based on heat-source operational time P3 of 10 minutes. The fan controller curve 20 for a hydronic heating system with 130 degree Fahrenheit hot water provides a final heating temperature rise of seven degrees Fahrenheit at the end of a variable fan-off time delay P2 of one minute based on heat-source operational time P3 of 10 minutes. The fan controller curve 22 for an electric resistance heating system provides a final heating temperature rise of seven degrees Fahrenheit at the end of a variable fan-off time delay P2 of 0.75 minutes based on heat-source operational time P3 of 10 minutes.

The fan controller curve 24 for a heat pump at 47 degrees Fahrenheit OAT provides a final heating temperature rise of seven degrees Fahrenheit at the end of a P2 variable fan-off time delay of 1.5 minutes based on based on heat-source operational time P3 of 10 minutes. The fan controller curve 26 for a heat pump at 17 degrees Fahrenheit OAT provides a final heating temperature rise of seven degrees Fahrenheit at the end of a P2 variable fan-off time delay of 0.7 minutes based on a heat-source operational time P3 of 10 minutes. The fan controller curve 27 for a heat pump at 0 degrees Fahrenheit OAT provides a final heating temperature rise of seven degrees Fahrenheit at the end of a P2 variable fan-off time delay of 0.33 minutes based on a heat-source operational time P3 of 10 minutes.

Figure 17:
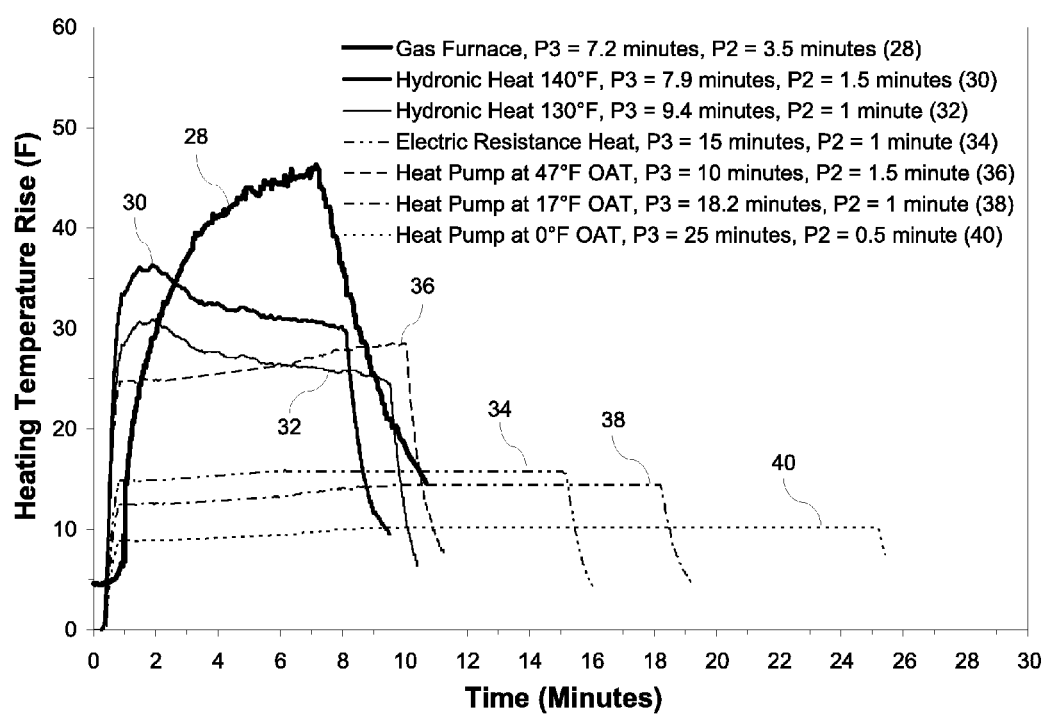
FIG. 17 shows a graph of heating temperature rise across the heat exchanger versus time of operation for different heating system types providing equivalent heating output to satisfy the thermostat based on varying the heat-source operational time P3 and variable fan-only operational time P2 for the fan control according to an embodiment of the present invention.

FIG. 17 shows heating temperature rise (° F.) across the heat exchanger versus time of operation for the gas furnace, hydronic, electric resistance, and heat pump heating systems where each heating system delivers equivalent heating output and the variable fan-off time delay P2 is a function of heat-source operational time P3 based on signals present on thermostat or equipment control terminals. The hydronic hot water supply temperature varies from 130 to 140 degrees Fahrenheit and the heat pump outdoor air temperature (OAT) varies from 0 to 17 to 47 degrees Fahrenheit.

FIG. 17 shows the fan controller curve 28 for gas furnace heating where the extended fan-only operational time P2 is 3.5 minutes based on 7.2 minutes of heat-source operational time P3. For the gas furnace and 3.5 minutes fan-off time delay P2 based on 7.2 minutes of heat-source operational time P3, the final heating temperature rise is 14.6 degrees Fahrenheit at the end of the P2 time period. The gas furnace heating system stores more heating energy in the heat exchanger, enclosure, and plenum as P3 operational time increases independent of OAT.

FIG. 17 also shows the fan controller curve 30 for hydronic heating where the hot water supply is 140 degrees Fahrenheit and the extended fan-only operational time P2 is 1.5 minutes based on 7.9 minutes of heat-source operational time P3 which is used as a proxy for lower OAT. For hydronic heating at 140 degrees Fahrenheit and 1.5 minutes fan-off time delay P2 based on 7.9 minutes of heat-source operational time P3, the final heating temperature rise is 10 degrees Fahrenheit. FIG. 17 also shows the fan controller curve 32 for hydronic heating where the hot water supply is 130 degrees Fahrenheit and the extended fan-only operational time P2 decreases to one minute based on 9.4 minutes of heat-source operational time P3. For hydronic heating at 130 degrees Fahrenheit and 1 minute fan-off time delay P2 based on 9.4 minutes of heat-source operational time P3, the final heating temperature rise is 7 degrees Fahrenheit. Longer heat-source operational time is caused by lower OAT which increases building heat losses and the frequency of heat-source operational time and reduces off-cycle duration P11 providing less time between cycles for the water heater to increase hot water temperatures which causes lower hot water temperatures during and after the thermostat temperature has been satisfied, which reduces energy available for heat recovery from extended fan operation after the hydronic heat-source has been de-energized.

FIG. 17 also shows the fan controller curve 34 for electric resistance heating and the extended fan-only operational time P2 decreased to one minute based on 15 minutes of heat-source operational time P3. For electric resistance heating and 1 minute fan-off time delay P2 based on 15 minutes of heat-source operational time P3, the final heating temperature rise is 5 degrees Fahrenheit. Heat output for an electric resistance heater varies based on power and quantity of heating elements and airflow. For a typical electric resistance heating element, a longer heat-source operational time may be caused by lower OAT, which increases building heat losses and the frequency of heat-source operational time and reduces the off-cycle duration P11. These conditions reduce heat stored in the heating system, thus further reducing energy available for heat recovery from extended fan operation after the electric heat-source has been de-energized.

FIG. 17 also shows the fan controller curves 36, 38, and 40 for a heat pump where the extended fan-off time delay P2 is decreased from 1.5 to 1 minute to 0.5 minutes based on increasing heat-source operational time P3 from 10 minutes at 47 degrees Fahrenheit OAT, 18.2 minutes at 17 degrees Fahrenheit OAT, and 25 minutes at 0 degrees Fahrenheit OAT. For the heat pump, the heat-source operational time P3 is used as a proxy for lower OAT. Longer heat-source operational times P3 are caused by lower OAT which increases building heat losses and reduces heat pump condenser indoor-coil temperatures and heating energy available for heat recovery from extended fan operation after the heat-source has been de-energized. For a heat pump operating at 47 degrees Fahrenheit Outdoor Air Temperature (OAT) and 1.5 minutes of fan-off time delay P2 based on 10 minutes of heat-source operational time P3, the final heating temperature rise is 7 degrees Fahrenheit. For a heat pump operating at 17 degrees Fahrenheit OAT and 1 minute fan-off time delay P2 based on 18.2 minutes P3, the final heating temperature rise is 5 degrees Fahrenheit. For heat pump operating at 0 degrees Fahrenheit OAT and 0.5 minute fan-off time delay P2 based on 25 minutes P3, the final heating temperature rise is 8 degrees Fahrenheit.

Figure 18:
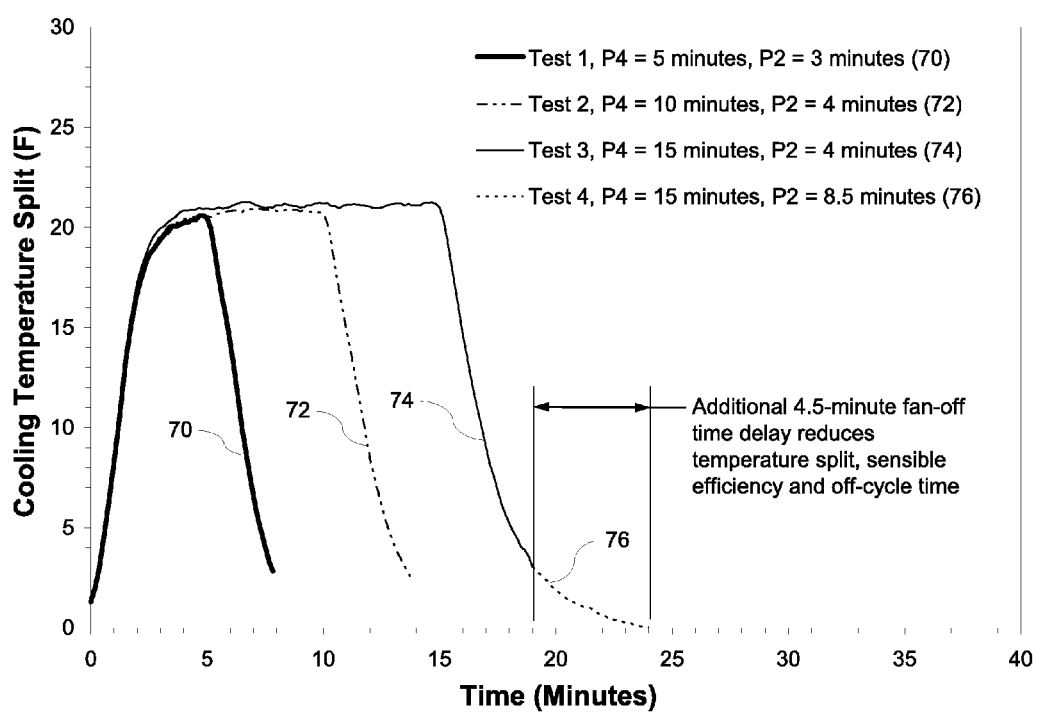
FIG. 18 shows a graph of cooling temperature split across the evaporator of an air conditioning system versus time of operation for various AC compressor operational times P4 and variable fan-only operational time P2 for the fan control according to an embodiment of the present invention.

FIG. 18 shows a graph comparing field measurements of cooling Temperature Split (TS) across the evaporator (i.e., entering evaporator air dry-bulb temperature minus leaving evaporator dry-bulb temperature) versus time of operation for various AC compressor cool-source operational times P4 and fan-only operational times P2. Measurements were made using accurate Resistance Temperature Detector (RTD) dry-bulb sensors located outside the building, inside an HVAC cooling system return air duct and supply air duct, and at the thermostat which controls the HVAC system 100. The average indoor drybulb temperature was 76° F. and the average outdoor drybulb temperature was 91° F.

FIG. 18 Test 1 curve 70 shows a TS of 20.6° F. at the end of 5 minutes of cool-source operational time P4 and TS of 2.8° F. at the end of 3-minutes of fan-off time delay P2 providing a 32% efficiency improvement compared to the same unit with no time delay.

FIG. 18 Test 2 curve 72 shows a TS of 20.7° F. at the end of 10 minutes of cool-source operational time P4 and TS of 2.3° F. at the end of a 4-minute fan-off time delay P2 providing a 15% efficiency improvement compared to the same unit with no time delay.

FIG. 18 Test 3 curve 74 and Test 4 curve 76 provide a practical upper limit of latent cooling for fan-off time delays. Test 3 curve 74 shows a TS of 21.2° F. at the end of 15 minutes of cool-source operational time P4 and a TS of 3.6° F. at the end of 4-minutes of fan-off time delay P2 providing a 10% sensible efficiency improvement compared to the same unit with no time delay.

Test 4 curve 76 shows a TS of 21.3° F. at the end of 15 minutes of cool-source operational time P4. At the end of an 8.5-minute fan-off time delay, the measured TS was 0.15° F. The 8.5-minute fan-off time delay (additional 4.5-minutes) reduced sensible efficiency to 6%, increased the thermostat temperature by more than 1° F. above the set point and caused the compressor to turn on and eliminate the off-cycle.

Test 3 curve 74 provides the practical upper limit 4-minute fan-off time delay followed by an 11.5-minute off-cycle period. For this example, a fan-off time delay longer than 4 minutes reduces efficiency and shortens the off-cycle period. FIG. 18 demonstrates why laboratory test results presented in the CEC '056 Report are impossible to achieve in the field with actual air conditioners and why the CEC '056 Report did not disclose or suggest methods to calculate extended variable fan-off time delays as a function of air conditioning compressor cool-source operational times.

Impractical and excessively long fan-off time delays disclosed in the CEC '056 report reduce latent recovery and sensible efficiency and also reduce or eliminate the compressor off-cycle time. Hundreds of field and laboratory tests were performed on numerous HVAC units to determine the practical upper limit of the fan-off time delay and develop the variable fan-off time delay P2 based on AC/HP compressor cool-source operational time P4.

Figure 19:
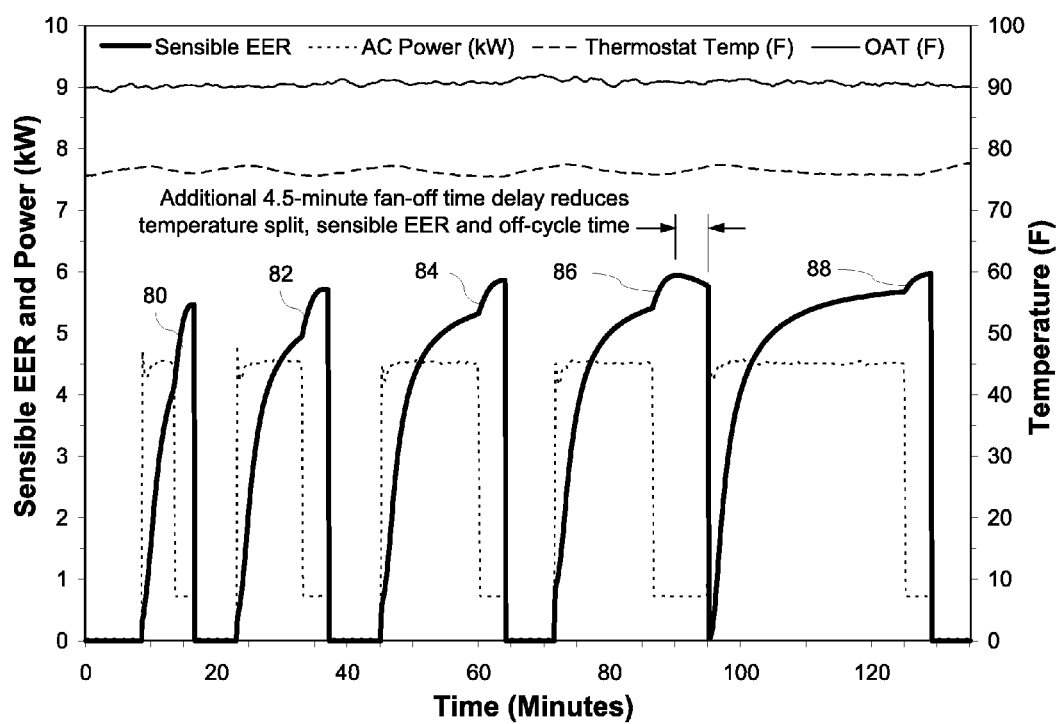
FIG. 19 shows a graph of sensible cooling Energy Efficiency Ratio (EER) and total power (kW) versus time of operation for an air conditioning system with various AC compressor operational times P4 and variable fan-only operational time P2 for the fan control according to an embodiment of the present invention.

FIG. 19 shows a graph comparing field measurements of cooling sensible Energy Efficiency Ratio (EER) and power (kW) versus time of operation for various AC compressor cool-source operational times P4 and fan-only operational times P2. FIG. 19 also shows air temperature (° F.) measured at the thermostat and outdoor air temperature versus time. Curve 80 shows 5 minutes of cool-source operational time and a 3-minute fan-off time delay P2 providing a 32% efficiency improvement compared to the same unit with no time delay. Curve 82 shows 10 minutes of cool-source operational time P4 and a 4-minute fan-off time delay P2 providing a 15% efficiency improvement compared to the same unit with no time delay. Curve 84 shows 15 minutes of cool-source operational time P4 and a 4-minute fan-off time delay P2 providing a 10% efficiency improvement compared to the same unit with no time delay. Curve 86 shows 15 minutes of cool-source operational time P4 and an 8.5-minute fan-off time delay P2 providing a 6.6% efficiency improvement compared to the same unit with no time delay. The additional 4.5-minute fan-off time delay shown in curve 86 eliminates the compressor off-cycle time as indicated by Curve 88 where the AC compressor operational time starts immediately. Curve 88 shows 30-minutes of cool-source operational time P4 and a 4-minute fan-off time delay P2 providing a 5.1% efficiency improvement compared to the same unit with no time delay. The results indicate that a longer fan-off time delay for curve 88 does not improve sensible efficiency.

FIG. 18 and FIG. 19 demonstrate the practical upper limit of the fan-off time delay based on cool-source operational time. The air conditioning system stores some cooling capacity in the form of water condensed onto the evaporator coil. The extended fan-off time delay operates the blower fan after the compressor is off to recover some of the stored cooling capacity by evaporating the water on the coil which reduces the temperature of the air and provides additional sensible cooling capacity to the conditioned space. This process is referred to as latent recovery. The amount of moisture condensed onto the evaporator coil is dependent on the compressor operational time. The amount of moisture that can be converted to sensible cooling is dependent on the airflow and the length of time the fan runs after the compressor is off. There are physical limitations to how long the variable fan-off time delay can operate based on how much moisture is condensed onto the evaporator based on compressor operational time and the evaporator airflow rate.

FIG. 20 shows a graph of heating system power (kW) versus time of operation for a known fan control 50 with constant fan operation during unoccupied periods of time causing over ventilation, constant fan power, and increased heating power consumption. Over ventilation can be caused by duct leakage or HVAC economizer dampers being closed or partially open causing an increased amount of cold outdoor air to enter the building which will cause the heating system to operate more frequently during unoccupied periods when the fan is accidentally left on. FIG. 20 also shows an unoccupied fan-off control 52 which turns off the fan and reduces fan and heating system power consumption according to an embodiment of the present invention. The apparatus and methods for turning off the fan during unoccupied periods of time are enabled by the fan controller 211 or in and embodiment of the thermostat 200. The fan controller 211 monitors the fan signal and in the absence of a cool-source or heat-source signal, the fan controller 211 de-energizes the fan relay 205 and turns off the system fan/blower 206 after a minimum fan-only time period to save energy when the fan has been accidentally left on by itself. An embodiment of the thermostat 200 may monitor the fan signal and in the absence an occupancy signal, cool-source signal or heat-source signal, the thermostat 200 may de-energize the fan relay 205 and turns off the system fan/blower 206 after a minimum fan-only time period to save energy when the fan has been accidentally left on by itself.

FIG. 21 shows a graph of cooling system power (kW) versus time of operation for a known fan control 54 with constant fan operation during unoccupied periods of time causing over ventilation, constant fan power, and increased cooling power consumption. Over ventilation can be caused by duct leakage or HVAC economizer dampers being closed or partially open causing an increased amount of hot outdoor air to enter the building which will cause the cooling system to operate more frequently during unoccupied periods when the fan is accidentally left on. FIG. 21 also shows an unoccupied fan-off control 56 which turns off the fan and reduces fan and cooling power consumption according to an embodiment of the present invention. As noted above, the apparatus and methods for turning off the fan during unoccupied periods of time are enabled using an embodiment of the fan controller 211 or thermostat 200 to turn off the fan after a minimum fan-only time period to save energy when the fan has been accidentally left on by itself.

Figure 22:
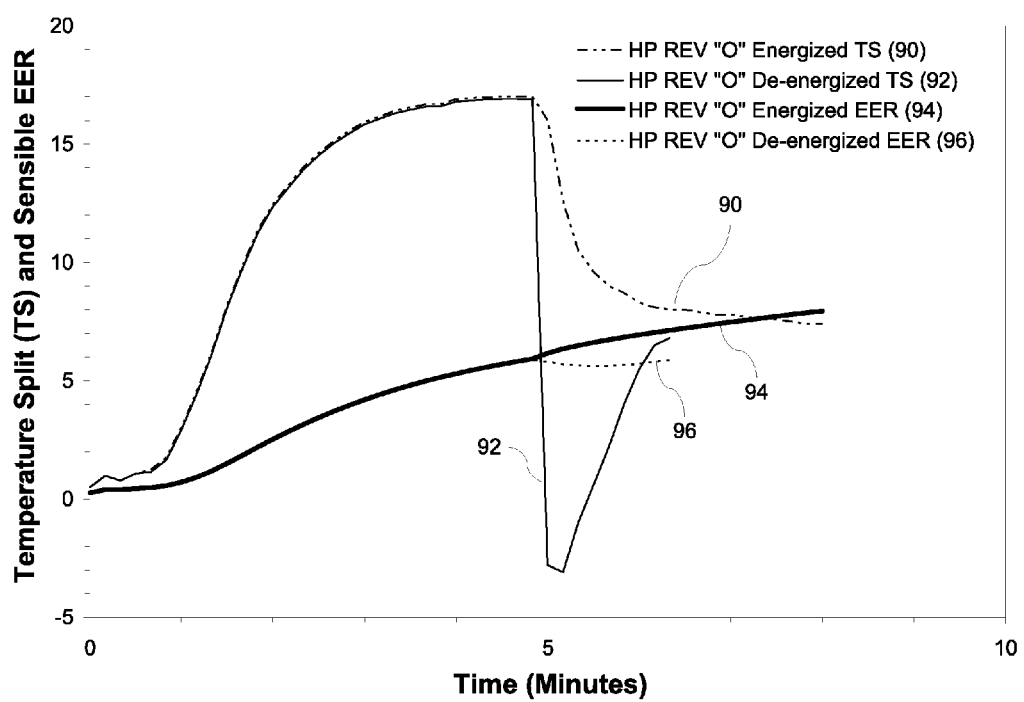
FIG. 22 shows a graph of cooling temperature split (TS) and sensible cooling Energy Efficiency Ratio (EER) versus time of operation for a heat pump with a reversing valve energized in cooling mode for compressor operational time P4 and de-energized at the end of the compressor operational time P4 (curve 92) and the same heat pump with the reversing valve energized throughout the compressor operational time P4 plus fan-off time delay period P2 according to an embodiment of the present invention (curve 90).

FIG. 22 shows a graph of cooling temperature split (TS) and sensible cooling EER versus time of operation for a heat pump with a reversing valve normally energized in cooling mode for compressor operational time P4 and de-energized by the thermostat at the end of the compressor operational time P4. Curve 92 shows how the temperature split is reduced from 16.7° F. to minus 3.1° F. approximately 10 seconds after the reversing valve is de-energized. When de-energized, the reversing-valve spring decompresses and blocks the capillary tube allowing high pressure and high temperature refrigerant vapor to flow to the evaporator coil, increasing the coil temperature from approximately 40 F to approximately 86 F, which immediately increases the supply air temperature, and reduces temperature split and eliminates most of the cooling which was stored in the evaporator at the end of the compressor operational time P4. Curve 96 shows a decline in sensible Energy Efficiency Ratio (EER) during the fan-off time delay due to loss of cooling capacity after the reversing valve is de-energized. Curve 90 shows the gradual TS decrease from 17° F. to 7.4° F. during the 3-minute fan-off time delay. Curve 94 shows the sensible EER increasing by 34% from 5.9 to 7.9 with the reversing valve energized continuously throughout the compressor operational time P4 and continuing to be energized throughout the fan-off time delay P2.

Figure 23:
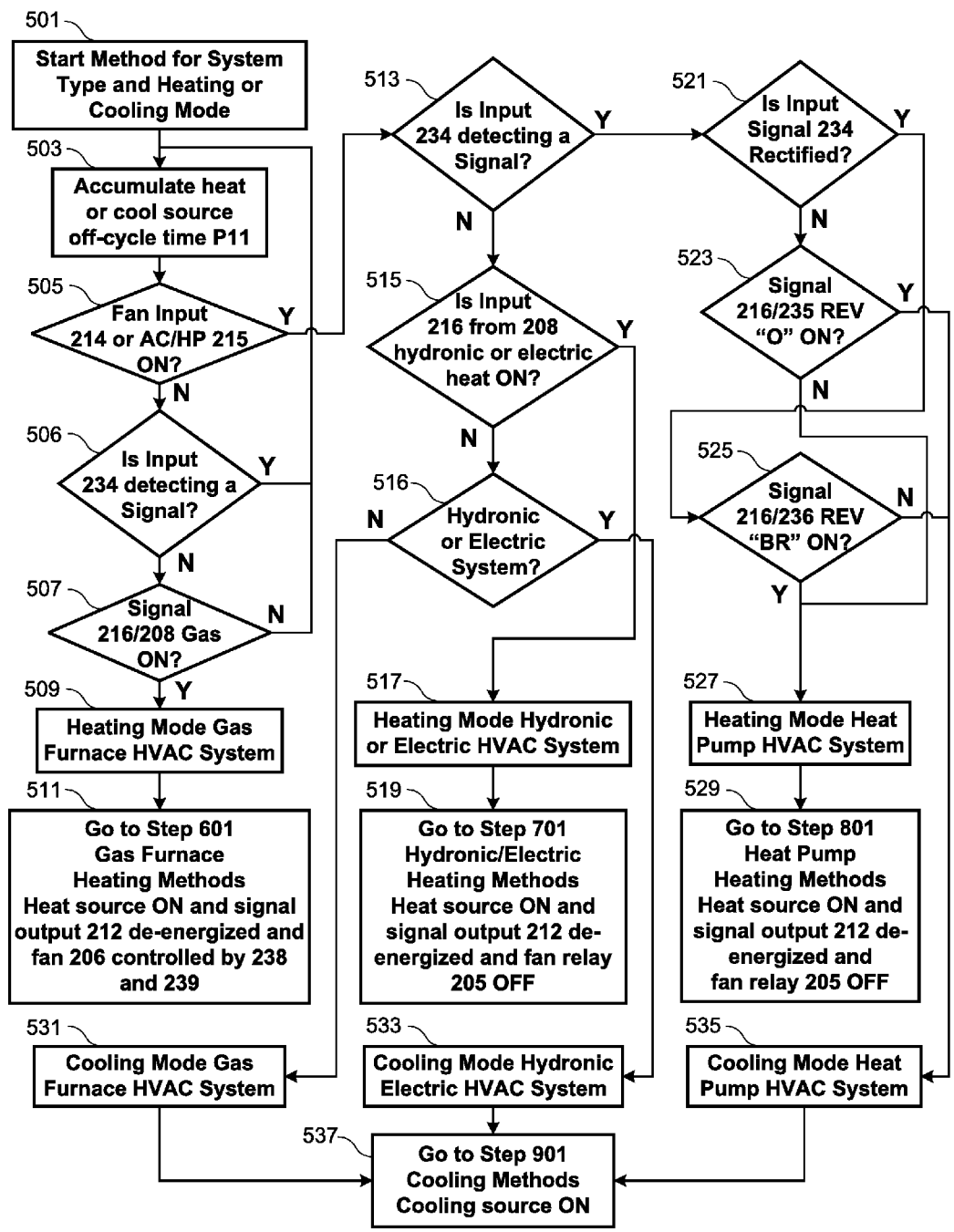
FIG. 23 shows a first method for determining what type of system is connected and what heating or cooling mode to execute, according to an embodiment of the present invention.

FIG. 23 shows a first method used by the fan controller to determine what type heat-source is included in the HVAC system 100 the fan controller is connected to, and whether or not the HVAC system 100 is operating in heating or cooling mode or in the off-cycle. Step 501 is the reset point of the software following completion of the previous variable fan-off delay time P2 in heating or cooling mode or operation. In the embodiment shown in FIG. 9, the optional relay switch 309 is moved from the normally closed position to the normally open position to connect the fan signal output 212 to the switch 301. The relay switch 309 is not included in the embodiment shown in FIG. 8.

At Step 503 the fan controller determines (e.g., accumulates) the off-cycle time P11 where the HVAC system 100 has been idle between heating or cooling periods. P11 is used when there is a fan-on time delay P0 for the start of the fan, or to adjust the fan-off time delay P2 in combination with the previous or current cool-source operational time P4 or heat-source operational time P3. In some systems, the fan start time is delayed by the fan-on time delay P0 before being energized while the heat or cooling source is brought to operational temperature.

At Step 505 the fan controller determines whether or not the fan controller fan signal input 214 is active based on the presence or absence of the low-voltage fan signal on a thermostat "G" terminal 204, or whether or not the fan controller AC/HP signal input 215 is active based on the presence or absence of the low-voltage AC/HP signal on a thermostat "Y" terminal 207. If the fan controller fan signal input 214 is active, or the fan controller AC/HP signal input 215 is active, then the fan controller proceeds to Step 513 to determine whether or not fan controller signal input 234 is detecting a signal. If fan controller signal input 234 is not detecting a signal, then the fan controller proceeds to Step 515. At Step 515, if fan controller signal input 216 from the thermostat heat "W" signal on terminal 208 is active simultaneously with fan controller signal input 214, then the fan controller sets the HVAC system mode to a hydronic or electric resistance heating system operating in heating mode and sets the mode to heating at Step 517. The fan controller then proceeds to Step 519 and goes to Step 701 fan controller hydronic/electric heating methods (FIG. 26) with the heat-source ON and fan controller signal output 212 de-energized with fan relay 205 and blower fan 206 OFF.

At Step 515, if fan controller signal input 216 is not active, then at Step 516, if the fan controller is connected to a hydronic or electric resistance system then the fan controller proceeds to Step 533 and sets the system type to a hydronic or electric HVAC system 100 operating in cooling mode. The fan controller then proceeds to Step 537 and goes to Step 901 fan controller cooling methods (FIG. 28) with cooling source ON.

At Step 505, if fan controller signal input 214 is not active, the fan controller proceeds to Step 506 to determine whether or not fan controller signal input 234 is detecting a signal through either a wire connection 265 (FIG. 5), or a diode 275 (FIG. 6). When a direct wire connection 265 is present between the 24 VAC transformer 210b and fan controller signal input 234, the signal input is active and unrectified (see curve 350 in FIG. 11). When a diode 275 is serially connected between the 24 VAC transformer 210b and the fan controller signal input 234, the fan controller signal input 234 is active and either positively or negatively rectified (see curve 351 or 352 in FIG. 11). If fan controller signal input 234 is detecting a signal, either rectified or unrectified, at Step 506, then the fan controller determines that the system type is a heat pump HVAC system 100 and loops back to Step 503 to accumulate off-cycle duration P11 until the fan signal 214 is active.

At Step 506, if fan controller signal input 234 is not detecting a signal, then the fan controller proceeds to Step 507 to determine whether or not fan controller signal input 216 is active from thermostat signal heat "W" on terminal 208. If fan controller signal input 216 is active, the fan controller determines that the system type is a gas furnace HVAC system 100 operating in heating mode at Step 509. The fan controller then proceeds to Step 511 and goes to Step 601 fan controller gas furnace heating methods (FIG. 24) with the heat-source ON and fan controller output 212 de-energized with the blower fan 206 controlled by the OEM blower controller and operating at the default low or medium speed used for heating.

At Step 505, if fan controller signal input 214 is active from the thermostat fan signal 204 or the compressor signal on terminal 207, and at Step 513 fan controller HPD signal input 234 is not detecting any type of signal, and at Step 515 fan controller signal input 216 from the thermostat heat "W" signal on terminal 208 is not active, and the fan controller is connected to a gas furnace HVAC system 100 at Step 516, then the fan controller proceeds to Step 531 and sets the system type to gas furnace HVAC system 100 operating in cooling mode. The fan controller then proceeds to Step 537 and goes to Step 901 fan controller cooling methods (FIG. 28) with cooling source ON.

The HPD input 234 is used to detect a heat pump HVAC system 100 by connecting the HPD input 234 to the hot side of the system transformer 210b or thermostat terminal 209 through wire 265 for a heat pump with reversing valve "O"

normally energized for cooling (see FIG. 5) or a wire with a diode 275 for a heat pump with reversing valve "BR" normally energized for heating (see FIG. 6).

If at Step 513 the fan controller determines that input 234 is detecting a signal, then at Step 521, if the fan controller determines that the input signal 234 is rectified (i.e. indicating a diode 275 is present), and if at Step 525 the fan controller determines that the input 216 from thermostat signal HP REV "BR" 236 is active, then at Step 527 the fan controller determines that the system type is a heat pump HVAC system 100 operating in heating mode. The fan controller then proceeds to Step 529 and goes to Step 801 fan controller heat pump heating methods (FIG. 27) with the heat-source ON and fan controller fan output 212 de-energized with fan relay 205 OFF and blower fan 206 OFF.

At Step 525, if the fan controller does not detect an active input on fan controller signal input 216 from thermostat signal HP REV "BR" 236, then at Step 535 the fan controller determines that the system type is a heat pump HVAC system 100 operating in cooling mode. The fan controller then proceeds to Step 537 and goes to Step 901 fan controller cooling methods with cooling source ON (FIG. 28).

If the fan controller determines the HPD input 234 signal is detecting a signal at Step 513, either rectified or unrectified, and Step 521 determines the HPD input 234 signal is not rectified (no diode is connected), and Step 523 detects a floating signal on fan controller input 216 from thermostat signal HP REV "O" 235, then at Step 527 the fan controller determines the heat pump HVAC system 100 is operating in heating mode. The fan controller then proceeds to Step 529 and goes to Step 801 fan controller heat pump heating methods (FIG. 27) with the heat-source ON and fan controller fan output 212 de-energized with fan relay 205 OFF and blower fan 206 OFF.

Figure 28:
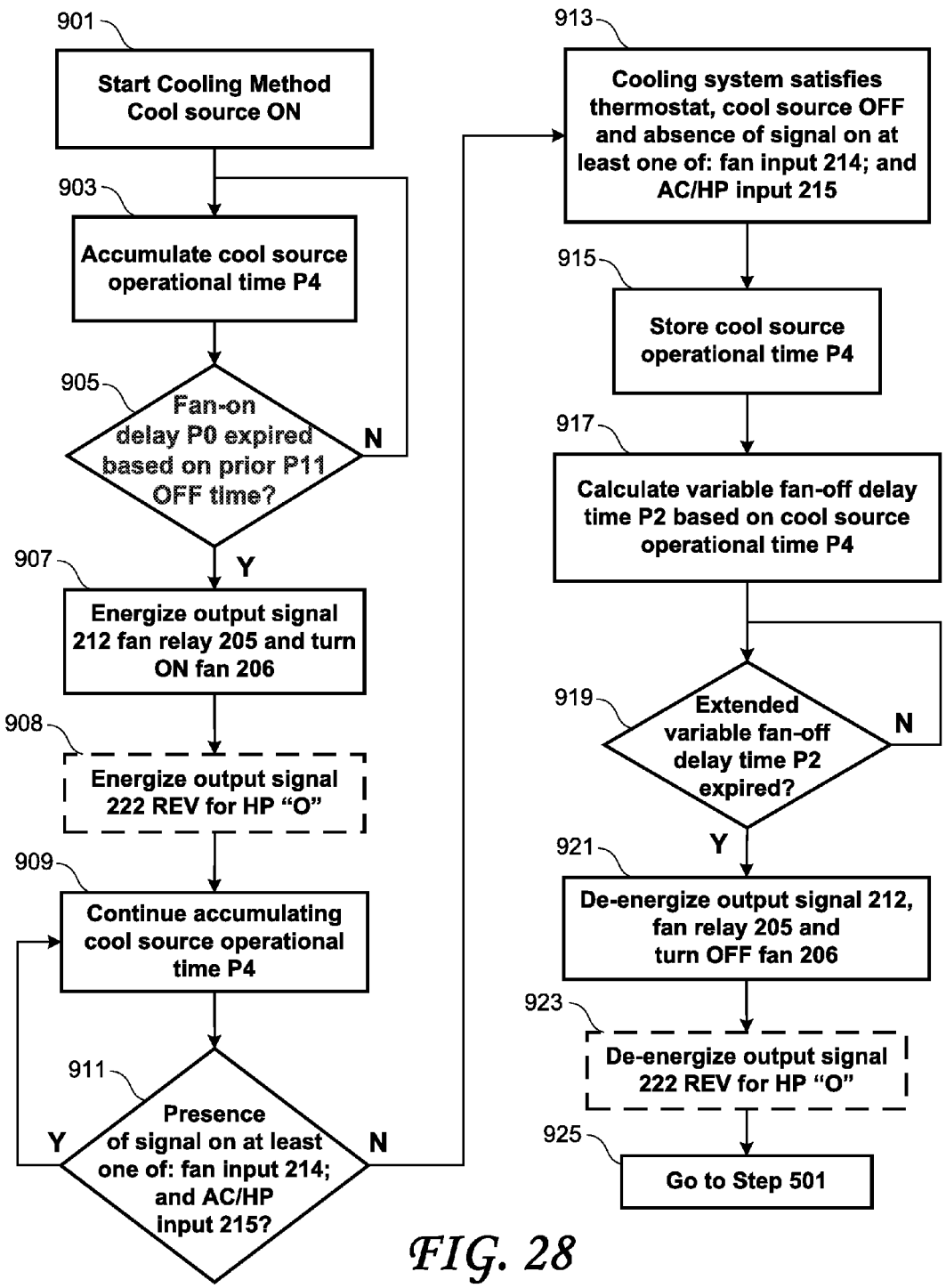
FIG. 28 shows a method for determining variable fan-on and fan-off time delays based on the cooling mode operational time, according to the present invention.

At Step 523, if the fan controller detects an active input on 216 from thermostat signal HP REV "O" 235, then at Step 535 the fan controller determines the heat pump HVAC system 100 is operating in cooling mode, and at Step 537, the fan controller proceeds to Step 901 fan controller cooling methods with cooling source ON (FIG. 28).

Figure 24:
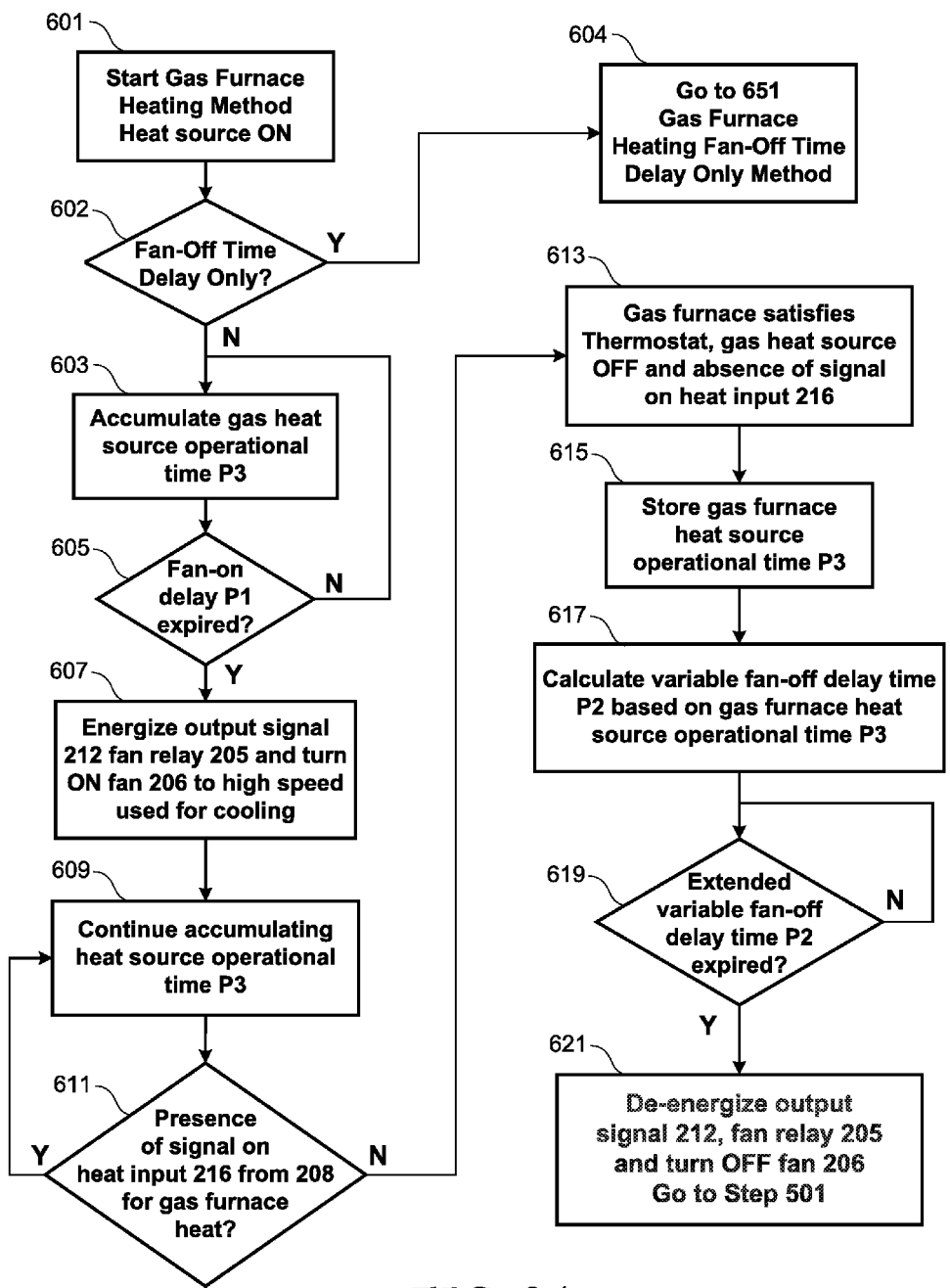
FIG. 24 shows a method for determining variable fan-on and fan-off time delays based on the heat mode operational time for a gas furnace heating system, according to the present invention.

FIG. 24 shows a fan controller gas furnace heating method according to the present invention. At Step 601 the method starts with the heat-source ON. At Step 603 the fan controller accumulates (or otherwise measures) gas heat-source operational time P3. At Step 605 the fan controller determines whether or not the fan-on delay time period P1 has expired. The fan-on delay time period P1 is based on field and laboratory test data for how long it takes for the heat exchanger to reach a useful heating temperature required to deliver warm air to the conditioned space when the fan controller transitions the fan speed from the low speed used for heating to the high speed used for cooling.

In a preferred embodiment the fan-on delay time period P1 is 4 minutes, but P1 can vary or equal the heat-source operational time P3. For an embodiment where P1 is equal to P3, the fan controller output signal 222 is not energized until the thermostat is satisfied and the heat-source operational time P3 has ended. This is a default embodiment of a fan controller for a gas furnace HVAC system 100 with a one-speed fan/blower motor or a gas furnace HVAC system 100 where the low-voltage signal from the thermostat or equipment control terminal 204 controlling the fan relay 205 cannot switch the system fan/blower motor to the high fan speed used for cooling.

At Step 607, after the fan-on delay time period P1 has expired, the fan controller energizes switch 301 which takes over control of the low-voltage fan signal from the thermostat"G" terminal (204) and provides a 24 VAC signal to fan controller output 212 which in turn activates the fan relay 205 and turns ON the blower fan 206 to the high speed used for cooling. At Step 609 a loop is initiated which runs continuously to accumulate (or otherwise measure) heat-source operational time P3 until the thermostat 201 is satisfied and discontinues the call for heating. At Step 611 the Fan Controller checks if input 216 from a gas furnace heat-source on terminal 208 is ON. If Fan Controller input 216 is ON, the fan controller continues to accumulate heat-source operational time P3.

If at Step 611, the fan controller input 216 is OFF, then at Step 613 the fan controller determines that the gas furnace satisfies the thermostat and the heat-source is OFF. At Step 615 the fan controller stores the furnace heat-source operational time P3. At Step 617 calculates the fan controller variable fan-off delay time P2 as a function of gas furnace heat-source operational time P3 based on signals present on thermostat or equipment terminals. At Step 619 a loop provides the extended fan-off delay time P2 until P2 has expired. At Step 621, after P2 has expired, the fan controller de-energizes signal output 212, turns OFF the fan relay 205 and fan 206, and returns to Step 501 for the next cycle (FIG. 23).

Figure 25:
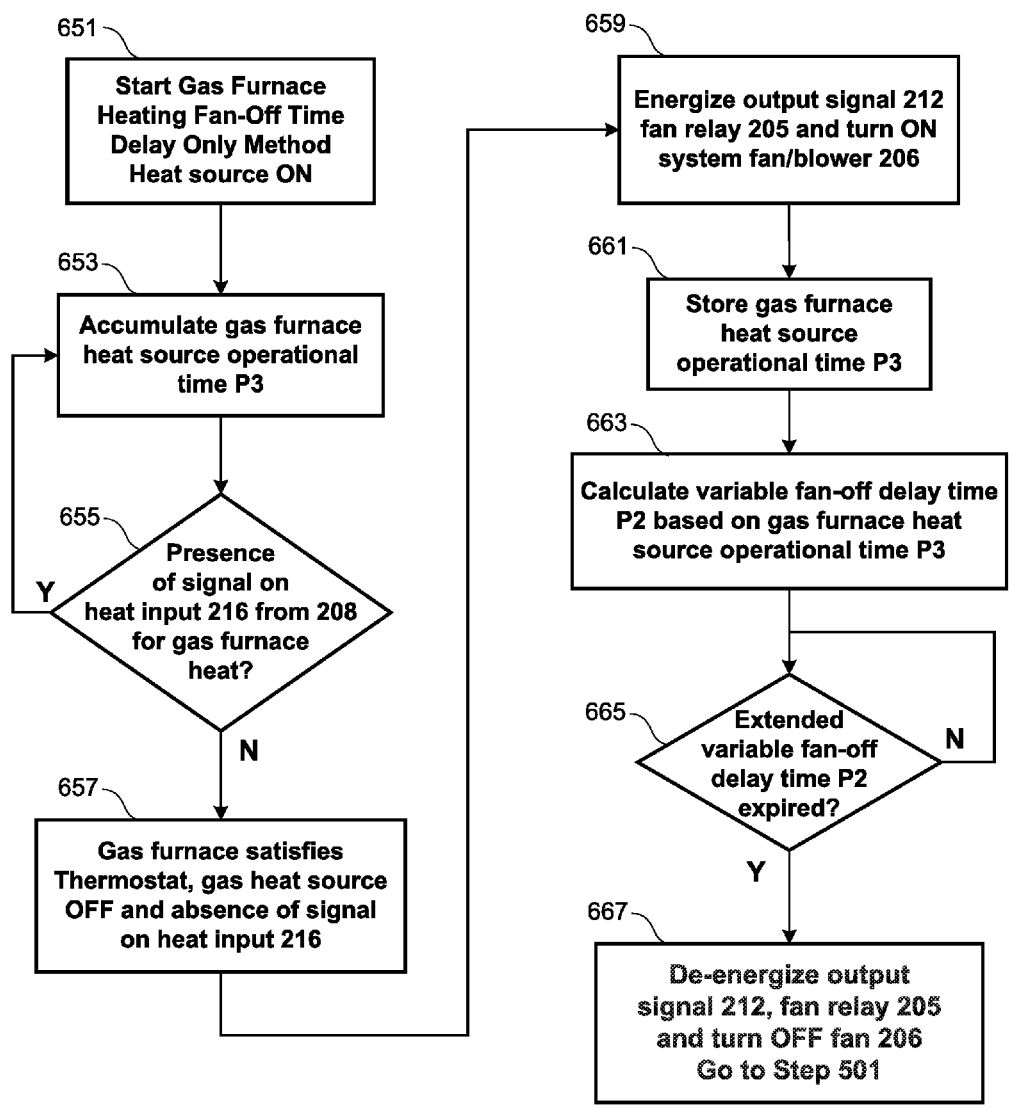

FIG. 25 shows a fan controller gas furnace heating fan-off time delay only method according to an embodiment of the present invention. This is the simplest embodiment of the present invention that works for any gas furnace HVAC system 100. FIG. 25 begins at Step 651 and starts the gas furnace heating fan-off time delay method with the heat-source ON. At Step 653 the fan controller accumulates (or otherwise measures) gas heat-source operational time P3. At Step 655 the fan controller checks if input 216 from the gas furnace heat-source on terminal 208 is ON. If fan controller input 216 is ON, then the fan controller continues to accumulate heat-source operational time P3. If at Step 655, the fan controller input 216 is OFF, then at Step 657 the fan controller determines that the gas furnace satisfies the thermostat based on an absence of a low-voltage signal on fan controller heat input 216, and the heat-source is OFF. At Step 659, after the gas furnace heat-source operational time P3 has expired, the fan controller energizes switch 301 which takes over control of the low-voltage fan signal from the thermostat"G" terminal (204) and provides a 24 VAC signal to fan controller output 212 which in turn activates the fan relay 205 and turns ON the system fan/blower fan 206 At Step 661 the fan controller stores the furnace heat-source operational time P3. At Step 663 the fan controller calculates the variable fan-off delay time P2 based on gas furnace heat-source operational time P3. At Step 665 a loop provides the extended fan-off delay time P2 until P2 has expired. At Step 667, after P2 has expired, the fan controller de-energizes signal output 212, turns OFF the fan relay 205 and fan 206, and returns to Step 501 for the next cycle (FIG. 23).

Figure 26:
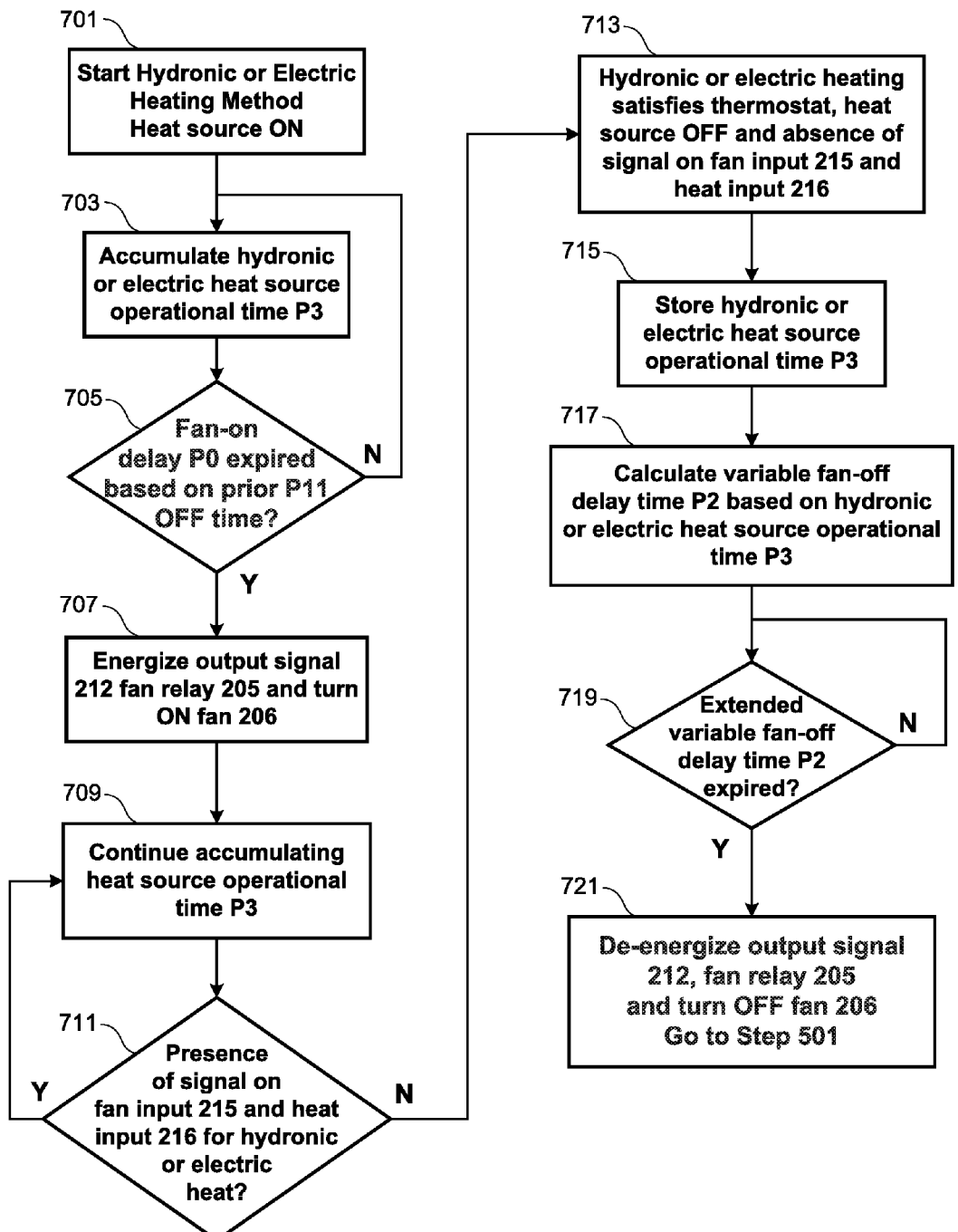
FIG. 26 shows a method for determining variable fan-on and fan-off time delays based on the heat mode operational time for a hydronic or electric resistance heating system, according to the present invention.

FIG. 26 shows a fan controller hydronic or electric heating method according to the present invention. At Step 701 the fan controller starts the hydronic or electric heating method with the heat-source ON. At Step 703 the fan controller accumulates heat-source operational time P3. At Step 705 the fan controller determines whether or not the fan-on delay time P0 has expired based on the prior off-cycle duration P11. In one embodiment, if the hydronic or electric resistance heating system has been OFF for less than 5 minutes, then the fan-on delay time P0 is set to zero, and if the hydronic or electric resistance heating system has been OFF from 5 minutes to 30 minutes or longer, then the fan-on delay time can vary from 5 seconds minimum to 15 seconds maximum. The fan-on time delay P0 is increased from 0 to 15 seconds maximum based on off-cycle duration P11 because it takes longer for the heating coil (or electric resistance elements) to reach a useful heating temperature required to deliver warm air to the conditioned space. In another embodiment, the fan controller may set the fan-on time delay P0 to zero for any HVAC system 100 or mode of heating or cooling operation. In another embodiment, the fan controller may set the gas furnace heater fan-on time delay P1 to the heat-source operational time P3.

At Step 707, after the fan-on delay time P0 has expired, the fan controller energizes the switch 301 which provides a 24 VAC signal to fan controller output 212 which in turn activates the fan relay 205 and turns ON the blower fan 206. At Step 709 the fan controller initiates a loop that runs continuously to accumulate heat-source operational time P3 until the thermostat 201 is satisfied and discontinues the call for heating. At Step 711 the fan controller checks if the input signal 216 from terminal 208 is ON. If the fan controller input signal 216 is ON, the fan controller accumulates heat-source operational time P3. If fan controller input 216 is OFF, at Step 713 the fan controller determines that the hydronic or electric heating satisfies the thermostat. At Step 715 the fan controller stores heat-source operational time P3. At Step 717 the fan controller calculates the variable fan-off delay time P2 based on heat-source operational time P3. At Step 719 the fan controller initiates a loop to operate the extended fan-off delay time until P2 has expired and when P2 has expired. At Step 721, after the extended fan-off delay time P2 has expired, the fan controller de-energizes signal output 212, turns OFF the fan relay 205 and the fan 206, and returns to Step 501 for the next cycle (FIG. 23).

Figure 27:
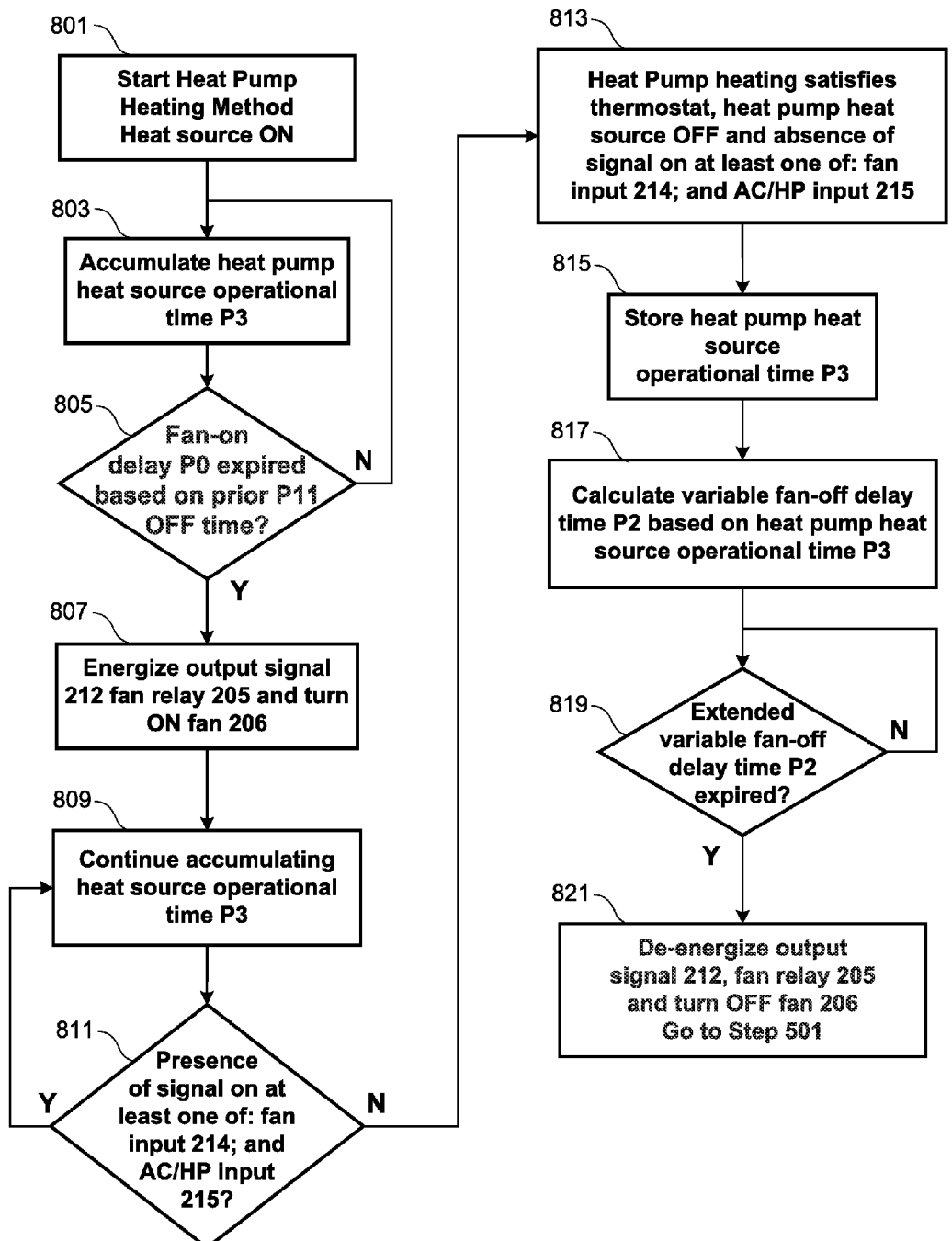
FIG. 27 shows a method for determining variable fan-on and fan-off time delays based on the heat mode operational time for a heat pump heating system, according to the present invention.

FIG. 27 shows a fan controller heat pump heating method according to the present invention. At Step 801 the fan controller starts the method with the heat pump heat-source ON. At Step 803 the fan controller accumulates heat-source operational time P3. At Step 805 the fan controller determines whether or not the fan-on delay time P0 has expired based on prior off-cycle duration P11. In one embodiment, if the heat pump heating system has been OFF for less than 5 minutes, then the fan-on delay time P0 is set to zero, and if the heat pump heating system has been OFF from 5 minutes to 30 minutes or longer, then the fan-on delay time can vary from 5 seconds minimum to 15 seconds maximum. The fan-on time delay P0 is increased from 0 to 15 seconds maximum based on off-cycle duration P11 because it takes longer for the heating coil to reach a useful heating temperature required to deliver warm air to the conditioned space. In another embodiment, the fan controller may set the heat pump heating fan-on time delay P0 to zero.

At Step 807, after the fan-on delay time P0 has expired, the fan controller energizes switch 301 which drives a 24 VAC signal to fan controller output 212 which in turn activates the fan relay 205 and turns ON the blower fan 206. At Step 809 the fan controller initiates a loop which runs continuously to accumulate heat-source operational time P3.

At Step 811 the fan controller checks for the presence of a signal on at least one of: 1) fan input 214 from thermostat fan "G" terminal 204; and AC/HP input 215 from the thermostat AC "Y" terminal 207. If either signal input 214 or 215 are ON, then the fan controller accumulates heat-source operational time P3 by continuing to loop through Step 811 and Step 809 until the thermostat 201 is satisfied and heating is discontinued.

If the heat pump enters a defrost cycle during heating mode, the fan controller signal inputs 214 (fan signal from thermostat "G" terminal 204) and 215 (AC/HP compressor signal from thermostat "Y" terminal 207) continues to be energized, but the reversing valve signal changes from heating to cooling mode (energized for "O" and de-energized for "BR") to operate the refrigeration cycle in reverse to defrost the outdoor coil. The fan controller allows the system to operate during the defrost cycle and continue to accumulate heat-source operational time P3. Defrost operation occurs when outdoor air temperatures are less than freezing (i.e., 32° F.). Lower outdoor air temperatures increase building heat losses and reduce heat pump condenser indoor-coil temperatures and heating energy available for heat recovery from extended fan operation after the heat-source has been de-energized (see FIG. 17). According to one embodiment of the present invention, the fan controller uses the heat-source operational time P3 as a proxy for lower OAT below freezing which causes defrost cycles to occur. The fan controller does not interfere with the heat pump defrost cycle. Nor does the heat pump defrost cycle interfere with the fan controller accumulation of heat-source operational time P3 used to calculate the extended fan-off time delay P2 to optimize heating efficiency.

If the fan controller determines that either of the fan controller signal inputs 214 or 215 are not energized, then the fan controller continues to Step 813 where the heat pump heating system satisfies the thermostat and the heat-source is OFF and the fan controller signal detects the absence a low-voltage signal on inputs 214 and 215.

At Step 815 the fan controller stores heat-source operational time P3.

At Step 817 the fan controller calculates the fan controller variable fan-off delay time P2 based on heat-source operational time P3. At Step 819 the fan controller initiates a loop to operate the extended fan-off delay time until P2 has expired.

At Step 821, when P2 has expired, fan controller de-energizes fan signal output 212, to turn OFF the fan relay 205 and the fan 206, and returns to Step 501 for the next cycle (FIG. 23).

FIG. 28 shows a fan controller cooling method according to the present invention. At Step 901 the fan controller starts the method with the cool-source ON. At Step 903 the fan controller accumulates cool-source operational time P4. At Step 905 the fan controller determines whether or not the fan-on delay time P0 has expired based on prior off-cycle duration P11. In one embodiment, if the cooling system has been OFF for less than 5 minutes, then the fan-on delay time P0 is set to zero, and if the cooling system has been OFF from 5 minutes to 30 minutes or longer, then the fan-on delay time can vary from 5 seconds minimum to 15 seconds maximum. The fan-on time delay P0 is increased from 0 to 15 seconds maximum based on off-cycle duration P11 because it takes longer for the cooling coil to reach a useful cooling temperature required to deliver cool air to the conditioned space. In another embodiment, the fan controller may set the cooling fan-on time delay P0 to zero.

At Step 907, after the fan-on delay time P0 has expired, the fan controller energizes switch 301 which drives a 24 VAC signal to fan controller output 212 which in turn activates the fan relay 205 and turns ON the blower fan 206.

At Step 908, for thermostats or controllers that de-energize the heat pump reversing valve at the end of the AC/HP compressor cooling operational time, the fan controller can optionally energize switch 304 which drives a 24 VAC signal to fan controller output 222 which in turn activates reversing valve 263 to maintain the normally energized position of the heat pump reversing valve 263 for the entire duration of the AC/HP compressor cool-source operational time and the fan-off time delay time period to maximize energy recovery.

At Step 909 the fan controller initiates a loop which runs continuously to accumulate cool-source operational time P4 until the thermostat 201 is satisfied and discontinues the call for cooling. At Step 911 the fan controller checks for the presence of a signal on at least one of: 1) fan input 214 from thermostat fan "G" terminal 204; and 2) AC/HP input 215 from the thermostat AC "Y" terminal 207. If either signal input 214 or 215 are ON, then the fan controller accumulates cool-source operational time P4. If the fan controller determines both signal inputs 214 or 215 are not energized, then the fan controller continues to Step 913 where the cooling system satisfies the thermostat and the cool source is OFF and the fan controller signal detects the absence a low-voltage signal on inputs 214 and 215. At Step 915 the fan controller stores cool-source operational time P4. At Step 917 the fan controller calculates the variable fan-off delay time P2 based on cool-source operational time P4. At Step 919, the fan controller initiates a loop to operate the extended fan-off time delay P2 until it has expired. At Step 921, after P2 has expired, the fan controller de-energizes signal output 212, turns OFF the fan relay 205 and the fan 206.

At Step 923, the fan controller can optionally de-energize output signal 222 to de-energize heat pump reversing valve 263.

At Step 925, the fan controller goes to Step 501 for the next cycle (FIG. 20).

While the present invention has been described as apparatus and methods for a fan controller, the apparatus and methods described above may be integrated into a thermostat, economizer controller, equipment controller, or the like, and any device including these apparatus and/or methods is intended to come within the scope of the present invention.

While the invention herein disclosed has been described by means of specific embodiments and applications thereof, numerous modifications and variations could be made thereto by those skilled in the art without departing from the scope of the invention set forth in the claims.

LIST OF ELEMENTS

1—a display on the thermostat 200 embodiment.
2—a home button on the thermostat 200 embodiment.
3—an up button on the thermostat 200 embodiment.
4—a curve representing the delivered heating efficiency for a gas furnace HVAC system 100 with the known fixed fan-off time delay and low fan speed operation.
5—a down button on the thermostat 200 embodiment.
6—a curve representing the increase in delivered heating efficiency for the same gas furnace HVAC system 100 with the fan controller switching the blower fan from the low fan speed used for heating to the high fan speed used for cooling plus extended variable fan-off time delay P2 based on heat-source operational time P3.
7—a screen button on the thermostat 200 embodiment.
8—a curve representing the delivered sensible cooling efficiency for a direct-expansion air conditioning system with a known fixed fan-off time delay.
9—an occupancy sensor on the thermostat 200 embodiment.
10—a curve representing the increase in sensible cooling efficiency for the same direct-expansion air conditioning system with the fan controller providing an extended variable fan-off time delay P2 based on cool-source operational time P4.
12—a curve representing the delivered sensible heating efficiency COP for a heat pump or hydronic HVAC system 100 in heating mode with no fan-on time delay representing the negative value in sensible heating that occurs when the system fan/blower is activated before a heat pump or hydronic system has generated useful heat and no fan-off time delay.
14—a curve representing the increase in delivered heating efficiency COP for the same heat pump or hydronic HVAC system 100 in heating mode with the fan controller providing a short variable fan-on time delay based on the off-cycle duration P11 and an extended variable fan-off time delay P2 based on heat-source operational time P3 to increase delivered heating capacity and efficiency for the heat pump or hydronic heating system.
16—a curve representing the temperature rise above the return air temperature generated in a gas forced-air furnace operating for an equivalent heat-source operational time P3 and variable fan-only operational time P2.
18—a curve representing the temperature rise above the return air temperature generated in a hydronic heating system with supply water temperature of 140° F. operating for 10 minutes of heat-source operational time P3 and variable fan-only operational time P2.
20—a curve representing the temperature rise above the return air temperature generated in a hydronic heating system with supply water temperature of 130° F. operating for 10 minutes of heat-source operational time P3 and variable fan-only operational time P2.
22—a curve representing the temperature rise above the return air temperature generated in an electric resistance heating system operating for 10 minutes of heat-source operational time P3 and variable fan-only operational time P2.
24—a curve representing the temperature rise above the return air temperature generated in a heat pump system with an outdoor air temperature of 47° F. operating for 10 minutes of heat-source operational time P3 and variable fan-only operational time P2.
26—a curve representing the temperature rise above the return air temperature generated in a heat pump system with an outdoor air temperature of 17° F. operating for 10 minutes of heat-source operational time P3 and variable fan-only operational time P2.
27—a curve representing the temperature rise above the return air temperature generated in a heat pump system with an outdoor air temperature of 0° F. operating for 10 minutes of heat-source operational time P3 and variable fan-only operational time P2.
28—a curve representing the temperature rise above the return air temperature generated in a gas forced-air furnace with equivalent heating output to satisfy the thermostat based on varying the heat-source operational time P3 and variable fan-only operational time P2 for the fan control.
30—a curve representing the temperature rise above the return air temperature generated in a hydronic heating system with supply water temperature of 140° F. with equivalent heating output to satisfy the thermostat based on varying the heat-source operational time P3 and variable fan-only operational time P2 for the fan control.
32—a curve representing the temperature rise above the return air temperature generated in a hydronic heating system with supply water temperature of 130° F. with equivalent heating output to satisfy the thermostat based on varying the heat-source operational time P3 and variable fan-only operational time P2 for the fan control.

34—a curve representing the temperature rise above the return air temperature generated in an electric resistance heat furnace with equivalent heating output to satisfy the thermostat based on varying the heat-source operational time P3 and variable fan-only operational time P2 for the fan control.

36—a curve representing the temperature rise above the return air temperature generated in a heat pump system with an outdoor air temperature of 47° F. with equivalent heating output to satisfy the thermostat based on varying the heat-source operational time P3 and variable fan-only operational time P2 for the fan control.

38—a curve representing the temperature rise above the return air temperature generated in a heat pump system with an outdoor air temperature of 17° F. with equivalent heating output to satisfy the thermostat based on varying the heat-source operational time P3 and variable fan-only operational time P2 for the fan control.

40—a curve representing the temperature rise above the return air temperature generated in a heat pump system with an outdoor air temperature of 0° F. with equivalent heating output to satisfy the thermostat based on varying the heat-source operational time P3 and variable fan-only operational time P2 for the fan control.

50—a curve showing a known fan control with constant fan operation during unoccupied periods of time causing over ventilation and constant fan power consumption and increased heating power consumption.

52—a curve showing unoccupied fan-off control reduces fan and heating power consumption and energy usage according to an embodiment of the present invention.

54—a curve showing a known fan control with constant fan operation during unoccupied periods of time causing over ventilation and constant fan power consumption and increased cooling power consumption.

56—a curve showing unoccupied fan-off control reduces fan and cooling power consumption and energy usage according to an embodiment of the present invention.

70—a curve representing laboratory test data of cooling temperature split (° F.) across the evaporator (i.e., entering evaporator air dry-bulb temperature minus leaving evaporator dry-bulb temperature) for 5 minutes of cool-source operational time P4 and a 3-minute fan-off time delay P2 providing a 32% efficiency improvement compared to the same unit with no time delay.

72—a curve representing field test data of cooling temperature split (° F.) across the evaporator for 10 minutes of cool-source operational time P4 and a 4-minute fan-off time delay P2 providing a 15% efficiency improvement compared to the same unit with no time delay.

74—a curve representing field test data of cooling temperature split (° F.) across the evaporator for 15 minutes of cool-source operational time P4 and a 4-minute fan-off time delay P2 providing a 10% efficiency improvement compared to the same unit with no time delay.

76—a curve representing field test data of cooling temperature split (° F.) across the evaporator for 15-minutes of cool-source operational time P4 and an 8.5-minute fan-off time delay P2 providing a 6% efficiency improvement compared to the same unit with no time delay. The 8.5-minute (extra 4.5-minutes compared to curve 74) of fan-off delay reduced sensible efficiency by 34%.

80—a curve representing laboratory test data of sensible EER and total power (kW) for 5 minutes of cool-source operational time and a 3-minute fan-off time delay P2 providing a 32% efficiency improvement compared to the same unit with no time delay.

82—a curve representing laboratory test data of sensible EER and total power (kW) for 10 minutes of cool-source operational time and a 3-minute fan-off time delay P2 providing a 15% efficiency improvement compared to the same unit with no time delay.

84—a curve representing laboratory test data of sensible EER and total power (kW) for 15 minutes of cool-source operational time and a 4-minute fan-off time delay P2 providing a 10% efficiency improvement compared to the same unit with no time delay.

86—a curve representing laboratory test data of sensible EER and total power (kW) for 15 minutes of cool-source operational time P4 and a 8.5-minute fan-off time delay P2 providing a 6% efficiency improvement compared to the same unit with no time delay. The additional 4.5-minute fan-off time delay reduces the efficiency improvement by about 34% due to zero temperature split and sensible cooling delivered at the end of the fan-off time delay.

88—a curve representing laboratory test data of sensible EER and total power (kW) for 30 minutes of cool-source operational time P4 and a 4-minute fan-off time delay P2 providing a 5% efficiency improvement compared to the same unit with no time delay.

100—an HVAC system.
101—a control board on an HVAC system.
103—a combustion air inducer on an HVAC system with a gas furnace.
105—an igniter on an HVAC system with a gas furnace.
107—a gas valve an HVAC system with a gas furnace.
109—a burner on an HVAC system with a gas furnace.
111—a heat exchanger on an HVAC system including a gas furnace heat exchanger, electric resistance coil, or hydronic heating coil.
113—a pressure switch on an HVAC system with a gas furnace.
115—a gas manifold on an HVAC system with a gas furnace.
117—an AC or HP compressor.
119—an evaporator in cooling mode or a condenser on a heat pump in heating mode.
121—a condenser in cooling mode or an evaporator on a heat pump in heating mode.
123—a condenser fan.
200—a thermostat.
201—a thermostat or equipment control terminals.
202—a furnace heat-source control used to indicate a device that when energized, produces heating for the system.
203—an AC compressor control used to indicate a device that when energized produces cooling for the system when the system is a direct-expansion cooling system; In a heat pump, this device is energized in both heating and cooling. The heating or cooling mode is determined by the reversing valve 263, and 264.
204—a FAN "G" terminal of a thermostat energized when the system fan is ON or the thermostat calls for air conditioning.
205—a high-speed relay used to indicate a device that when energized connects 120 VAC to the high speed tap of the system fan/blower 206.
206—a system fan/blower used to indicate a multiple speed motor with a low, medium, and high fan speed tap or setting.
207—an AC compressor thermostat "Y" terminal of the thermostat energized when the thermostat calls for cooling.

208—a heat thermostat "W" terminal energized when the thermostat calls for heating.

209—a Hot thermostat "R" terminal connected to the Hot leg 210b of the 24 VAC system transformer 210.

210—a system transformer used to step down the input voltage of 120 VAC to the 24 VAC system voltage with a neutral leg 210a and a hot leg 210b.

210a—a neutral or common leg 210a of the system transformer 210.

210b—a Hot leg 210b of the system transformer 210.

211—an embodiment of the fan controller 211.

212—a fan controller output signal to activate the fan relay 205 and when energized turns on the system fan/blower 206 to high speed and when de-energized can either stop the system fan/blower 206 or return control of the system fan/blower 206 to the low-speed relay on the furnace fan controller 238.

213—a fan Controller input signal connected to the Hot leg 210b of the system transformer where this signal is actually the system ground signal for the fan controller 211.

214—a fan controller fan signal input used to detect the presence or absence of a low-voltage fan signal on a thermostat "G" terminal 204 to determine system type and cooling or heating mode of operation based on other fan controller inputs, allow measurement of an off-cycle time P11, and used as a proxy to measure cool-source operational time P4 or heat-source operational time P3 in order to calculate a fan-off time delay P2. The fan controller fan signal input 214 is active when the fan is on, or when the AC compressor is on, or for a heat pump when the thermostat is calling for heating or cooling based on the signal to the reversing valve. The fan controller fan signal input 214 can be used as a proxy for the compressor operation and therefore, be used to measure the duration of compressor cool-source operational time P4. For a heat pump system, the fan controller fan signal input 214 can be used to determine the duration of the cool-source operational time P4 or heat-source operational time P3 depending on the status of the signal to the reversing valve 216 and the HPD signal input 234.

215—an optional fan controller AC compressor input signal used to detect the presence or absence of a low-voltage fan signal on the AC thermostat "Y" terminal 207 to determine system type and cooling or heating mode of operation based on other fan controller inputs, allow measurement of an off-cycle time P11, and used as a proxy to measure cool-source operational time P4 or heat-source operational time P3 in order to calculate a fan-off time delay P2. The fan controller AC signal input 215 is active when the AC compressor is on, or for a heat pump when the thermostat is calling for heating or cooling based on the signal to the reversing valve. The fan controller fan signal input 215 can be used to measure the duration of compressor cool-source operational time P4. For a heat pump system, the fan controller fan signal input 215 can be used to determine the duration of the cool-source operational time P4 or heat-source operational time P3 depending on the status of the signal to the reversing valve 216 and the HPD signal input 234.

216—a fan controller heat-source or HP reversing valve signal input used to detect the presence or absence of a low-voltage heat signal on the thermostat "W" terminal 208 to determine system type and cooling or heating mode of operation based on other fan controller inputs, allow measurement of an off-cycle time P11, or to allow measurement of a cool-source operational time P4 or heat-source operational time P3 in order to calculate the fan-off time delay P2, or to detect the presence or absence of a low-voltage heat pump reversing valve signal on a thermostat "O" terminal (235) normally energized for cooling or a HP low-voltage reversing valve signal on the thermostat "BR" terminal (236) normally energized for heating.

217—a dashed line to indicate the disconnection of the FAN G terminal of the thermostat to the fan relay 205.

221—a fan controller input signal from the system transformer neutral side;

222—a fan controller output signal to activate the reversing valve 263 or 264 to maintain the position of the reversing valve for the entire duration of HP compressor operational time and fan-off delay time to maximize sensible energy recovery from a heat pump.

223—a neutral side of the system transformer connected to other elements of the system.

224—a dashed line to indicate the disconnection of the reversing valve thermostat or equipment terminal 235 or 236 to the reversing valve 263 or 264.

234—a fan controller HPD signal input used by the fan controller to detect the presence or absence of a low-voltage signal from the system transformer hot 210b to determine whether or not a heat pump is connected. If the HPD signal input 234 is not connected to the system transformer hot 210b, then the fan controller determines it is connected to a gas, hydronic, or electric HVAC system 100 type in cooling or heating mode of operation depending on the low-voltage signals on other fan controller signal inputs. If the HPD signal input 234 is connected by a wire 265 to the system transformer hot 210b, then the fan controller HPD signal input 216 receives an unrectified low-voltage signal and determine it is connected to a heat pump HVAC system 100 with reversing valve "O" energized in cooling mode and de-energized in heating mode where the mode of cooling or heating operation is detected by the presence or absence of a low-voltage signal on fan controller input 216 based on a connection to the REV "O" thermostat terminal 235 (see waveform 350 in FIG. 11). If the HPD signal input 234 is connected to the system transformer hot 210b with a wire and a diode 275 in either polarity, then the fan controller HPD signal input 216 receives a rectified low-voltage signal and determine it is connected to a heat pump with reversing valve "BR" energized in heating mode where the mode of cooling or heating operation is detected by the presence or absence of a low-voltage signal on fan controller input 216 based on a connection to the REV "BR" thermostat terminal 236 (see waveform 351 and 352 in FIG. 11).

235—a heat pump REV "O" terminal of the thermostat energized for cooling and de-energized for heating.

236—a heat pump REV "BR" terminal of the thermostat de-energized for cooling and energized for heating.

238—a furnace fan controller for controlling a low-speed fan relay (239) by the Original Equipment Manufacturer (OEM) controller which includes more elements than the low-speed relay 239 and the high-speed relay 205.

239—a low-speed relay representing a relay used to connect 120 VAC from the line input to the low-speed tap of the multiple speed system fan/blower 206.

240—a hydronic heat-source control used to indicate a device that when energized, produces heating for the hydronic HVAC system 100 using a coil heat exchanger with hot water circulated through the coil from a water heating tank or boiler.

241—an electric resistance heat-source control used to indicate a device that when energized, produces heating for the electric resistance HVAC system 100.

243—a heat pump compressor control used to indicate a device that when energized, produces air conditioning cooling and heat pump heating for the heat pump HVAC system 100.

263—a reversing valve energized for cooling used to indicate a reversing valve on a heat pump system that is energized for cooling and de-energized for heating and referred to as an Orange ("O") reversing valve.

264—a reversing valve energized for heating used to indicate a reversing valve on a heat pump system that is energized for heating and de-energized for cooling and referred to as a Brown ("BR") reversing valve.

265—a connection between the system transformer hot 210*b* and the fan controller HPD signal input 234 when connected with a wire as shown in FIG. 3 where the fan controller signal input 216 is connected to the heat pump REV "O" thermostat terminal 235 energized for cooling and de-energized for heating.

270—a DC rail voltage that powers the microprocessor and associated circuitry as well as charges a super capacitor 312 where the rail voltage can originate from the AC-DC converter, or the optional battery 306.

272—a signal from the zero crossing detector 302 to the microprocessor 304 indicating a transition on the 24 VAC signal either from a positive voltage to a negative voltage, or from a negative voltage to a positive voltage.

275—a diode used in the path between the system transformer hot 210*b* and the fan controller HPD signal input 234 where the system transformer Hot leg 210*b* provides a 24 VAC signal. In the preferred orientation, the diode 275 allows current flow in a positive cycle, and blocks current flow in a negative cycle (see waveform 351 in FIG. 11). The fan controller HPD signal input 234 is designed to accommodate the condition with the diode 275 reversed with current flowing in the negative cycle and blocked in the positive cycle (see waveform 352 in FIG. 11). If the diode were not in place as shown in FIG. 3, then the current into the fan controller HPD signal input 234 is allowed in both positive and negative cycles (see waveform 350 in FIG. 11). When this diode the connected in either orientation, the fan controller signal input 216 is defined as energized for heating and de-energized for cooling.

277—a dashed line used to indicate an optional connection between the thermostat AC "Y" terminal 207 and the fan controller AC signal input 215 where the low-voltage signal on the thermostat fan "G" terminal 204 is also active during cooling and can be used as a proxy for the low-voltage signal on the thermostat AC "Y" terminal 207.

301—a switching device used to indicate a device which connects the fan controller Hot signal input 213 to the fan controller fan signal output 212 to activate the high-speed fan relay 205.

302—a zero crossing detector used to indicate a function that signals to the microprocessor that the 24 VAC input to the fan controller has changed from either a positive voltage to a negative voltage, or from a negative voltage to a positive voltage.

303—an AC-DC converter taking multiple AC inputs and rectifies one or all to create a DC voltage to power the fan controller.

304—a microprocessor with flash memory used to indicate a device that is programmable to carry out the various tasks to enable the fan controller device to function.

305—an optional user interface used to indicate a function that allows a user to interact with the microprocessor. This interaction can be as simple as DIP switches to configure parameters, a key pad and display, or a communication interface such as USB or a wireless communication.

308—signal conditioning used to indicate a function that receives 24 VAC signals and conditions them to a level that can be safely read by the microprocessor 304.

306—an optional battery used to indicate an optional power source in the event the fan controller is unable to generate sufficient power from the input signals.

309—a relay used to connect the thermostat fan "G" terminal 204 to the high-speed relay 205 which eliminates the dashed line 217 to provide a hard connection. The purpose of this switch is to provide a fail-safe connection in the event the fan controller fails so the HVAC system 100 operates as though the fan controller were not connected to the circuit.

312—indicates an optional super capacitor which can be charged from the AC-DC converter and used to power the fan controller until sufficient voltage can be generated again from the fan controller input signals.

350—a curve representing the signal received by HPD signal input 234 when connected by a wire 265 to system transformer Hot lead 210*b*.

351—a curve representing the signal received by HPD signal input 234 when a wire with a diode 275 are connected between HPD signal input 234 and the system transformer Hot leg 210*b* with the cathode pointing toward the fan controller 211.

352—a curve representing the signal received by HPD signal input 234 when a wire and a diode 275 are connected between HPD signal input 234 and the system transformer Hot leg 210*b* with the anode pointing toward the fan controller 211.

We claim:

1. A fan controller (211) for a Heating Ventilation and Air Conditioning (HVAC) system (100) including a direct-expansion air conditioner and at least one of a gas furnace, a Heat Pump (HP), an electric heating element, and a hydronic heating element, the fan controller comprising:
electrical inputs configured to receive electrical signals from an HVAC thermostat or equipment control terminals (201), the electrical inputs comprising at least one of:
1) a fan controller fan signal input (214) configured to detect at least one of:
a presence of a low-voltage fan signal on a thermostat "G" terminal (204) to allow measurement of a cool-source operational time P4 or heat-source operational time P3 in order to calculate a fan-off time delay P2; and
an absence of a low-voltage fan signal on a thermostat "G" terminal (204) to allow measurement of an off-cycle time P11;
2) a fan controller heat source or HP reversing valve signal input (216), configured to detect at least one of:
a presence of a low-voltage heat source signal on a thermostat "W" terminal (208) to allow measurement of a heat-source operational time P3 in order to calculate the fan-off time delay P2;

an absence of a low-voltage fan signal on a thermostat "W" terminal (208) to allow measurement of the off-cycle time P11; and
a presence or absence of a low-voltage HP reversing valve signal on a thermostat "O" terminal (235) or thermostat "BR" terminal (236);
3) a fan controller AC or HP (AC/HP) compressor signal input (215) configured to detect at least one of:
a presence of a low-voltage AC/HP compressor signal on a thermostat "Y" terminal (207) to allow measurement of the cool-source operational time P4 or the heat-source operational time P3 in order to calculate the fan-off time delay P2; and
an absence of a low-voltage fan signal on a thermostat "Y" terminal (207) to allow measurement of the off-cycle time P11; and
4) a fan controller HP Detection (HPD) signal input (234) configured to detect a presence or absence of a low-voltage signal from a system transformer 24 VAC Hot leg (210b) connected to the fan controller HPD signal input (234) through one of:
a diode (275) to receive a rectified signal; and
a wire (265) to receive an unrectified signal;
to indicate whether or not the fan controller is connected to a HP and type of HP reversing valve;
a microprocessor (304);
a switching device (301) electrically connected to the microprocessor (304) to receive a control signal from the microprocessor (304);
a low-voltage DC power source electrically connected to the microprocessor (304), the DC power source selected from at least one of:
a low-voltage battery (306);
an AC-DC converter (303); and
a super capacitor (312); and
a fan controller fan relay signal output (212) from the switching device (301) configured to electrically connect to a fan relay (205) to provide a low-voltage fan relay signal to control the fan relay (205).

2. The fan controller of claim 1, wherein the electrical inputs include at least one of:
the fan controller fan signal input (214) from the low-voltage fan signal on the thermostat "G" terminal (204);
the fan controller AC/HP compressor signal input (215) from the low-voltage AC/HP compressor signal on the thermostat "Y" terminal (207); and
the fan controller heat source or HP reversing valve signal input (216) from at least one of:
1) the low-voltage heat source signal on the thermostat "W" terminal (208);
2) the low-voltage HP reversing valve signal on a thermostat "O" terminal (235); and
3) the HP low-voltage reversing valve signal on the thermostat "BR" terminal (236).

3. The fan controller of claim 1, wherein:
the low-voltage fan signal on the thermostat "G" terminal (204) is used as a proxy for at least one of:
the cool-source operational time P4; and
the heat-source operational time P3; and
the low-voltage AC/HP compressor signal on the thermostat "Y" terminal (207) is used as a proxy for at least one of:
the cool-source operational time P4; and
the heat-source operational time P3; and
the low-voltage heat signal on the thermostat "W" terminal (208) is used as a proxy for the heat-source operational time P3.

4. The fan controller of claim 1, wherein the electrical inputs further include one of:
the fan controller HPD signal input (234) configured to detect an absence of a signal or to receive the 24 VAC Hot signal on the thermostat "R" terminal (209); and
the system transformer 24 VAC Hot signal leg (210b) electrically connected and unrectified through the wire (265) or rectified through the diode (275) to the fan controller HPD signal input (234).

5. The fan controller of claim 1, wherein the DC power source comprises the AC-DC converter (303).

6. The fan controller of claim 5, wherein the AC-DC converter (303) is configured to receive current through at least one of:
1) the fan relay (205); and
2) a low-voltage AC power source input (221) from the system transformer (210).

7. The fan controller of claim 1, wherein the DC power signal comprises at least one of:
the low-voltage battery (306); and
the super capacitor (312).

8. The fan controller of claim 1, wherein the fan controller includes at least one of:
a user interface (305) configured for a user to select an HVAC system type for the microprocessor (304) to determine heating or cooling mode based on signals present on the HVAC thermostat or equipment control terminals (201); and
the microprocessor (304) configured to determine the HVAC system type and heating or cooling mode based on signals present on the HVAC thermostat or equipment control terminals (201) and the state of the fan controller HPD signal input (234).

9. The fan controller of claim 1, wherein the microprocessor (304) is configured to determine HVAC system type and cooling or heating mode based on signals present on the HVAC thermostat or equipment control terminals (201), for at least one HVAC system type including:
1) a gas furnace, hydronic or electric resistance HVAC system type in cooling mode;
2) a HP HVAC system type in cooling mode;
3) a gas furnace HVAC system type in heating mode;
4) a hydronic or electric HVAC system type in heating mode; and
5) a HP heating HVAC system type in heating mode.

10. The fan controller of claim 1, wherein the microprocessor (304) is configured to determine the gas furnace, hydronic or electric resistance HVAC system type in cooling mode based on at least one of:
1) a presence of the low-voltage fan signal on the thermostat "G" terminal (204) received by the fan controller fan signal input (214) and an absence of the low-voltage signal received by the fan controller heat source and an absence of the low-voltage signal on the HP reversing valve signal input (216) and an absence of the low-voltage signal on the fan controller HPD signal input (234); and
2) a presence of the low-voltage AC/HP compressor signal on the thermostat "Y" terminal (207) received by the fan controller AC/HP compressor signal input (215), and an absence of the low-voltage signal received by the fan controller heat source and an absence the low-voltage signal on the HP reversing valve signal input (216) and an absence of the low-voltage signal on the fan controller HPD signal input (234).

11. The fan controller of claim 1, wherein the microprocessor (304) is configured to determine the HP HVAC system type in cooling mode based on at least one of:
  1) a presence of the low-voltage fan signal on the thermostat "G" terminal (204) received by the fan controller fan signal input (214) and at least one of:
    a) a presence of the 24 VAC Hot signal on the thermostat "R" terminal (209) connected by the wire (265) and received by the fan controller HPD signal input (234), and a presence of the low-voltage signal on the reversing valve thermostat "O" terminal (235), electrically connected to the fan controller heat source or HP reversing valve signal input (216); and
    b) a presence of the system transformer 24 VAC Hot signal leg (210*b*) connected by the wire (265) and received by the fan controller HPD signal input (234), and a presence of low-voltage signal on the reversing valve thermostat "O" terminal (235), electrically connected to the fan controller heat source or HP reversing valve signal input (216); and
    c) a presence of the 24 VAC Hot signal on the thermostat "R" terminal (209) connected by the diode (275) and received by the fan controller HPD signal input (234), and an absence of the low-voltage signal on the reversing valve thermostat "BR" terminal (236), electrically connected to the fan controller heat source or HP reversing valve signal input (216); and
    d) a presence of the system transformer 24 VAC Hot signal leg (210*b*) connected by the diode (275) and received by the fan controller HPD signal input (234), and an absence of the low-voltage signal on the reversing valve thermostat "BR" terminal (236), electrically connected to the fan controller heat source or HP reversing valve signal input (216);
  2) a presence of the low-voltage AC/HP compressor signal on the thermostat "Y" terminal (207) received by the fan controller AC/HP compressor signal input (215) and at least one of:
    a) a presence of the 24 VAC Hot signal on the thermostat "R" terminal (209) connected by the wire (265) and received by the fan controller HPD signal input (234), and a presence of the low-voltage signal on the reversing valve thermostat "O" terminal (235), electrically connected to the fan controller heat source or HP reversing valve signal input (216); and
    b) a presence of the 24 VAC Hot signal on the system transformer 24 VAC Hot signal leg (210*b*) connected by the wire (265) and received by the fan controller HPD signal input (234), and a presence of the low-voltage signal on the reversing valve thermostat "O" terminal (235), electrically connected to the fan controller heat source or HP reversing valve signal input (216); and
    c) a presence of the 24 VAC Hot signal on the thermostat "R" terminal (209) connected through the diode (275) and received by the fan controller HPD signal input (234), and an absence of the low-voltage signal on the reversing valve thermostat "BR" terminal (236), electrically connected to the fan controller heat source or HP reversing valve signal input (216); and
    d) a presence of the 24 VAC Hot signal on the system transformer 24 VAC Hot signal leg (210*b*) connected through the diode (275) and received by the fan controller HPD signal input (234), and an absence of the low-voltage signal on the reversing valve thermostat "BR" terminal (236), electrically connected to the fan controller heat source or HP reversing valve signal input (216).

12. The fan controller of claim 1, wherein the microprocessor (304) is configured to determine the gas furnace HVAC system type in heating mode based on:
  a presence of the low-voltage heat source signal on the thermostat "W" terminal (208) electrically connected to the fan controller heat source or HP reversing valve signal input (216); and
  an absence of the low-voltage fan signal on the thermostat "G" terminal (204) received by the fan controller fan signal input (214); and
  an absence of the low-voltage signal received by the fan controller HPD signal input (234).

13. The fan controller of claim 1, wherein the microprocessor (304) is configured to determine the hydronic or electric HVAC system type is in heating mode based on:
  a presence of the low-voltage heat source signal on the thermostat "W" terminal (208) electrically connected to the fan controller heat source or HP reversing valve signal input (216); and
  a presence of the low-voltage fan signal on the thermostat "G" terminal (204) electrically connected to the fan controller fan signal input (214); and
  an absence of the low-voltage signal received by the fan controller HPD signal input (234).

14. The fan controller of claim 1, wherein the microprocessor (304) is configured to determine the HP heating HVAC system type in heating mode based on at least one of:
  1) a presence of the low-voltage fan signal on the thermostat "G" terminal (204) electrically connected to the fan controller fan signal input (214) and at least one of:
    a) a presence of the 24 VAC Hot signal on the thermostat "R" terminal (209) connected by the wire (265) and received by the fan controller HPD signal input (234), and an absence of the low-voltage signal on the reversing valve thermostat "O" terminal (235), electrically connected to the fan controller heat source or HP reversing valve signal input (216); and
    b) a presence of the system transformer 24 VAC Hot signal leg (210*b*) connected by the wire (265) and received by the fan controller HPD signal input (234), and an absence of the low-voltage signal on the reversing valve thermostat "O" terminal (235), electrically connected to the fan controller heat source or HP reversing valve signal input (216); and
    c) a presence of the 24 VAC Hot signal on the thermostat "R" terminal (209) connected by the diode (275) and received by the fan controller HPD signal input (234), and a presence of the low-voltage signal on the reversing valve thermostat "BR" terminal (236) electrically connected to the fan controller heat source or HP reversing valve signal input (216); and
    d) a presence of the system transformer 24 VAC Hot signal leg (210*b*) connected by the diode (275) and received by the fan controller HPD signal input (234), and a presence of the low-voltage signal on the reversing valve thermostat "BR" terminal (236) electrically connected to the fan controller heat source or HP reversing valve signal input (216); and 2) a presence of the low-voltage AC/HP compressor signal on the thermostat "Y" terminal (207) electrically connected to the fan controller AC/HP compressor signal input (215), and at least one of:
   a) a presence of the 24 VAC Hot signal on the thermostat "R" terminal (209) connected by the wire (265) and received by the fan controller HPD signal input (234), and an absence of the low-voltage signal on the reversing valve thermostat "O" terminal (235) electrically connected to the fan controller heat source or HP reversing valve signal input (216); and
   b) a presence of the system transformer 24 VAC Hot signal leg (210*b*) connected by the wire (265) and received by the fan controller HPD signal input (234), and an absence of the low-voltage signal on the reversing valve thermostat "O" terminal (235) electrically connected to the fan controller heat source or HP reversing valve signal input (216); and
   c) a presence of the 24 VAC Hot signal on the thermostat "R" terminal (209) connected by the diode (275) and received by the fan controller HPD signal input (234), and a presence of the low-voltage signal on the reversing valve thermostat "BR" terminal (236) electrically connected to the fan controller heat source or HP reversing valve signal input (216); and
   d) a presence of the system transformer 24 VAC Hot signal leg (210*b*) connected by the diode (275) and received by the fan controller HPD signal input (234), and a presence of the low-voltage signal on the reversing valve thermostat "BR" terminal (236) electrically connected to the fan controller heat source or HP reversing valve signal input (216).

15. The fan controller of claim 1, wherein the microprocessor (304) is configured to provide the control signal to the switching device (301) to control the fan relay (205) and the system fan/blower (206) for the gas furnace, the hydronic, the electric resistance, or the HP HVAC system in heating mode, by:
   measuring the off-cycle duration P11 during which the fan controller is not receiving an indication of heat source operation; and
   calculating a fan-on time delay based on at least one of:
      a fan-on delay time P0 consisting of at least one of:
         a zero fan-on time delay P0; and
         a non-zero fan-on time delay P0 as a function of the off-cycle duration P11; and
      a fan-on delay time P1 consisting of at least one of:
         a non-zero fan-on delay time P1 as a function of heat-source operational time P3; and
         a non-zero fan-on delay time P1 equal to heat-source operational time P3; and
   interrupting the low-voltage signal on the fan controller fan signal input (214) from the low-voltage fan signal on the thermostat "G" terminal (204) to the fan relay (205) and de-energizing the low-voltage signal on the fan controller fan relay signal output (212) to the fan relay (205) during the fan-on time delay, wherein the system fan/blower (206) is controlled by at least one of:
      1) the fan controller microprocessor (304) and the switching device (301) electrically connected to the microprocessor (304) to receive the control signal from the microprocessor (304), to provide the control signal to the fan controller fan relay signal output (212), to control the fan relay (205); and
      2) a furnace fan controller (238) controlling a furnace fan relay (239);
initiating the measurement of the heat-source operational time P3;
delaying energizing the low-voltage signal to the fan controller fan relay signal output (212) until the fan-on time delay has expired based on at least one of:
   1) the current heat-source operational time P3 for the gas furnace HVAC system based on the low-voltage heat signal present on the thermostat "W" terminal (208); and
   2) the fan-on delay time P1 for the gas furnace HVAC system while the current accumulation of heat-source operational time P3 is less than the fan-on delay time P1; and
   3) the fan-on delay time P0 for the hydronic, the electric resistance, or the HP HVAC system while the current accumulation of heat-source operational time P3 is less than the fan-on delay time P0;
energizing the low-voltage signal on the fan controller fan relay signal output (212) to the fan relay (205) thereby turning ON the system fan/blower (206) after the fan-on time delay time has expired;
operating the system fan/blower (206) for the entire duration of the heat-source operational time P3 while the thermostat signal continues to indicate the heat source operation based on the continuous low-voltage thermostat signal;
measuring the heat-source operational time P3 until the thermostat signal dis-continues to indicate the heat source operation based on receiving no indication of the heat source operation by the fan controller; and
calculating a fan-off time delay period P2 as a function of the heat-source operational time P3;
providing the control signal to the switching device (301) to continue to provide the low-voltage control signal on the fan controller fan relay signal output (212) to control the fan relay (205) by the fan controller to continue to operate the system fan/blower (206) for the fan-off time delay period P2 after the thermostat signal dis-continues to indicate the heat source operation;
waiting the fan-off time delay period P2 while continuing to provide the low-voltage signal on the fan controller fan relay signal output (212) to control the fan relay (205) for the entire fan-off time delay period P2 when the fan-off time delay period P2 elapses, by the fan controller; and
de-energizing the low-voltage signal on the fan controller fan relay signal output (212) to the fan relay (205) when the fan-off time delay period P2 elapses, by the fan controller.

16. The fan controller of claim 15, wherein measurement of the off-cycle duration P11 is based on receiving no indication of the heat source operation by the fan controller, from at least one of:
   1) an absence of the low-voltage signal on the fan controller heat source or HP reversing valve signal input (216), and an absence of the fan controller HPD signal input (234); and
   2) an absence of the low-voltage signal on the fan controller fan signal input (214) and a presence of the low-voltage unrectified, positively rectified, or negatively rectified signal on the fan controller HPD signal input (234).

17. The fan controller of claim 15, wherein the fan-on delay time P0 comprises at least one of:
   a zero time delay; and
   a non-zero time delay based on the off-cycle duration P11.

18. The fan controller of claim 15, wherein the measurement of the heat-source operational time P3 is based on at least one of:
   1) a presence of the low-voltage heat source signal on the thermostat "W" terminal (208) received by the fan controller heat source or HP reversing valve signal input (216) and an absence of the low-voltage fan signal on the thermostat "G" terminal (204) received by the fan controller fan signal input (214) and an absence of the low-voltage fan controller HPD signal input (234) for the gas furnace HVAC system;
   2) a presence of the low-voltage fan signal on the thermostat "G" terminal (204) received by the fan controller fan signal input (214) and a presence of the low-voltage heat source signal on the thermostat "W" terminal (208) received by the fan controller heat source or HP reversing valve signal input (216) and an absence of the low-voltage signal on the fan controller HPD signal input (234) for the hydronic or electric resistance HVAC system;
   3) a presence of the low-voltage fan signal on the thermostat "G" terminal (204) received by the fan controller fan signal input (214) and an absence of a low-voltage signal on the HP reversing valve thermostat "O" terminal (235) received by the fan controller heat source or HP reversing valve signal input (216), and a presence of the unrectified low-voltage signal on the fan controller HPD signal input (234) connected with the wire (265) to the 24 VAC Hot signal on the thermostat "R" terminal (209) or the system transformer 24 VAC Hot signal leg (210b) for a heat pump HVAC system with reversing valve energized in cooling mode; and
   4) a presence of the low-voltage fan signal on the thermostat "G" terminal (204) received by the fan controller fan signal input (214) and a presence of a low-voltage signal on the HP reversing valve thermostat "BR" terminal (236) received by the fan controller heat source or HP reversing valve signal input (216), and a presence of the positively or negatively rectified low-voltage signal on the fan controller HPD signal input (234) connected with the diode (275) to the thermostat Hot "R" terminal or the system transformer 24 VAC Hot signal leg (210b) for a heat pump HVAC system with reversing valve energized in heating mode;
   5) a presence of the low-voltage AC/HP signal on the thermostat "Y" terminal (207) received by the fan controller fan signal input (215) and an absence of the low-voltage signal on the HP reversing valve thermostat "O" terminal (235) received by the fan controller heat source or HP reversing valve signal input (216), and a presence of the unrectified low-voltage signal on the fan controller HPD signal input (234) connected with the wire (265) to the 24 VAC Hot signal on the thermostat "R" terminal (209) or the system transformer 24 VAC Hot signal leg (210b) for the heat pump HVAC system with reversing valve energized in cooling mode; and
   6) a presence of the low-voltage AC/HP signal on the thermostat "Y" terminal (207) received by the fan controller fan signal input (215) and a presence of the low-voltage signal on the HP reversing valve thermostat "BR" terminal (236) received by the fan controller heat source or HP reversing valve signal input (216), and a presence of the positively or negatively rectified low-voltage signal on fan controller HPD input (234) connected with the diode (275) to the thermostat Hot "R" terminal or the system transformer 24 VAC Hot signal leg (210b) for the heat pump HVAC system with reversing valve energized in heating mode.

19. The fan controller of claim 15, wherein measuring the heat-source operational time P3 until the thermostat signals discontinue to indicate that the heat source is operating by the fan controller based on at least one of:
   1) an absence of a low-voltage signal on the fan controller heat source or HP reversing valve signal input (216), and an absence of the fan controller HPD signal input (234); and
   2) an absence of a low-voltage signal on the fan controller fan signal input (214) and a presence of the low-voltage unrectified, positively rectified, or negatively rectified signal on the fan controller HPD signal input (234).

20. The fan controller of claim 1, wherein the microprocessor (304) is configured to provide the control signal to the switching device (301) to control the fan relay (205) and the system fan/blower (206) for the gas furnace, hydronic, electric resistance, or HP HVAC system types in cooling mode, by:
   measuring the off-cycle duration P11 based on an absence of an indication of cool source operation, by the fan controller;
   calculating the fan-on delay time P0 as at least one of:
      zero time delay; and
      non-zero time delay based on the off-cycle duration P11;
   receiving the indication of the cool source operation and measuring the cool-source operational time P4 by the fan controller;
   interrupting the electrical connection between the low-voltage fan signal on the thermostat "G" terminal (204) and the fan relay (205);
   measuring the cool-source operational time P4 while the cool-source is active for the fan-on delay time P0 wherein the low-voltage signal on the fan controller fan relay signal output (212) is de-energized to the fan relay (205) and system fan/blower (206) is OFF, based on the previous off-cycle duration P11;
   energizing the low-voltage signal on the fan controller fan relay signal output (212) by the fan controller to turn ON the fan relay (205) and turning ON the system fan/blower (206) by the fan controller after the fan-on delay time P0;
   continuing to measure the cool-source operational time P4 by the fan controller until operation of the cool source has ended, to determine the cool-source operational time P4;
   calculating the fan-off time delay period P2 as a function of the cool-source operational time P4;
   continuing providing the low-voltage signal on the fan controller fan relay signal output (212) to the fan relay (205) by the fan controller, until operation of the cool source has ended;
   waiting the fan-off time delay period P2 while continuing to provide the low-voltage signal on the fan controller fan relay signal output (212) to control the fan relay (205) for the entire fan-off time delay period P2, by the fan controller; and
   de-energizing the low-voltage signal on the fan controller fan relay signal output (212) to the fan relay (205) when the fan-off time delay period P2 elapses, by the fan controller.

21. The fan controller of claim 20, wherein measuring the off-cycle duration P11 is based at least one of:

1) an absence of the low-voltage signal on the fan controller fan signal input (214), and an absence of the low-voltage signal on the fan controller HPD signal input (234);
2) an absence of the low-voltage signal on the fan controller fan signal input (214), and a presence of the low-voltage unrectified, positively rectified, or negatively rectified signal on the fan controller HPD signal input (234);
3) an absence of the low-voltage signal on the fan controller AC/HP compressor signal input (215), and an absence of the low-voltage signal on the fan controller HPD signal input (234); and
4) an absence of the low-voltage signal on the fan controller AC/HP compressor signal input (215), and a presence of the low-voltage unrectified, positively rectified, or negatively rectified signal on the fan controller HPD signal input (234).

22. The fan controller of claim 20, wherein the measurement of the cool-source operational time P4 is based on at least one of:
1) a presence of the low-voltage signal on the fan controller fan signal input (214) and an absence of the low-voltage signal on the fan controller heat source or HP reversing valve signal input (216) and an absence of the low-voltage signal on the fan controller HPD signal input (234) for the gas furnace, hydronic or electric resistance HVAC system in cooling mode;
2) a presence of the low-voltage signal on the fan controller fan signal input (214) and a presence of the low-voltage signal on the fan controller heat source or HP reversing valve signal input (216) and a presence of the unrectified low-voltage signal on the fan controller HPD signal input (234) for the heat pump system with reversing valve "O" energized for cooling;
3) a presence of the low-voltage signal on the fan controller fan signal input (214) and an absence of the low-voltage signal on the fan controller heat source or HP reversing valve signal input (216) and a presence of the positively or negatively rectified low-voltage signal on the fan controller HPD signal input (234) for the heat pump system with reversing valve "BR" not energized for cooling;
4) a presence of the low-voltage signal on the fan controller AC/HP compressor signal input (215) and an absence of the low-voltage signal on the fan controller HPD signal input (234) for the gas furnace, hydronic or electric resistance HVAC system in cooling mode;
5) a presence of the low-voltage signal on the fan controller AC/HP compressor signal input (215) and a presence of the low-voltage signal on the fan controller heat source or HP reversing valve signal input (216) and a presence of the unrectified low-voltage signal on the fan controller HPD signal input (234) for the heat pump system with reversing valve "O" energized for cooling; and
6) a presence of the low-voltage signal on the fan controller AC/HP compressor signal input (215) and an absence of the low-voltage signal on the fan controller heat source or HP reversing valve signal input (216) and a presence of the positively or negatively rectified low-voltage signal on the fan controller HPD signal input (234) for the heat pump system with reversing valve "BR" not energized for cooling.

23. The fan controller of claim 20, wherein the fan controller measures the cool-source operational time P4 until the thermostat signal dis-continues to indicate the cool source operation, is based on at least one of:
1) an absence of the low-voltage signal on the fan controller fan signal input (214), and an absence of the low-voltage signal on the fan controller HPD signal input (234);
2) an absence of the low-voltage signal on the fan controller fan signal input (214), and a presence of the low-voltage unrectified, positively rectified, or negatively rectified signal on the fan controller HPD signal input (234);
3) an absence of the low-voltage signal on the fan controller AC/HP compressor signal input (215), and an absence of the low-voltage signal on the fan controller HPD signal input (234); and
4) an absence of the low-voltage signal on the fan controller AC/HP compressor signal input (215), and a presence of the low-voltage unrectified, positively rectified, or negatively rectified signal on the fan controller HPD signal input (234).

24. The fan controller of claim 20, wherein the cool-source operational time P4 is based on the duration of the continuous low-voltage signal measured on at least one of:
1) a presence of the low-voltage signal on the fan controller fan signal input (214) and an absence of the low-voltage signal on the fan controller heat source or HP reversing valve signal input (216) and an absence of the low-voltage signal on the fan controller HPD signal input (234) for the gas furnace, hydronic or electric resistance HVAC system in cooling mode;
2) a presence of the low-voltage signal on the fan controller fan signal input (214) and a presence of the low-voltage signal on the fan controller heat source or HP reversing valve signal input (216) and a presence of the unrectified low-voltage signal on the fan controller HPD signal input (234) for the heat pump system with reversing valve energized for cooling;
3) a presence of the low-voltage signal on the fan controller fan signal input (214) and an absence of the low-voltage signal on the fan controller heat source or HP reversing valve signal input (216) and a presence of the positively or negatively rectified low-voltage signal on the fan controller HPD signal input (234) for the heat pump system with reversing valve not energized for cooling;
4) a presence of the low-voltage signal on the fan controller AC/HP compressor signal input (215) and an absence of the low-voltage signal on the fan controller HPD signal input (234) for the gas furnace, hydronic or electric resistance HVAC system in cooling mode;
5) a presence of the low-voltage signal on the fan controller AC/HP compressor signal input (215) and a presence of the low-voltage signal on the fan controller heat source or HP reversing valve signal input (216) and a presence of the active unrectified low-voltage signal on the fan controller HPD signal input (234) for the heat pump system with reversing valve energized for cooling; and
6) a presence of the low-voltage signal on the fan controller AC/HP compressor signal input (215) and an absence of the low-voltage signal on the fan controller heat source or HP reversing valve signal input (216) and a presence of the positively or negatively rectified low-voltage signal on the fan controller HPD signal input (234) for the heat pump system with reversing valve not energized for cooling.

25. The fan controller of claim 20, wherein the fan-off time delay period P2 is linearly increased in cooling mode by the fan controller from zero to an upper limit as the cool-source operational time P4 increases from a minimum value to a maximum value or greater.

26. A fan controller for a Heating Ventilation and Air Conditioning (HVAC) system (100) including a direct-expansion air conditioner and at least one of a gas furnace, a Heat Pump (HP), an electric heating element, and a hydronic heating element, the fan controller comprising:
  electrical inputs configured to receive electrical signals from HVAC thermostat or equipment control terminals (201), comprising at least one of:
    1) a fan controller fan signal input (214) configured to detect at least one of:
      a) a presence of a low-voltage fan signal on a thermostat "G" terminal (204) to allow measurement of a cool-source operational time P4 or heat-source operational time P3 in order to calculate a fan-off time delay P2; and
      b) an absence of a low-voltage fan signal on a thermostat "G" terminal (204) to allow measurement of an off-cycle time P11;
    2) a fan controller heat source or HP reversing valve signal input (216), configured to detect at least one of:
      a) a presence of low-voltage heat signal on the thermostat "W" terminal (208) to allow measurement of a heat-source operational time P3 in order to calculate a fan-off time delay P2; and
      b) an absence of a low-voltage fan signal on a thermostat "W" terminal (208) to allow measurement of an off-cycle time P11; and
      c) a presence or absence of an HP reversing valve signal on a thermostat "O" terminal (235) or an HP low-voltage reversing valve signal on the thermostat "BR" terminal (236) to allow measurement of the HP operational mode;
    3) a fan controller AC/HP compressor signal input (215) configured to detect at least one of:
      a) a presence of a low-voltage AC/HP compressor signal on a thermostat "Y" terminal (207) to allow measurement of a cool-source operational time P4 or heat-source operational time P3 in order to calculate a fan-off time delay P2; and
      b) an absence of a low-voltage fan signal on a thermostat "Y" terminal (207) to allow measurement of an off-cycle time P11; and
    4) a fan controller HP Detection (HPD) signal input (234) configured to detect a presence or absence of a low-voltage signal from a system transformer (210) 24 VAC Hot leg (210b) connected to the fan controller HPD signal input (234) with a diode (275) or with only a wire (265) to indicate whether or not the fan controller is connected to a HP and type of HP reversing valve;
  a microprocessor (304) residing in the fan controller;
  a low-voltage DC power source electrically connected to the microprocessor (304) to provide a DC power signal, the DC power source selected from at least one of:
    a low-voltage battery (306);
    an AC-DC converter (303); and
    a super capacitor (312);
  a switching device (301) electrically connected to the microprocessor (304) and configured to receive a control signal from the microprocessor (304), the switching device (301) configured to provide a fan controller fan relay signal output (212) from the switching device (301) to a fan relay (205) to provide a low-voltage fan relay signal to energize the fan relay (205);
  the microprocessor (304) further configured to provide a control signal to the switching device (301) to energize the fan relay (205) after the signals received from the HVAC thermostat or equipment control terminals (201) indicate that either a cool source is active or a heat source is active;
  the microprocessor (304) further configured to process the electrical signals from the HVAC thermostat or equipment control terminals (201) to measure cool-source operational time P4 or heat-source operational time P3; and
  the microprocessor (304) further configured to calculate a fan-off time delay period P2 as a function of cool-source operational time P4 or heat-source operational time P3; and
  the microprocessor (304) further configured to provide the control signal to the switching device (301) to energize the fan relay (205) for the fan-off time delay period P2; and
  the microprocessor (304) further configured to remove the control signal to the switching device (301) to de-energize the fan relay (205) at the end of the fan-off time delay period P2.

27. The fan controller of claim 26, wherein the measurement of the cool-source operational time P4 is based on at least one of:
  1) a presence of the low-voltage signal on the fan controller fan signal input (214) and an absence of the low-voltage signal on the fan controller heat source or HP reversing valve signal input (216) and an absence of the low-voltage signal on the fan controller HPD signal input (234) for the gas furnace, hydronic or electric resistance HVAC system in cooling mode;
  2) a presence of the low-voltage signal on the fan controller fan signal input (214) and a presence of the low-voltage signal on the fan controller heat source or HP reversing valve signal input (216) and a presence of the unrectified low-voltage signal on the fan controller HPD signal input (234) for a heat pump system with reversing valve energized for cooling;
  3) a presence of the low-voltage signal on the fan controller fan signal input (214) and an absence of low-voltage signal on the fan controller heat source or HP reversing valve signal input (216) and a presence of the positively or negatively rectified low-voltage signal on the fan controller HPD signal input (234) for a heat pump system with reversing valve not energized for cooling;
  4) a presence of the low-voltage signal on fan controller AC/HP compressor signal input (215) and an absence of the low-voltage signal on the fan controller HPD signal input (234) for the gas furnace, hydronic or electric resistance HVAC system in cooling mode;
  5) a presence of the low-voltage signal on fan controller AC/HP compressor signal input (215) and a presence of the low-voltage signal on the fan controller heat source or HP reversing valve signal input (216) and a presence of the unrectified low-voltage signal on the fan controller HPD signal input (234) for the heat pump system with reversing valve energized for cooling; and
  6) a presence of the low-voltage signal on fan controller AC/HP compressor signal input (215) and an absence of the voltage-signal on the fan controller heat source or HP reversing valve signal input (216) and a presence of the positively or negatively rectified low-voltage signal on the fan controller HPD signal input (234) for the heat pump system with reversing valve not energized for cooling.

28. The fan controller of claim 26, wherein the measurement of the heat-source operational time P3 is based on at least one of:
1) a presence of the low-voltage heat source signal on the thermostat "W" terminal (208) received by the fan controller heat source or HP reversing valve signal input (216) and an absence of the low-voltage fan signal on the thermostat "G" terminal (204) received by the fan controller fan signal input (214) and an absence of the low-voltage signal on the fan controller HPD signal input (234) for the gas furnace HVAC system; and
2) a presence of the low-voltage fan signal on the thermostat "G" terminal (204) received by the fan controller fan signal input (214) and a presence of the low-voltage heat source signal on the thermostat"W" terminal (208) received by the fan controller heat source or HP reversing valve signal input (216) and an absence of the low-voltage signal on the fan controller HPD signal input (234) for the hydronic or electric resistance HVAC system;
3) a presence of the low-voltage fan signal on the thermostat "G" terminal (204) received by the fan controller fan signal input (214) and an absence of the low-voltage signal on the HP reversing valve thermostat "O" terminal (235) received by the fan controller heat source or HP reversing valve signal input (216), and a presence of the unrectified low-voltage signal on the fan controller HPD signal input (234) connected with the wire (265) to the 24 VAC Hot signal on the thermostat "R" terminal (209) or the system transformer 24 VAC Hot signal leg (210b) for the heat pump HVAC system with reversing valve energized in cooling mode; and
4) a presence of the low-voltage fan signal on the thermostat "G" terminal (204) received by the fan controller fan signal input (214) and a presence of the low-voltage HP reversing valve signal on the thermostat "BR" terminal (236) received by the fan controller heat source or HP reversing valve signal input (216), and a presence of the positively or negatively rectified low-voltage signal on fan controller HPD signal input (234) connected with the diode (275) to the thermostat Hot "R" terminal or the system transformer 24 VAC Hot signal leg (210b) for the heat pump HVAC system with reversing valve energized in heating mode;
5) a presence of the low-voltage AC/HP signal on the thermostat "Y" terminal (207) received by the fan controller AC/HP signal input (215) and an absence of the low-voltage signal on the HP reversing valve thermostat "O" terminal (235) received by the fan controller heat source or HP reversing valve signal input (216), and the presence of the unrectified low-voltage signal on the fan controller HPD signal input (234) connected with the wire (265) to the 24 VAC Hot signal on the thermostat "R" terminal (209) or the system transformer 24 VAC Hot signal leg (210b) for the heat pump HVAC system with reversing valve energized in cooling mode; and
6) a presence of the low-voltage AC/HP signal on the thermostat "Y" terminal (207) received by the fan controller AC/HP signal input (215) and a presence of the low-voltage signal on the HP reversing valve thermostat "BR" terminal (236) received by the fan controller heat source or HP reversing valve signal input (216), and a presence of the positively or negatively rectified low-voltage signal received by the fan controller HPD signal input (234) connected with the diode (275) to the thermostat Hot "R" terminal or the system transformer 24 VAC Hot signal leg (210b) for the heat pump HVAC system with reversing valve energized in heating mode.

29. A method for efficiently controlling an HVAC system (100) in heating mode, the method comprising:
electrically connecting a fan controller to HVAC thermostat or equipment control terminals (201) of an existing HVAC system;
measuring an off-cycle duration P11 based on an absence of an indication of heat source operation by the fan controller;
receiving an indication of the heat source operation from the HVAC thermostat or equipment control terminals (201) by the fan controller;
interrupting electrical communication between a fan relay signal on a low-voltage fan signal on the thermostat "G" terminal (204) and a fan relay (205);
calculating a fan-on time delay based on at least one of:
a fan-on delay time P0 consisting of at least one of:
a zero time delay; and
a non-zero time delay based on the off-cycle duration P11; and
a fan-on delay time P1 consisting of at least one of:
a fan-on delay time P1 based on a heat-source operational time P3; and
a fan-on delay time P1 equal to heat-source operational time P3; and
interrupting the low-voltage signal on a fan controller fan signal input (214) from the low-voltage fan signal on the thermostat "G" terminal (204) to the fan relay (205) and de-energizing the low-voltage signal on a fan controller fan relay signal output (212) to the fan relay (205) during the fan-on time delay where a system fan/blower (206) is controlled by at least one of:
1) the fan controller microprocessor (304) and the switching device (301) electrically connected to the microprocessor (304) to receive the control signal from the microprocessor (304) to provide a control signal to the fan controller fan relay signal output (212) to control the fan relay (205); and
2) a furnace fan controller (238) controlling a furnace fan relay (239);
initiating the accumulation of a heat-source operational time P3 based on the low-voltage heat signal present on the thermostat "W" terminal (208);
delaying energizing the low-voltage signal to the fan controller fan relay signal output (212) based on at least one of:
1) the current heat-source operational time P3 for the gas furnace HVAC system; and
2) the fan-on delay time P1 for the gas furnace HVAC system while the current accumulation of heat-source operational time P3 is less than the fan-on delay time P1; and
3) the fan-on delay time P0 for the hydronic, electric resistance, or heat pump HVAC system while the current accumulation of heat-source operational time P3 is less than the fan-on delay time P0;
energizing the low-voltage signal on the fan controller fan relay signal output (212) to fan relay (205) thereby turning ON the system fan/blower (206) after the fan-on time delay time has expired;

operating the system fan/blower (206) for the entire duration of the heat-source operational time P3 while the thermostat signal continues to indicate the heat source operation based on the continuous low-voltage thermostat signal; and measuring the heat-source operational time P3 until the thermostat signals dis-continue to indicate the heat source operation based on receiving no indication of the heat source operation by the fan controller; and calculating a fan-off time delay period P2 as a function of the heat-source operational time P3;

providing the control signal to the switching device (301) to continue to provide the low-voltage control signal on the fan controller fan relay signal output (212) to control the fan relay (205) by the fan controller to continue to operate the system fan/blower (206) for the fan-off delay time period P2 after the thermostat signal dis-continues to indicate the heat source operation;

waiting the fan-off time delay period P2 while continuing to provide the low-voltage signal on the fan controller fan relay signal output (212) to control the fan relay (205) for the entire fan-off time delay period P2 when the fan-off time delay period P2 elapses, by the fan controller; and de-energizing the low-voltage signal on the fan controller fan relay signal output (212) to the fan relay (205) when the fan-off time delay period P2 elapses, by the fan controller.

30. A method for efficiently controlling an HVAC system (100) in cooling mode, the method comprising:

electrically connecting a fan controller to an HVAC thermostat or equipment control terminals (201) of an existing HVAC system;

receiving an indication of cool source operation by the fan controller; and interrupting electrical communication between a fan relay signal on the low-voltage fan signal on the thermostat "G" terminal (204) and a fan relay (205);

providing a low-voltage signal on a fan controller fan relay signal output (212) to the fan relay (205) thereby energizing a system fan/blower (206), while the thermostat signal continues to indicate the cool source operation based on the continuous low-voltage cool source thermostat signal;

measuring a cool-source operational time P4 until the thermostat signal dis-continues to indicate the cool source operation;

calculating a fan-off time delay period P2 as a function of the cool-source operational time P4;

providing the low-voltage signal on the fan controller fan relay signal output (212) to control the fan relay (205) by the fan controller after the thermostat signal dis-continues to indicate the cool source operating;

waiting the fan-off time delay period P2 while continuing to provide the low-voltage signal on the fan controller fan relay signal output (212) to control the fan relay (205) for the entire fan-off time delay period P2, by the fan controller; and de-energizing the low-voltage signal on the fan controller fan relay signal output (212) to the fan relay (205) when the fan-off time delay period P2 elapses, by the fan controller.

* * * * *